(12) United States Patent
Nagai et al.

(10) Patent No.: US 8,111,137 B2
(45) Date of Patent: Feb. 7, 2012

(54) RFID TAG READER/WRITER

(75) Inventors: Takuya Nagai, Nagoya (JP); Kazunari Taki, Nagoya (JP); Tsuyoshi Ohashi, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1503 days.

(21) Appl. No.: 11/350,965

(22) Filed: Feb. 10, 2006

(65) Prior Publication Data

US 2006/0220859 A1    Oct. 5, 2006

Related U.S. Application Data

(63) Continuation-in-part of application No. PCT/JP2004/011847, filed on Aug. 18, 2004.

(30) Foreign Application Priority Data

Sep. 19, 2003  (JP) ................................. 2003-327687
Oct. 20, 2003  (JP) ................................. 2003-359545
Feb.  4, 2004  (JP) ................................. 2004-027768
Feb.  4, 2004  (JP) ................................. 2004-027769

(51) Int. Cl.
*H04Q 5/22* (2006.01)
*G08B 13/14* (2006.01)

(52) U.S. Cl. .................... 340/10.1; 340/10.2; 340/10.3; 340/10.4; 340/572.1; 235/492

(58) Field of Classification Search ........ 340/10.1–10.5, 340/572.1, 5.65, 825.58; 324/635; 73/609; 235/492, 486, 476, 441; 343/817, 837, 915
See application file for complete search history.

(56) References Cited

U.S. PATENT DOCUMENTS

| | | | | |
|---|---|---|---|---|
| 3,742,513 A * | 6/1973 | Ehrenspeck | ................... | 343/817 |
| 5,084,699 A * | 1/1992 | DeMichele | ................ | 340/10.34 |
| 5,550,536 A * | 8/1996 | Flaxl | ......................... | 340/10.3 |
| 5,698,838 A * | 12/1997 | Yamaguchi | ................... | 235/492 |
| 5,773,805 A * | 6/1998 | Nakamura et al. | ............. | 235/441 |
| 5,983,363 A * | 11/1999 | Tuttle et al. | ...................... | 714/25 |
| 6,104,291 A * | 8/2000 | Beauvillier et al. | ........ | 340/572.1 |
| 6,362,738 B1 * | 3/2002 | Vega | ........................... | 340/572.1 |
| 6,375,780 B1 * | 4/2002 | Tuttle et al. | ................... | 156/226 |
| 6,414,606 B1 * | 7/2002 | Yujiri et al. | ................... | 340/901 |
| 6,483,425 B1 * | 11/2002 | Avenel | ........................ | 340/5.61 |
| 6,601,770 B1 * | 8/2003 | Ikefuji et al. | ................... | 235/492 |
| 6,650,226 B1 * | 11/2003 | Wuidart et al. | .............. | 340/10.1 |

(Continued)

FOREIGN PATENT DOCUMENTS

EP       1 120 733 A1     8/2001

(Continued)

*Primary Examiner* — Nam V Nguyen
(74) *Attorney, Agent, or Firm* — Oliff & Berridge, PLC

(57) ABSTRACT

An RFID tag reader/writer having a high degree of stability of communication with only a desired RFID tag. The frequency of a carrier wave to be transmitted from the RFID tag reader/writer is set on the basis of a resonance frequency of an antenna of the RFID tag located within a predetermined nearby communication area, which resonance frequency changes due to mutual coupling between the antenna of the RFID tag and an antenna of the RFID tag reader/writer. According to this setting, the RFID tag located within the nearby communication area has a high degree of sensitivity, and the RFID tag located outside the nearby communication area has a low degree of sensitivity, so that it is possible to effectively prevent an interference between the communication of the RFID tag reader/writer with the selected RFID tag and the communication of the reader/writer with the other or non-selected RFID tag.

41 Claims, 52 Drawing Sheets

U.S. PATENT DOCUMENTS

| | | | |
|---|---|---|---|
| 6,654,466 B1 * | 11/2003 | Ikefuji et al. | 380/270 |
| 6,795,025 B2 * | 9/2004 | Saito | 343/700 MS |
| 6,876,324 B2 * | 4/2005 | Sasada et al. | 342/175 |
| 6,943,678 B2 * | 9/2005 | Muirhead | 340/505 |
| 6,946,950 B1 | 9/2005 | Ueno et al. | |
| 6,960,985 B2 * | 11/2005 | Wuidart | 340/10.34 |
| 7,049,936 B2 * | 5/2006 | Wuidart | 340/10.4 |

FOREIGN PATENT DOCUMENTS

| | | |
|---|---|---|
| EP | 1 160 915 A2 | 12/2001 |
| JP | A-11-085923 | 3/1999 |
| JP | A-2000-030007 | 1/2000 |
| JP | A-2001-021645 | 1/2001 |
| JP | A 2001-86030 | 3/2001 |
| JP | A-2001-156674 | 6/2001 |
| JP | A-2001-256446 | 9/2001 |
| JP | A-2001-331768 | 11/2001 |
| JP | A 2002-2026 | 1/2002 |
| JP | A 2002-230499 | 8/2002 |
| JP | A 2002-308437 | 10/2002 |
| JP | A 2003-99721 | 4/2003 |
| JP | A-2003-296669 | 10/2003 |

* cited by examiner

FIG.20

| TAG IDENTIFICATION | PING | 0x08 |
|---|---|---|
| | SCROLL ID | 0x01 |
| TAG WRITING | ERASE ID | 0x32 |
| | PROGRAM ID | 0x31 |
| | VERIFY | 0x38 |
| | LOCK | 0x31 |

RFID TAG READER/WRITER

The present application is a Continuation in-Part of International Application No. PCT/JP2004/011847 filed Aug. 18, 2004, which claims the benefits of Japanese Patent Application No. 2003-327687 filed Sep. 19, 2003, Japanese Patent Application No. 2003-359545 filed Oct. 20, 2003, Japanese Patent Application No. 2004-027768 filed Feb. 4, 2004, and Japanese Patent Application No. 2004-027769 filed Feb. 4, 2004.

BACKGROUND OF THE INVENTION

1. Field of the Invention

The present invention relates to a radio or wireless tag reader/writer operable to read information from and write information on a radio or wireless tag which is capable of information writing and reading by radio or wireless communication.

2. Description of the Related Art

There is known an RFID (Radio Frequency Identification) system wherein an RFID tag reader/writer or a read-only interrogator is operable in a non-contact fashion to write information on and read information from small-sized RFID tags (transponders) which store desired information. This RFID system permits the information stored in the RFID tag, to be read by radio communication even where the RFID tag is stained or located at an invisible position. For this reason, the use of the RFID system is expected in various fields such as commodity administration and inspection. Patent document 1 describes an example of an inspection system using RFID tags.

Patent document 2 describes a known writer (writing device) arranged to write information on circuit elements of the above-described RFID tags. In this conventional writer, a tape of paper on which rectangular labels are bonded at a predetermined spacing interval is successively fed from a roll in a tape supply portion disposed on one side of a housing, and desired information generated by a module within the housing is successively written on an IC circuit portion of the circuit element of each of the RFID tags bonded on the respective labels of the tape, through a reading/writing antenna which is disposed along a feeding path of the tape and which transmits the information to the circuit element. The thus written labels carrying the RFID tags are eventually delivered from the other side of the housing.

Patent document 3 describes another type of known writer (writing device) arranged to write information on the circuit elements of the above-described RFID tags. In this conventional writer, desired information generated by the writing device is transmitted to the circuit element of the RFID tag bonded on each of the rectangular labels bonded on a tape of paper at a predetermined spacing interval while the tape of paper is fed along a feeding path, so that the information is written on the IC circuit portion of the circuit element of each RFID tag.

Patent document 1: JP-2002-308437A

Patent document 2: JP-2002-2026A (paragraphs 0002-0009 and FIGS. 1-4)

Patent document 3: JP-2002-230499A (paragraphs 0012-0021 and FIGS. 1 and 2)

For writing and reading information on and from the RFID tag, the information must be transmitted to and from the RFID tag by radio communication. The conventional radio communication for this purpose uses a frequency band of 125 KHz which has been long used, and a frequency band of 13.56 MHz which has been most commonly used. However, the use of these frequency bands suffers from a short distance of the radio communication, and unfavorably limits the utility of the RFID tags. In view of this drawback, it is considered that a main stream in the future is the use of a radio-frequency such as UHF bands (e.g., a band of 830-930 MHz and a band of 2.45 GHz) which have been widely used in the European countries and the United States. On the other hand, the use of the radio-frequency which permits a long distance of the radio communication requires each selected one of the RFID tags to be shielded or identified, so that the information is written on only the selected or desired RFID tag by the radio communication. There exists a similar drawback for reading the information from each selected RFID tag. To solve these drawbacks, it is considered to reduce the output of the radio reader/writer. However, this solution still has a risk of failure to assure normal radio communication, due to a possible interference between the selected RFID tags and the non-selected RFID tags, depending upon the specific configuration of the RFID tags.

It is found that where the antenna of the RFID tag and the antenna of the RFID tag reader/writer are located as close as possible to each other without a contact of those two antennas, there arise variations of the resonance frequencies of the two antennas due to their mutual coupling. As a result of extensive and continuous research by the present inventors with respect to that interaction of the two antennas, the inventors have discovered an RFID tag reader/writer which permits a high degree of stability of radio communication with only the selected or desired RFID tags.

SUMMARY OF THE INVENTION

The present invention was made in view of the background art described above. It is accordingly an object of this invention to provide an RFID tag reader/writer which permits a high degree of stability of radio communication with only the selected RFID tags.

Means for Solving the Problem

The object indicated above may be achieved according to a first aspect of this invention, which provides an RFID tag reader/writer communicable with an RFID tag circuit element which has an IC circuit portion storing predetermined information, and an antenna connected to the IC circuit portion and arranged to effect transmission and reception of information, the RFID tag reader comprising: an access-information generating portion operable to obtain access to RFID tag information of the IC circuit portion, for reading and writing the predetermined information, by communication with the RFID tag circuit element; a carrier-wave generating portion operable to generate a carrier wave for obtaining access to the RFID tag information of the IC circuit portion; a carrier-wave modulating portion operable to modulate the carrier wave generated by the carrier-wave generating portion, by using access information generated by the access-information generating portion; a modulated-wave amplifying portion operable to amplify the carrier wave modulated by the carrier-wave modulating portion; and an antenna for transmitting an output of the modulated-wave amplifying portion to the IC circuit portion, for obtaining access to the RFID tag information, by non-contact radio communication with the IC circuit portion, by using a radio frequency, the RFID tag reader/writer being characterized in that a frequency of the carrier wave to be generated by the carrier-wave generating portion is set on the basis of a resonance frequency of the antenna of the ratio-tag circuit element located within a predetermined nearby communication area, which resonance frequency changes due to mutual coupling between the antenna of the RFID tag circuit element and the antenna of the RFID tag reader/writer.

The object indicated above may also be achieved according to a second aspect of the present invention, which provides an RFID tag reader/writer comprising: an RFID tag circuit-element accommodating portion for accommodating a plurality of RFID tag circuit elements such that the RFID tag circuit elements can be successively taken out, each of the plurality of RFID tag circuit elements including an IC circuit portion for storing desired information, and a tag-side antenna connected to the IC circuit portion and operable for transmission and reception of information; an access-information generating portion operable to obtain access to RFID tag information of the IC circuit portion; a carrier-wave generating portion operable to generate a carrier wave for obtaining access to the RFID tag information of the IC circuit portion; a carrier-wave modulating portion operable to modulate the carrier wave generated by the carrier-wave generating portion, by using the access information generated by the access-information generating portion; a modulated-wave amplifying portion operable to amplify the carrier wave modulated by the carrier-wave modulating portion; a device-side antenna for transmitting an output of the modulated-wave amplifying portion to the IC circuit portion, for obtaining access to the RFID tag information, by non-contact radio communication with the IC circuit portion, by using a radio frequency in a UHF band; and an RFID tag circuit-element holding portion for holding each of the RFID tag circuit elements successively taken out from the RFID tag circuit-element accommodating portion, in a predetermined accessible area in which the device-side antenna obtains access to the RFID tag information, the RFID tag reader/writer being characterized in that the RFID tag circuit-element accommodating portion is positioned such that the tag-side antenna of each of the RFID tag circuit elements accommodated in the RFID tag circuit-element accommodating portion is located in an area in which a sensitivity of the device-side antenna is relatively low.

The object indicated above may also be achieved according to a third aspect of this invention, which provides an RFID tag reader/writer comprising: an RFID tag circuit-element accommodating portion for accommodating a plurality of RFID tag circuit elements such that the RFID tag circuit elements can be successively taken out, each of the plurality of RFID tag circuit elements including an IC circuit portion for storing desired information, and a tag-side antenna connected to the IC circuit portion and operable for transmission and reception of information; an access-information generating portion operable to obtain access to RFID tag information of the IC circuit portion; a carrier-wave generating portion operable to generate a carrier wave for obtaining access to the RFID tag information of the IC circuit portion; a carrier-wave modulating portion operable to modulate the carrier wave generated by the carrier-wave generating portion, by using the access information generated by the access-information generating portion; a modulated-wave amplifying portion operable to amplify the carrier wave modulated by the carrier-wave modulating portion; a device-side antenna for transmitting an output of the modulated-wave amplifying portion to the IC circuit portion, for obtaining access to the RFID tag information, by non-contact radio communication with the IC circuit portion, by using a radio frequency in a UHF band; and an RFID tag circuit-element holding portion for holding each of the RFID tag circuit elements successively taken out from the RFID tag circuit-element accommodating portion, in a predetermined accessible area in which the device-side antenna obtains access to the RFID tag information, the RFID tag reader/writer being characterized in that the device-side antenna is positioned such that a sensitivity of the tag-side antenna of each of the RFID tag circuit elements accommodated in the RFID tag circuit-element accommodating portion is relatively low.

The object indicated above may also be achieved according to a fourth aspect of this invention, which provides an RFID tag reader/writer comprising: an RFID tag circuit-element accommodating portion for accommodating a plurality of RFID tag circuit elements such that the RFID tag circuit elements can be successively taken out, each of the plurality of RFID tag circuit elements including an IC circuit portion for storing desired information, and a tag-side antenna connected to the IC circuit portion and operable for transmission and reception of information; an access-information generating portion operable to obtain access to RFID tag information of the IC circuit portion; a carrier-wave generating portion operable to generate a carrier wave for obtaining access to the RFID tag information of the IC circuit portion; a carrier-wave modulating portion operable to modulate the carrier wave generated by the carrier-wave generating portion, by using the access information generated by the access-information generating portion; a modulated-wave amplifying portion operable to amplify the carrier wave modulated by the carrier-wave modulating portion; a device-side antenna for transmitting an output of the modulated-wave amplifying portion to the IC circuit portion, for obtaining access to the RFID tag information, by non-contact radio communication with the IC circuit portion, by using a radio frequency in a UHF band; and an RFID tag circuit-element holding portion for holding each of the RFID tag circuit elements successively taken out from the RFID tag circuit-element accommodating portion, in a predetermined accessible area in which the device-side antenna obtains access to the RFID tag information, the RFID tag reader/writer being characterized in that the RFID tag circuit-element accommodating portion and the device-side antenna are disposed such that a plane of polarization of the tag-side antenna of each of the RFID tag circuit elements accommodated in the RFID tag circuit-element accommodating portion, and a plane of polarization of the device-side antenna are inclined with respect to each other.

The object indicated above may also be achieved according to a fifth aspect of this invention, which provides an RFID tag reader/writer comprising: an RFID tag circuit-element accommodating portion for accommodating a plurality of RFID tag circuit elements such that the RFID tag circuit elements can be successively taken out, each of the plurality of RFID tag circuit elements including an IC circuit portion for storing desired information, and a tag-side antenna connected to the IC circuit portion and operable for transmission and reception of information; an access-information generating portion operable to obtain access to RFID tag information of the IC circuit portion; a carrier-wave generating portion operable to generate a carrier wave for obtaining access to the RFID tag information of the IC circuit portion; a carrier-wave modulating portion operable to modulate the carrier wave generated by the carrier-wave generating portion, by using the access information generated by the access-information generating portion; a modulated-wave amplifying portion operable to amplify the carrier wave modulated by the carrier-wave modulating portion; a device-side antenna for transmitting an output of the modulated-wave amplifying portion to the IC circuit portion, for obtaining access to the RFID tag information, by non-contact radio communication with the IC circuit portion, by using a radio frequency in a UHF band; and an RFID tag circuit-element holding portion for holding each of the RFID tag circuit elements successively taken out from the RFID tag circuit-element accommodating portion, in a predetermined accessible area in which the device-side antenna obtains access to the RFID tag information, the RFID tag reader/writer being characterized in that the RFID tag circuit-element accommodating portion is positioned such that the tag-side antenna of each of the RFID tag circuit elements accommodated in the RFID tag circuit-element accommodating portion is located in an area in which a sensitivity of the device-side antenna is relatively low, and in that the RFID tag circuit-element accommodating portion and the device-side antenna are disposed such that a plane of polarization of the tag-side antenna of each of the RFID tag circuit elements accommodated in the RFID tag circuit-element accommodating portion, and a plane of polarization of the device-side antenna are inclined with respect to each other.

The object indicated above may also be achieved according to a sixth aspect of this invention, which provides an RFID tag reader/writer comprising: an RFID tag circuit-element accommodating portion for accommodating a plurality of RFID tag circuit elements such that the RFID tag circuit elements can be successively taken out, each of the plurality of RFID tag circuit elements including an IC circuit portion for storing desired information, and a tag-side antenna connected to the IC circuit portion and operable for transmission and reception of information; an access-information generating portion operable to obtain access to RFID tag information of the IC circuit portion; a carrier-wave generating portion operable to generate a carrier wave for obtaining access to the RFID tag information of the IC circuit portion; a carrier-wave modulating portion operable to modulate the carrier wave generated by the carrier-wave generating portion, by using the access information generated by the access-information generating portion; a modulated-wave amplifying portion operable to amplify the carrier wave modulated by the carrier-wave modulating portion; a device-side antenna for transmitting an output of the modulated-wave amplifying portion to the IC circuit portion, for obtaining access to the RFID tag information, by non-contact radio communication with the IC circuit portion, by using a radio frequency in a UHF band; and an RFID tag circuit-element holding portion for holding each of the RFID tag circuit elements successively taken out from the RFID tag circuit-element accommodating portion, in a predetermined accessible area in which the device-side antenna obtains access to the RFID tag information, the RFID tag reader/writer being characterized in that the device-side antenna is positioned such that a sensitivity of the tag-side antenna of each of the RFID tag circuit elements accommodated in the RFID tag circuit-element accommodating portion is relatively low, and in that the RFID tag circuit-element accommodating portion and the device-side antenna are disposed such that a plane of polarization of the tag-side antenna of each of the RFID tag circuit elements accommodated in the RFID tag circuit-element accommodating portion, and a plane of polarization of the device-side antenna are inclined with respect to each other.

The object indicated above may also be achieved according to a seven aspect of this invention, which provides an RFID tag reader/writer comprising: an RFID tag circuit-element accommodating portion for accommodating a plurality of RFID tag circuit elements such that the RFID tag circuit elements can be successively taken out, each of the plurality of RFID tag circuit elements including an IC circuit portion for storing desired information, and a tag-side antenna connected to the IC circuit portion and operable for transmission and reception of information; an access-information generating portion operable to generate access information for obtaining access to RFID tag information of the IC circuit portion; a directional antenna for transmitting the access information generated by the access-information generating portion, to the tag-side antenna, for obtaining access to the RFID tag information of the IC circuit portion, by non-contact radio communication with the tag-side antenna; and an RFID tag circuit-element holding portion for holding each of the RFID tag circuit elements successively taken out from the RFID tag circuit-element accommodating portion, in a predetermined accessible area in which the directional antenna obtains access to the RFID tag information, the RFID tag reader/writer being characterized in that the RFID tag circuit-element holding portion is spaced from the directional antenna in a direction of directivity of the directional antenna, while the RFID tag circuit-element accommodating portion is spaced from the directional antenna in a direction opposite to the direction of directivity.

The object indicated above may also be achieved according to an eighth aspect of this invention, which provides an RFID tag reader/writer comprising: an RFID tag circuit-element accommodating portion for accommodating a plurality of RFID tag circuit elements such that the RFID tag circuit elements can be successively taken out, each of the plurality of RFID tag circuit elements including an IC circuit portion for storing desired information, and a tag-side antenna connected to the IC circuit portion and operable for transmission and reception of information; an access-information generating portion operable to generate access information for obtaining access to RFID tag information of the IC circuit portion; a directional antenna for transmitting the access information generated by the access-information generating portion, to the tag-side antenna, for obtaining access to the RFID tag information of the IC circuit portion, by non-contact radio communication with the tag-side antenna; an RFID tag circuit-element holding portion for holding each of the RFID tag circuit elements successively taken out from the RFID tag circuit-element accommodating portion, in a predetermined accessible area in which the directional antenna obtains access to the RFID tag information; and a shielding portion for reducing an intensity of a radio communication signal, the RFID tag reader/writer being characterized in that the RFID tag circuit-element holding portion is spaced from the directional antenna in a direction of directivity of the directional antenna, in that the shielding portion is spaced from the RFID tag circuit-element holding portion in the direction of directivity of the directional antenna, and in that the RFID tag circuit-element accommodating portion is spaced from the shielding portion in the direction of directivity of the directional antenna.

According to the first aspect of the invention described above, the resonance frequency of the tag-side antenna of the RFID tag circuit element of each RFID tag located within the predetermined nearby communication area, which resonance frequency changes due to mutual coupling between the tag-side antenna of that RFID tag circuit element and the device-side antenna of the RFID tag reader/writer is used to set the frequency of the carrier wave to be transmitted from the RFID tag reader/writer. This setting permits the communication of the RFID tag reader/writer with only the RFID tag circuit element or elements located within the nearby communication area. That is, each RFID tag circuit element located within the nearby communication area has a high degree of sensitivity, and each ratio-tag circuit element located outside the nearby communication area has a low degree of sensitivity, so that it is possible to effectively prevent an interference between the communication of the RFID tag reader/writer with each desired or selected RFID tag circuit element and the communication of the reader/writer with the other or non-selected RFID tag circuit element or elements. Thus, the present aspect of the invention provides the RFID tag reader/writer which has a high degree of stability of communication with only the desired RFID tag circuit element or elements.

In a preferred arrangement of the first aspect of this invention, the above-described nearby communication area is set by setting the spacing distance between the tag-side antenna of the RFID tag circuit element and the device-side antenna of the RFID tag reader/writer, to be not larger than 0.1 times a wavelength corresponding to a resonance frequency (hereinafter referred to as "free-space resonance frequency") of the tag-side antenna of the RFID tag circuit element when the RFID tag circuit element exists alone or is located at a position at which the mutual coupling between the device-side antenna of the RFID tag reader/writer and the tag-side antenna of the RFID tag circuit element. The RFID tag reader/writer generates the carrier wave having a frequency higher than the resonance frequency of the tag-side antenna of the RFID tag circuit element when the spacing distance between the device-side antenna of the RFID tag reader/writer and the tag-side antenna of the RFID tag circuit element is 0.5 times the wavelength corresponding to the above-described free-space resonance frequency. Accordingly, the amount of change of the resonance frequency has a maximal value when the spacing distance between the tag-side antenna of the RFID tag circuit element and the device-side antenna of the RFID tag reader/writer is 0.5 times the wavelength corresponding to the above-described free-space resonance frequency, and exceeds the maximal value when the spacing distance is not larger than 0.1 times the above-indicated wavelength, so that the RFID tag reader/writer has a high degree of stability of communication with only the desired RFID tag circuit element or elements located within the nearby communication area described above.

In another preferred arrangement of the first aspect of the invention, the RFID tag reader/writer is operable to effect information reading and writing communication with the RFID tag circuit element provided with a half-wave dipole antenna as the above-indicated tag-side antenna, and has the predetermined nearby communication area which is set by setting the spacing distance between the tag-side antenna of the RFID tag circuit element and the device-side antenna of the RFID tag reader/writer, to be not larger than 0.05 times a wavelength corresponding to the above-described free-space resonance frequency. The RFID tag reader/writer is arranged to generate the carrier wave having the frequency not smaller than 1.03 times the above-described free-space resonance frequency, so that when the RFID tag reader/writer generates the carrier wave having the frequency not smaller than 1.03 times the free-space resonance frequency of the RFID tag circuit element, the RFID tag circuit element has a high degree of sensitivity when the spacing distance between the tag-side antenna of the RFID tag circuit element and the device-side antenna of the RFID tag reader/writer is not larger than 0.05 times the wavelength corresponding to the free-space resonance frequency of the RFID tag circuit element, whereby the RFID tag reader/writer has a high degree of stability of communication with only the RFID tag circuit element or elements located within the nearby communication area described above.

In another arrangement of the first aspect of the invention, the predetermined nearby communication area is set by setting the spacing distance between the tag-side antenna of the RFID tag circuit element and the device-side antenna of the RFID tag reader/writer, to be within a range between not smaller than 0.2 times and not larger than 0.4 times a wavelength corresponding to the above-described free-space resonance frequency, and the RFID tag reader/writer is arranged to generate the carrier wave having the resonance frequency of the tag-side antenna of the RFID tag circuit element when the spacing distance between the tag-side antenna of the RFID tag circuit element and the device-side antenna of the RFID tag reader/writer is within the above-indicated. Accordingly, the amount of change of the resonance frequency of the tag-side antenna of the RFID tag circuit element due to mutual coupling between the tag-side antenna of the RFID tag circuit element and the device-side antenna of the RFID tag reader/writer has a minimal value when the spacing distance between the tag-side antenna of the RFID tag circuit element and the device-side antenna of the RFID tag reader/writer is within the range between not smaller than 0.2 times and not larger than 0.4 times the wavelength corresponding to the above-described free-space resonance frequency, so that the RFID tag reader/writer has a high degree of stability of communication with only the RFID tag circuit element or elements located within the nearby communication area described above.

In another preferred arrangement of the first aspect of the invention, the RFID tag reader/writer is provided with the mode switching portion operable to place the carrier-wave generating portion in one of the nearby communication mode for communication with the RFID tag circuit element only when the RFID tag circuit element is located within the nearby communication area, and the far communication mode for communication with the RFID tag circuit element when the RFID tag circuit element is located outside the nearby communication area, so that the carrier-wave generating portion is operable to generate the carrier waves having respective different frequencies when the carrier-wave generating portion is placed in the near communication mode and the far communication mode, respectively. That is, the frequency of the carrier wave generated by the carrier-wave generating portion can be changed depending upon whether the RFID tag circuit element in question is located within the nearby communication area or not. Accordingly, the RFID tag reader/writer can communicate with only the circuit element or elements within the nearby communication area, with a high degree of stability, but also can communicate suitably with the circuit element or elements outside the nearby communication area.

According to the second aspect of this invention, an operation to read or write information from or on the desired RFID tag circuit element is performed such that the access information generated by the access-information generating portion is used by the carrier-wave modulating portion, to modulate the carrier wave generated by the carrier-wave generating portion, and the modulated carrier wave is amplified by the modulated-wave amplifying portion and transmitted from the device-side antenna to the IC circuit portion of the desired RFID tag circuit element, by non-contact communication, so that the RFID tag information of the IC circuit portion is accessed. The RFID tag circuit-element accommodating portion is positioned such that the antenna (tag-side antenna) of each RFID tag circuit element accommodated in the RFID tag circuit-element accommodating portion is located in an area in which the sensitivity of the device-side antenna is relatively low. In this arrangement, the sensitivity of the device-side antenna with respect to each RFID tag circuit element accommodated in the RFID tag circuit-element accommodating portion is low, so that the intensity of the communication signal is reduced, whereby the communication between the device-antenna and each RFID tag circuit element accommodated in the RFID tag circuit-element accommodating portion is not possible, so that the RFID tag reader/writer can obtain access to the RFID tag information of the IC circuit portion of only the RFID tag circuit element which has been taken out from the RFID tag circuit-element accommodating portion and which is held by the RFID tag circuit-element holding portion. Therefore, even when a radio frequency in the UHF band is used for communication, the RFID tag reader/writer can read or write the RFID tag information from or on the IC circuit portion of only the RFID tag circuit element desired to be accessed for information reading or writing, with a simple arrangement and in a simple manner, without the provision of a conventionally required shielding means, or without reduction of the signal output or without the provision of specific communication means for identification of the individual RFID tag circuit elements. Namely, the use of the radio frequency in the UHF band permits easy reading or writing of the RFID tag information from or on only the RFID tag circuit element desired to be accessed for information reading or writing, with a simple arrangement, without the provision of a shielding means, or without reduction of the signal output or without the provision of specific communication means for identification of the individual RFID tag circuit elements.

According to the third aspect of this invention, the device-side antenna is positioned such that the sensitivity of the antenna (tag-side antenna) of each of the RFID tag circuit elements accommodated in the RFID tag circuit-element accommodating portion is relatively low. In this arrangement, the sensitivity of the tag-side antenna of each RFID tag circuit element accommodated in the RFID tag circuit-element accommodating portion, with respect to the device-side antenna, is low, so that the intensity of the communication signal is reduced, whereby the communication between the device-antenna and each RFID tag circuit element accommodated in the RFID tag circuit-element accommodating portion is not possible, so that the RFID tag reader/writer can obtain access to the RFID tag information of the IC circuit portion of only the RFID tag circuit element which has been taken out from the RFID tag circuit-element accommodating portion and which is held by the RFID tag circuit-element holding portion. Therefore, even when a radio frequency in the UHF band is used for communication, the RFID tag reader/writer can read or write the RFID tag information from or on the IC circuit portion of only the RFID tag circuit element desired to be accessed for information reading or writing, with a simple arrangement and in a simple manner, without the provision of a conventionally required shielding means, or without reduction of the signal output or without the provision of specific communication means for identification of the individual RFID tag circuit elements. Namely, the use of the radio frequency in the UHF band permits easy reading or writing of the RFID tag information from or on only the RFID tag circuit element desired to be accessed for information reading or writing, with a simple arrangement, without the provision of a shielding means, or without reduction of the signal output or without the provision of specific communication means for identification of the individual RFID tag circuit elements.

The fourth aspect of this invention is based on a fact that a communication signal between the tag-side antenna and the device-side antenna has the highest intensity where the planes of polarization of these two antennas are parallel to each other, and the intensity of the communication signal decreases with an increase of an angle of inclination of the planes of polarization with respect to each other from the mutually parallel state. In view of this fact, the RFID tag reader/writer according to the fourth aspect of the invention is arranged to position the RFID tag circuit-element accommodating portion and the device-side antenna relative to each other such that the plane of polarization of the tag-side antenna of each RFID tag circuit element accommodated in the RFID tag circuit-element accommodating portion and the plane of polarization of the device antenna are perpendicular to each other, namely, such that the plane of polarization of the device-side antenna is not parallel to the plane of polarization of the tag-side antenna of each RFID tag circuit element accommodated in the RFID tag circuit-element accommodating portion, so that the intensity of the communication signals is reduced, whereby the communication between the device-antenna and each RFID tag circuit element accommodated in the RFID tag circuit-element accommodating portion is not possible, so that the RFID tag reader/writer can obtain access to the RFID tag information of the IC circuit portion of only the RFID tag circuit element which has been taken out from the RFID tag circuit-element accommodating portion and which is held by the RFID tag circuit-element holding portion. Therefore, even when a radio frequency in the UHF band is used for communication, the RFID tag reader/writer can read or write the RFID tag information from or on the IC circuit portion of only the RFID tag circuit element desired to be accessed for information reading or writing, with a simple arrangement and in a simple manner, without the provision of a conventionally required shielding means, or without reduction of the signal output or without the provision of specific communication means for identification of the individual RFID tag circuit elements. Namely, the use of the radio frequency in the UHF band permits easy reading or writing of the RFID tag information from or on only the RFID tag circuit element desired to be accessed for information reading or writing, with a simple arrangement, without the provision of a shielding means, or without reduction of the signal output or without the provision of specific communication means for identification of the individual RFID tag circuit elements.

According to the fifth aspect of this invention, the RFID tag circuit-element accommodating portion is positioned such that the antenna (tag-side antenna) of each of the RFID tag circuit elements accommodated in the RFID tag circuit-element accommodating portion is located in an area in which a sensitivity of the device-side antenna is relatively low, and the RFID tag circuit-element accommodating portion and the device-side antenna are disposed such that the plane of polarization of the tag-side antenna of each of the RFID tag circuit elements accommodated in the RFID tag circuit-element accommodating portion, and the plane of polarization of the device-side antenna are perpendicular to each other. In this arrangement, the sensitivity of the device-side antenna with respect to each RFID tag circuit element accommodated in the RFID tag circuit-element accommodating portion is low, and the planes of polarization of the two antennas are not parallel to each other, so that the intensity of the communication signal is considerably reduced, whereby the communication between the device-antenna and each RFID tag circuit element accommodated in the RFID tag circuit-element accommodating portion is not possible, so that the RFID tag reader/writer can obtain access to the RFID tag information of the IC circuit portion of only the RFID tag circuit element which has been taken out from the RFID tag circuit-element accommodating portion and which is held by the RFID tag circuit-element holding portion. Therefore, even when a radio frequency in the UHF band is used for communication, the RFID tag reader/writer can read or write the RFID tag information from or on the IC circuit portion of only the RFID tag circuit element desired to be accessed for information reading or writing, with a simple arrangement and in a simple manner, without the provision of a conventionally required shielding means, or without reduction of the signal output or without the provision of specific communication means for identification of the individual RFID tag circuit elements. Namely, the use of the radio frequency in the UHF band permits easy reading or writing of the RFID tag information from or on only the RFID tag circuit element desired to be accessed for information reading or writing, with a simple arrangement, without the provision of a shielding means, or without reduction of the signal output or without the provision of specific communication means for identification of the individual RFID tag circuit elements.

According to the sixth aspect of this invention, the device-side antenna is positioned such that the sensitivity of the antenna (tag-side antenna) of each of the RFID tag circuit elements accommodated in the RFID tag circuit-element accommodating portion is relatively low, and the RFID tag circuit-element accommodating portion and the device-side antenna are disposed such that the plane of polarization of the tag-side antenna of each of the RFID tag circuit elements accommodated in the RFID tag circuit-element accommodating portion, and the plane of polarization of the device-side antenna are perpendicular to each other. In this arrangement, the sensitivity of each RFID tag circuit element accommodated in the RFID tag circuit-element accommodating portion, with respect to the device-side antenna, is low, and the planes of polarization of the two antennas are not parallel to each other, so that the intensity of the communication signal is considerably reduced, whereby the communication between the device-antenna and each RFID tag circuit element accommodated in the RFID tag circuit-element accommodating portion is not possible, so that the RFID tag reader/writer can obtain access to the RFID tag information of the IC circuit portion of only the RFID tag circuit element which has been taken out from the RFID tag circuit-element accommodating portion and which is held by the RFID tag circuit-element holding portion. Therefore, even when a radio frequency in the UHF band is used for communication, the RFID tag reader/writer can read or write the RFID tag information from or on the IC circuit portion of only the RFID tag circuit element desired to be accessed for information reading or writing, with a simple arrangement and in a simple manner, without the provision of a conventionally required shielding means, or without reduction of the signal output or without the provision of specific communication means for identification of the individual RFID tag circuit elements. Namely, the use of the radio frequency in the UHF band permits easy reading or writing of the RFID tag information from or on only the RFID tag circuit element desired to be accessed for information reading or writing, with a simple arrangement, without the provision of a shielding means, or without reduction of the signal output or without the provision of specific communication means for identification of the individual RFID tag circuit elements.

In one preferred arrangement of the second or fifth aspect of this invention, the RFID tag circuit-element accommodating portion is positioned such that the tag-side antenna of each of the RFID tag circuit elements accommodated in the RFID tag circuit-element accommodating portion is located in an area in which an intensity of an electric field of a signal received from the device-side antenna is not larger than one tenth of that at the RFID tag circuit-element holding portion. In this arrangement wherein the tag-side antenna of each RFID tag circuit element accommodated in the RFID tag circuit-element accommodating portion is located in the area in which the electric field intensity of the signal received from the device-side antenna is not larger than one tenth of that at the RFID tag circuit-element holding portion, it is possible to effectively prevent an access of the device-side antenna to the RFID tag circuit elements accommodated in the RFID tag circuit-element accommodating portion.

In another preferred arrangement of the second or fifth aspect of this invention, the RFID tag circuit-element accommodating portion is positioned such that the tag-side antenna of each of the RFID tag circuit elements accommodated in the RFID tag circuit-element accommodating portion is located in an area in which a radiation directivity of the device-side antenna is almost equal to a lowest value. In this arrangement, the tag-side antenna of each RFID tag circuit element accommodated in the RFID tag circuit-element accommodating portion is located in a so-called "null area" in which the radiation directivity of the device-side antenna is almost zero, so that it is possible to prevent an access of the device-side antenna to the RFID tag circuit elements accommodated in the RFID tag circuit-element accommodating portion.

In one preferred arrangement of the third or sixth aspect of this invention, the device-side antenna is positioned such that an intensity of an electric field of a signal which is received by the device-side antenna and which is reflected from the tag-side antenna of each of the RFID tag circuit elements accommodated in the RFID tag circuit element accommodating portion is not larger than one tenth of that of a signal which is received by the device-side antenna and which is reflected from the tag-side antenna of the RFID tag circuit element held by the RFID tag circuit-element holding portion. In this arrangement wherein the device-side antenna is positioned such that the intensity of the electric field of the reflected signal received from the tag-side antenna of each of the RFID tag circuit elements accommodated in the RFID tag circuit element accommodating portion is not larger than one tenth of that of the reflected signal received from the tag-side antenna of the RFID tag circuit element held by the RFID tag circuit-element holding portion, the intensity of the communication signal between each RFID tag circuit element accommodated in the RFID tag circuit-element accommodating portion and the device-side antenna is reduced to a level at which the communication therebetween is impossible, so that it is possible to effectively prevent an access of the device-side antenna to the RFID tag circuit elements accommodated in the RFID tag circuit-element accommodating portion.

In another preferred arrangement of the third or sixth aspect of this invention, the device-side antenna is located in an area in which an intensity of a radiation directivity of the tag-side antenna of one of the RFID tag circuit elements which is located nearest to an outlet of the RFID tag circuit-element accommodating portion is almost equal to a lowest value. In this arrangement, the device-side antenna is located in a so-called "null area" in which the radiation directivity of the tag-side antenna of the RFID tag circuit element located nearest to the outlet of the RFID tag circuit-element accommodating portion is almost zero, so that it is possible to effectively prevent an access of the device-side -antenna to the RFID tag circuit elements accommodated in the RFID tag circuit-element accommodating portion.

In one preferred arrangement of the fourth through sixth aspects of this invention, the RFID tag circuit-element accommodating portion and the device-side antenna are disposed such that an angle not smaller than 60° and not larger than 90° is formed between the plane of polarization of the tag-side antenna of each of the RFID tag circuit elements accommodated in the RFID tag circuit-element accommodating portion and the plane of polarization of the device-side antenna. The communication signal between each tag-side antenna and the device-side antenna has the highest intensity where the planes of polarization of these two antennas are parallel to each other, and the intensity of the communication signal decreases with an increase of an angle of inclination of the planes of polarization with respect to each other from the mutually parallel state. Where the angle formed between the two planes of polarization is not smaller than 60°, the intensity of the communication signal can be reduced to a half of that in the mutually parallel state of the two planes of polarization, so that it is possible to effectively prevent an access of the device-side antenna to the RFID tag circuit elements accommodated in the RFID tag circuit-element accommodating portion.

In another preferred arrangement of the fourth through sixth aspects of the invention, the RFID tag circuit-element accommodating portion and the device-side antenna are disposed such that an angle of about 90° is formed between the plane of polarization of the tag-side antenna of each of the RFID tag circuit elements accommodated in the RFID tag circuit-element accommodating portion and the plane of polarization of the device-side antenna. In this arrangement wherein the plane of polarization of the tag-side antenna of each RFID tag circuit element accommodated in the RFID tag circuit-element accommodating portion and the plane of polarization of the device-side antenna are inclined about 90° with respect to each other, the communication between the two antennas is almost impossible, so that it is possible to effectively prevent an access of the device-side antenna to the RFID tag circuit elements accommodated in the RFID tag circuit-element accommodating portion.

In another preferred arrangement of the fourth through sixth aspects of the invention, wherein the RFID tag circuit-element accommodating portion and the RFID tag circuit-element holding portion are disposed such that an angle not smaller than 60° and not larger than 90° is formed between the plane of polarization of the tag-side antenna of one of the RFID tag circuit elements which is located at an outlet of the RFID tag circuit-element accommodating portion and the plane of polarization of the tag-side antenna of one of the RFID tag circuit elements which has already been taken out from the RFID tag circuit-element accommodating portion and which is held by the RFID tag circuit-element holding portion. In this arrangement, the angle formed between the plane of polarization of the tag-side antenna of the RFID tag circuit element located at the outlet of the RFID tag circuit-element accommodating portion and the plane of polarization of the tag-side antenna of the RFID tag circuit element held by the RFID tag circuit-element holding portion is not smaller than 60°, so that the intensity of the communication signal received from the device-side antenna by the tag-side antenna of the RFID tag circuit element located nearest to the outlet of the RFID tag circuit-element accommodating portion is reduced to a half of the intensity of the communication signal received from the device-side antenna by the tag-side antenna of the RFID tag circuit element held by the RFID tag circuit-element holding portion, whereby it is possible to effectively prevent an access of the device-side antenna to the RFID tag circuit elements accommodated in the RFID tag circuit-element accommodating portion.

Preferably, the RFID tag reader/writer described just above further comprises a deflecting portion operable to change a direction of feeding of the RFID tag circuit elements, at a position between the outlet and the RFID tag circuit-element holding portion, such that the angle not smaller than 60° and not larger than 90° is formed between the plane of polarization of the tag-side antenna of the RFID tag circuit element located at the outlet and the plane of polarization of the tag-side antenna of the RFID tag circuit element held by the RFID tag circuit-element holding portion. In this arrangement, each RFID tag circuit element taken out from the RFID tag circuit-element accommodating portion is deflected to change the direction of the plane of polarization of its tag-side antenna by at least 60°, before this RFID tag circuit element is fed to the RFID tag circuit-element holding portion at which the information reading or writing is to be effected. Accordingly, the intensity of the communication signal received by the tag-side antenna of each RFID tag circuit-element accommodating in the accommodating portion from the device-side antenna can be reduced to a half of that of the communication signal received by the tag-side antenna of the RFID tag circuit element held by the RFID tag circuit-element holding portion, whereby it is possible to effectively prevent an access of the device-side antenna to the RFID tag circuit elements accommodated in the RFID tag circuit-element accommodating portion.

In another preferred arrangement of the fourth through sixth aspects of the invention, the RFID tag circuit-element accommodating portion and the device-side antenna are disposed such that an angle of about 90° is formed between the plane of polarization of the tag-side antenna of one of the RFID tag circuit elements which is located at an outlet of the RFID tag accommodating portion and the plane of polarization of the tag-side antenna of one of the RFID tag circuit elements which has already been taken out from the RFID tag circuit-element accommodating portion and which is held by the RFID tag circuit-element holding portion. In this arrangement, the plane of polarization of the tag-side antenna of the RFID tag circuit element located at the outlet of the RFID tag circuit-element accommodating portion is inclined by about 90° with respect to the plane of polarization of the tag-side antenna of the RFID tag circuit element held by the RFID tag circuit-element holding portion, so that the communication of the device-side antenna with the tag-side antenna of each RFID tag circuit element located at the RFID tag circuit-element accommodating portion is almost impossible, whereby it is possible to effectively prevent an access of the device-side antenna to the RFID tag circuit elements accommodated in the RFID tag circuit-element accommodating portion.

Preferably, the RFID tag reader/writer described just above further comprises a deflecting portion operable to change a direction of feeding of the RFID tag circuit elements, at a position between the outlet and the RFID tag circuit-element holding portion, such that the angle of about 90° is formed between the plane of polarization of the tag-side antenna of the RFID tag circuit element located at the outlet and the plane of polarization of the tag-side antenna of the RFID tag circuit element held by the RFID tag circuit-element holding portion. In this arrangement, each RFID tag circuit element taken out from the RFID tag circuit-element accommodating portion is deflected to change the direction of the plane of polarization of its tag-side antenna by about 90°, before this RFID tag circuit element is fed to the RFID tag circuit-element holding portion at which the information reading or writing is to be effected. Accordingly, the intensity of the communication signal received by the tag-side antenna of each RFID tag circuit-element accommodating in the accommodating portion from the device-side antenna can be reduced to a half of that of the communication signal received by the tag-side antenna of the RFID tag circuit element held by the RFID tag circuit-element holding portion, whereby it is possible to effectively prevent an access of the device-side antenna to the RFID tag circuit elements accommodated in the RFID tag circuit-element accommodating portion.

In a preferred arrangement of the second through sixth aspects of the invention, the RFID tag circuit-element accommodating portion includes a reel member holding a roll of a label material in the form of a tape having the plurality of RFID tag circuit elements successively formed in its longitudinal direction. In this arrangement, the plurality of RFID tag circuit elements can be successively taken out by rotating the reel member to unwind the roll of the label material.

In another preferred arrangement of the second through sixth aspects of the invention, the RFID tag circuit-element accommodating portion includes a tray member accommodating a stack of a plurality of planar label elements which are laminated on each other and each of which carries one RFID tag circuit element formed thereon. In this arrangement, the RFID tag circuit elements can be successively taken out such that the planar label elements are fed out one after another from the tray member through an outlet formed on one side of the tray member (on one lateral side, for example).

According to the seventh aspect of this invention, an operation to read or write information from or on the desired ratio-tag circuit element is performed such that the access information generated by the access-information generating portion is transmitted from the directional antenna of the RFID tag reader/writer to the IC circuit portion through the tag-side antenna of the RFID tag circuit element, in a non-contact fashion. The RFID tag circuit-element holding portion which defines the accessible area is spaced from the directional antenna having a directivity in a predetermined one direction, in the direction of directivity of the directional antenna, while the RFID tag circuit-element accommodating portion accommodating the plurality of RFID tag circuit elements is spaced from the directional antenna in the direction opposite to the direction of directivity of the directional antenna. In this arrangement, a sensitivity of the directional antenna with respect to the RFID tag circuit element held in the accessible area is relatively high so that an intensity of a radio communication signal is relatively high, while the sensitivity of the directional antenna with respect to each RFID tag circuit element accommodated in the RFID tag circuit-element accommodating portion and the RFID tag circuit element at an outlet of the RFID tag reader/writer is relatively low so that the intensity of the radio communication signal is relatively low. Accordingly, the RFID tag reader/writer is not communicable with each RFID tag circuit element accommodated in the RFID tag circuit-element accommodating portion, and can obtain access to the RFID tag information of the IC circuit portion of only the RFID tag circuit element which has been taken out from the RFID tag circuit-element accommodating portion and which is currently held by the RFID tag circuit-element holding portion. Therefore, even when a radio frequency in the UHF band is used for communication, the RFID tag reader/writer can read or write the RFID tag information from or on the IC circuit portion of only the RFID tag circuit element desired to be accessed for information reading, with a simple arrangement and in a simple manner, without the provision of a conventionally required shielding means, or without reduction of the signal output or without the provision of specific communication means for identification of individual RFID tag circuit elements. Namely, the directional antenna has a relatively high sensitivity with respect to the RFID tag circuit element held in the accessible area, resulting in a relatively high intensity of the radio communication signal, but has a relatively low sensitivity with respect to the RFID tag circuit elements accommodated in the RFID tag circuit-element accommodating portion or existing at the outlet, resulting in a relatively low intensity of the radio communication signal. Therefore, the use of the radio frequency in the UHF band permits easy reading or writing of the RFID tag information from or on only the RFID tag circuit element desired to be accessed for information reading or writing, with a simple arrangement, without the provision of a shielding means, or without reduction of the signal output or without the provision of specific communication means for identification of the individual RFID tag circuit elements.

In a preferred arrangement of the seventh aspect of the invention, the directional antenna is a micro strip antenna which is provided with a micro strip antenna element on one of opposite sides thereof, and a base plate on the other of the opposite sides. This micro strip antenna provided with the micro strip antenna element and the base plate has a higher directivity in the direction on the side of the micro strip antenna element, so that it is possible to read or write the RFID tag information from or on only the RFID tag circuit element desired to be accessed for information reading or writing.

In another preferred arrangement of the seventh aspect of the invention, the RFID tag circuit-element holding portion is disposed on the side of the micro strip antenna element, while the RFID tag circuit-element accommodating portion is disposed on the side of the base plate. This arrangement permits increased stability of reading or writing of the RFID tag information from or on only the RFID tag circuit element desired to be accessed for information reading or writing, since the directivity of the micro strip antenna is higher on the side of its micro strip antenna element, than on the opposite side on which the base plate is disposed.

In another preferred arrangement of the seventh aspect of the invention, a dimension of the micro strip antenna element in a longitudinal direction of the tag-side antenna of the RFID tag circuit element held in the accessible area is smaller than a dimension of the tag-side antenna in the longitudinal direction. When a communication signal is transmitted and received between the micro strip antenna element and the tag-side antenna of the RFID tag circuit element are located close to each other, a radiation of the communication signal in the direction of directivity of the micro strip antenna element from a portion of the micro strip antenna element which is outside the longitudinal dimension of the tag-side antenna is unlikely to be received by the tag-side antenna. In view of this fact, the longitudinal dimension of the micro strip antenna element is made smaller than the longitudinal dimension of the tag-side antenna, so that the information can be transmitted and received between the directional antenna and the tag-side antenna, with high efficiency.

In another preferred arrangement of the seventh aspect of the invention, a shielding portion for reducing an intensity of a radio communication signal is provided such that the shielding portion is spaced from the RFID tag circuit-element holding portion in the direction of directivity. In this arrangement, the shielding portion prevents the radiation of the communication signal in the direction of directivity of the directional antenna far beyond the tag-side antenna, and consequent leakage of the signal into the exterior of the RFID tag reader/writer, while assuring transmission and reception of the communication signal between the directional antenna and the tag-side antenna held by the RFID tag circuit-element holding portion.

In another preferred arrangement of the seventh aspect of the invention, the RFID tag reader/writer has an outlet through which the RFID tag circuit element is fed out of the RFID tag reader/writer after the RFID tag information of the IC circuit portion has been accessed in the accessible area. In this arrangement, the RFID tag circuit element the IC circuit portion of which has been accessed to read or write the RFID tag information in the accessible area can be smoothly fed out of the RFID tag reader/writer.

In another preferred arrangement of the seventh aspect of the invention, the above-described outlet is spaced from the directional antenna in a direction substantially perpendicular to the direction of directivity. In this arrangement, the intensity of the communication signal received at the outlet from the directional antenna is relatively low, since the outlet is spaced from the directional antenna in the direction substantially perpendicular to the direction of directivity, so that the leakage of the communication signal into the exterior of the reader/writer can be reduced.

In another preferred arrangement of the seventh aspect of the invention, the above-described outlet is positioned such that the outlet is spaced from the directional antenna in a direction in which an electric field intensity of the directional antenna is lower by at least 10 dB than that in the direction of directivity of the directional antenna. In this arrangement wherein the electric field intensity at the outlet is lower by at least 10 dB than that at a position spaced from the directional antenna in the direction of directivity, the leakage of the communication signal into the exterior of the reader/writer can be reduced with increased stability.

In another preferred arrangement of the seventh aspect of the invention, the base plate has a size larger than a surface area of projection of the RFID tag circuit-element accommodating portion as seen from the micro strip antenna. This arrangement is effective to prevent leakage of the communication signal beyond the base plate toward the RFID tag circuit-element accommodating portion.

In another preferred arrangement of the seventh aspect of the invention, the base plate has side wall portions extending in a direction toward the RFID tag circuit-element accommodating portion and away from the micro strip antenna element. In this arrangement, the side wall portions of the base plate which cover the RFID tag circuit-element accommodating portion in its lateral direction are effective to prevent leakage of the communication signal beyond the base plate toward the RFID tag circuit-element accommodating portion, with increased stability.

In another preferred arrangement of the seventh aspect of the invention, the base plate is substantially U-shaped. In this arrangement, the side wall portions of the substantially U-shaped base plate cover the RFID tag circuit-element accommodating portion in its lateral direction, and prevent leakage of the communication signal beyond the base plate toward the RFID tag circuit-element accommodating portion, further increased stability.

According to the eighth aspect of the present invention, an operation to read or write information from or on the desired ratio-tag circuit element is performed such that the access information generated by the access-information generating portion is transmitted from the directional antenna of the RFID tag reader/writer to the IC circuit portion through the tag-side antenna of the RFID tag circuit element, in a non-contact fashion. The RFID tag circuit-element holding portion which defines the accessible area is spaced from the directional antenna having a directivity in a predetermined one direction, in the direction of directivity of the directional antenna, while the shielding portion is spaced from the RFID tag circuit-element holding portion in the direction of directivity of the directional antenna, so that a component of the communication signal radiating in the direction of directivity is blocked by the shielding portion. Further, the RFID tag circuit-element accommodating portion accommodating the plurality of RFID tag circuit elements is spaced from the shielding portion preventing leakage of the communication signal, in the direction of directivity of the directional antenna. In this arrangement, a sensitivity of the directional antenna with respect to the RFID tag circuit element held in the accessible area is relatively high so that an intensity of the radio communication signal is relatively high, while the sensitivity of the directional antenna with respect to each RFID tag circuit element accommodated in the RFID tag circuit-element accommodating portion is relatively low so that the intensity of the radio communication signal is relatively low. Accordingly, the RFID tag reader/writer is not communicable with each RFID tag circuit element accommodated in the RFID tag circuit-element accommodating portion, and can obtain access to the RFID tag information of the IC circuit portion of only the RFID tag circuit element which has been taken out from the RFID tag circuit-element accommodating portion and which is currently held by the RFID tag circuit-element holding portion. Therefore, even when a radio frequency in the UHF band is used for communication, the RFID tag reader/writer can read or write the RFID tag information from or on the IC circuit portion of only the RFID tag circuit element desired to be accessed for information reading, with a simple arrangement and in a simple manner, without the provision of a conventionally required shielding means, or without reduction of the signal output or without the provision of specific communication means for identification of individual RFID tag circuit elements. Namely, the directional antenna has a relatively high sensitivity with respect to the RFID tag circuit element held in the accessible area, resulting in a relatively high intensity of the radio communication signal, but has a relatively low sensitivity with respect to the RFID tag circuit elements accommodated in the RFID tag circuit-element accommodating portion or existing at the outlet, resulting in a relatively low intensity of the radio communication signal. Therefore, the use of the radio frequency in the UHF band permits easy reading or writing of the RFID tag information from or on only the RFID tag circuit element desired to be accessed for information reading or writing, with a simple arrangement, without the provision of a shielding means, or without reduction of the signal output or without the provision of specific communication means for identification of the individual RFID tag circuit elements.

In one preferred arrangement of the eighth aspect of the invention, a spacing distance between the shielding portion and the holding portion is larger than a spacing distance between the directional antenna and the holding portion. This arrangement reduces an influence of the shielding portion on the RFID tag circuit element desired to be accessed for information reading or writing, thereby assuring stable communication with that RFID tag circuit element.

In another preferred arrangement of the eighth aspect of the invention, the directional antenna is a micro strip antenna which is provided with a micro strip antenna element on one of opposite sides thereof, and a base plate on the other of the opposite sides. This arrangement makes it possible to reduce the size of the RFID tag reader/writer. The micro strip antenna provided with the micro strip antenna element and the base plate has a higher directivity in the direction on the side of the micro strip antenna element, so that it is possible to read or write the RFID tag information from or on only the RFID tag circuit element desired to be accessed for information reading or writing.

In another preferred arrangement of the eighth aspect of the invention, the RFID tag circuit-element holding portion is disposed on the side of the micro strip antenna element, while a reflecting plate for reflecting the communication signal is disposed on the side of the base plate. In this arrangement, the RFID tag circuit-element holding portion is disposed on the side of the micro strip antenna element, that is, spaced from the micro strip antenna element in its direction of directivity, while the reflecting plate is disposed on the side of the base plate, that is, spaced from the base plate in the direction opposite to the direction of directivity. The present arrangement permits reading of the RFID tag information from the RFID tag circuit element desired to be accessed for information reading, on the side of the micro strip antenna element, while preventing leakage of the communication signal beyond the base plate opposite to the micro strip antenna element, into the exterior of the RFID tag reader/writer.

In another preferred arrangement of the eighth aspect of the invention, a dimension of the micro strip antenna element in a longitudinal direction of the tag-side antenna of the RFID tag circuit element held in the accessible area is smaller than a dimension of the tag-side antenna in the longitudinal direction. When a communication signal is transmitted and received between the micro strip antenna element and the tag-side antenna of the RFID tag circuit element are located close to each other, a radiation of the communication signal in the direction of directivity of the micro strip antenna element from a portion of the micro strip antenna element which is outside the longitudinal dimension of the tag-side antenna is unlikely to be received by the tag-side antenna. In view of this fact, the longitudinal dimension of the micro strip antenna element is made smaller than the longitudinal dimension of the tag-side antenna, so that the information can be transmitted and received between the directional antenna and the tag-side antenna, with high efficiency.

In another preferred arrangement of the eighth aspect of the invention, the RFID tag circuit-element accommodating portion is removably installed on a main body of the RFID tag reader/writer, and the shielding portion is disposed on the main body of the RFID tag reader/writer. If the shielding plate were attached to the RFID tag circuit-element accommodating portion which is removably installed on the main body of the RFID tag reader/writer, it would be necessary to attach the shielding plate to the RFID tag circuit-element accommodating portion each time the used RFID tag circuit-element accommodating portion is replaced with a new one. This arrangement would increase the cost of manufacture of the RFID tag reader/writer. According to the present arrangement, however, the shielding plate is disposed on the main body, to avoid the above-described drawback, namely, to reduce the cost of manufacture of the RFID tag reader/writer.

In another preferred arrangement of the eighth aspect of the invention, the RFID tag reader/writer has an outlet through which the RFID tag circuit element is fed out of the RFID tag reader/writer after the RFID tag information of the IC circuit portion has been accessed in the accessible area. In this arrangement, the RFID tag circuit element the IC circuit portion of which has been accessed to read or write the RFID tag information in the accessible area can be smoothly fed out of the RFID tag reader/writer.

In another preferred arrangement of the eighth aspect of the invention, the above-described outlet is spaced from the directional antenna in a direction substantially perpendicular to the direction of directivity. In this arrangement, the intensity of the communication signal received at the outlet from the directional antenna is relatively low, since the outlet is spaced from the directional antenna in the direction substantially perpendicular to the direction of directivity, so that the leakage of the communication signal into the exterior of the reader/writer can be reduced.

In another preferred arrangement of the eighth aspect of the invention, the above-described outlet is positioned such that the outlet is spaced from the directional antenna in a direction in which an electric field intensity of the directional antenna is lower by at least 10 dB than that in the direction of directivity of the directional antenna. In this arrangement wherein the electric field intensity at the outlet is lower by at least 10 dB than that at a position spaced from the directional antenna in the direction of directivity, the leakage of the communication signal into the exterior of the reader/writer can be reduced with increased stability.

In another preferred arrangement of the eighth aspect of the invention, the shielding portion is a planar member having a size larger than a surface area of projection of the RFID tag circuit-element accommodating portion as seen from the shielding portion. This arrangement is effective to prevent leakage of the communication signal beyond the base plate toward the RFID tag circuit-element accommodating portion, thereby increasing a shielding effect provided by the shielding plate.

In another preferred arrangement of the eighth aspect of the present invention, the shielding plate has side wall portions extending in a direction toward the RFID tag circuit-element accommodating portion and away from the micro strip antenna element. In this arrangement, the side wall portions of the shielding plate which cover the RFID tag circuit-element accommodating portion in its lateral direction are effective to prevent leakage of the communication signal beyond the shielding plate toward the RFID tag circuit-element accommodating portion, thereby increasing a shielding effect provided by the shielding portion.

In one preferred arrangement of the eighth aspect of the invention, the shielding portion is substantially U-shaped. In this arrangement, the side wall portions of the substantially U-shaped shielding plate cover the RFID tag circuit-element accommodating portion in its lateral direction, and prevent leakage of the communication signal beyond the shielding plate toward the RFID tag circuit-element accommodating portion, thereby increasing a shielding effect provided by the shielding plate.

BRIEF DESCRIPTION OF THE DRAWING

The above and other objects, features and industrial significance of this invention will be better understood by reading the following detailed description of the preferred embodiments of the invention, when considered in connection with the accompanying drawings in which:

FIG. 20 is a view indicating kinds of commands determined by a command determining routine of FIG. 19;

DETAILED DESCRIPTION OF THE PREFERRED EMBODIMENTS

The preferred embodiments of the present invention will be described in detail by reference to the drawings.

Embodiment 1

Figure 1:
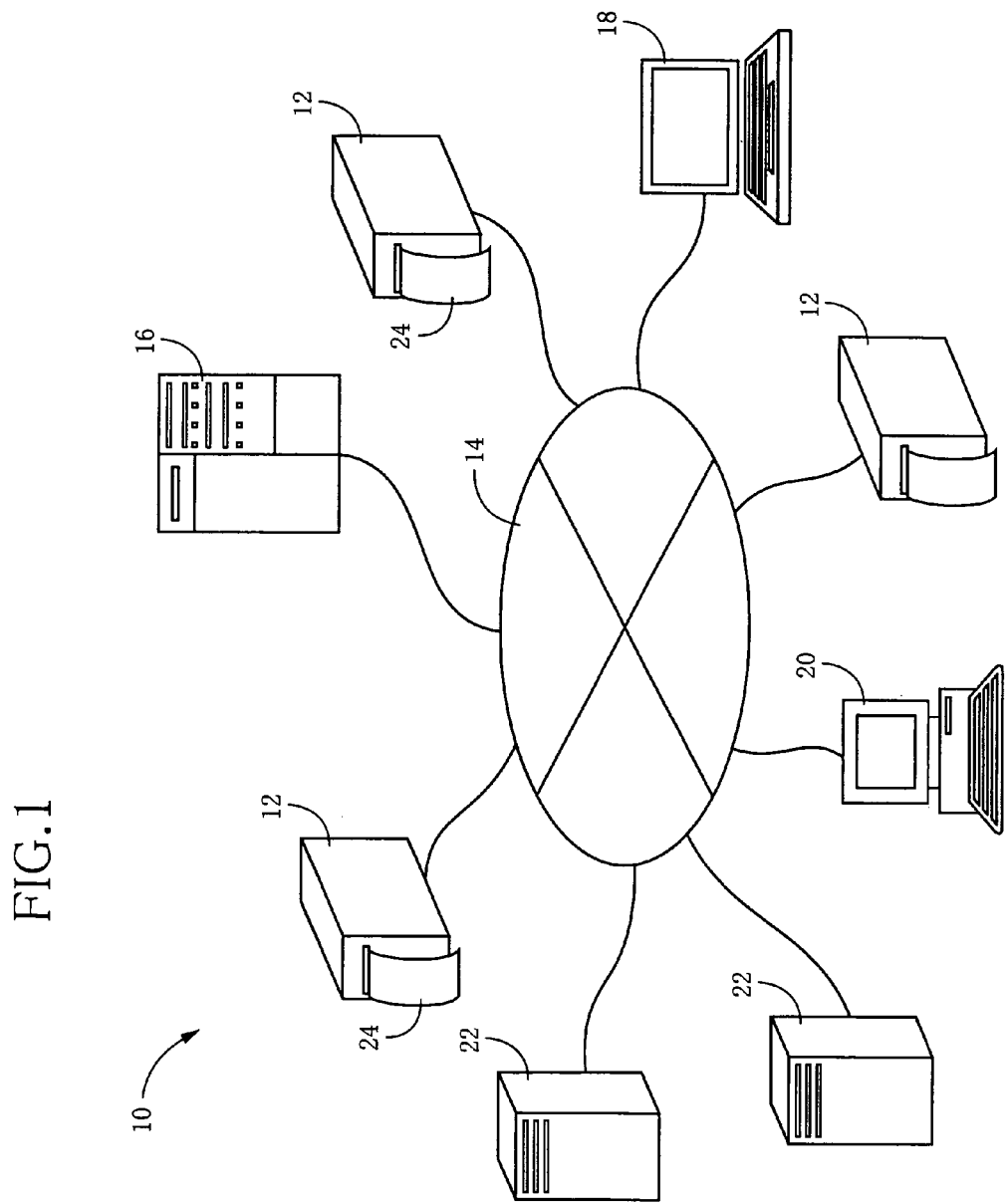
FIG. 1 is a view illustrating an RFID system to which the present invention is suitably applicable.

Referring to FIG. 1, there is illustrated an RFID system 10 to which the first through eighth aspects of this invention are suitably applicable. In this REID system 10, a plurality of RFID tag reader/writer devices 12 each constructed according to one embodiment of the present invention are connected to a route server 16, a terminal 18, a general-purpose computer 20, and a plurality of information servers 22, through a wire (cable) or wireless communication line 14. Each RFID tag reader/writer 12 is an RFID tag information communicating device arranged to effect at least one of an operation to write desired information on an RFID tag selected for communication therewith, and an operation to read desired information from the selected RFID tag.

Figure 2:
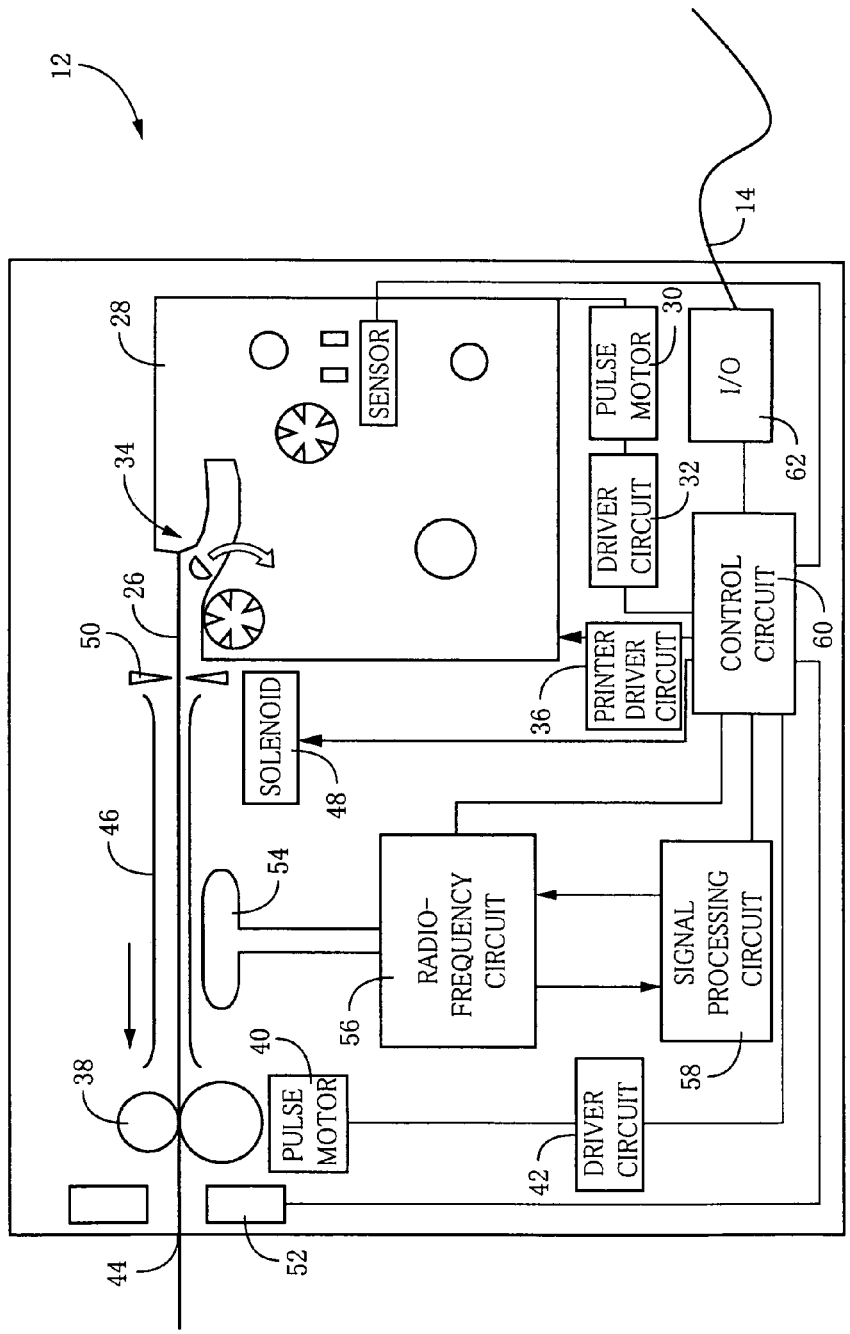
FIG. 2 is a view illustrating an RFID tag reader/writer according to a first embodiment of the present invention.

Referring to FIG. 2, there is illustrated an arrangement of the above-described RFID tag reader/writer 12. This RFID tag reader/writer 12 is arranged to produce RFID tags 24 shown in FIG. 4, in an instant, so as to meet a need of the user. For example, each RFID tag 24 is provided with printed letters, or desired writing ID and commodity information stored in an IC circuit portion 80, as described below. As described below, the RFID tag reader/writer 12 includes a removably installed cartridge 28 accommodating a covering film 86, an ink ribbon 98 and a substrate tape 92, which are used to produce a tag tape 26 that is a material for producing the RFID tags 24. The substrate tape 92 carries RFID tag circuit elements 24a in the form of strips which are spaced apart from each other at a predetermined spacing interval. Each RFID tag circuit element 24a consists of an antenna 64 and an IC circuit portion 80.

The RFID tag reader/writer 12 further includes: a cartridge-motor driver circuit 32 for driving a cartridge motor 30 to control a feeding movement of the tag tape 26 from the cartridge 28; a printer driver circuit 36 for driving a thermal head 34 to perform a printing operation on the tag tape 26; a feed roller 38 driven to feed the tag tape 26 in a direction indicated by arrow-headed line; a feed-roller driver circuit 42 for driving a feed-roller motor 40 to drive the feed roller 38; a feeding guide 46 for guiding the tag tape 26 to an outlet 44; a cutter 50 operated by a solenoid 48 to cut the tag tape 26 into the individual RFID tags 24 each having a predetermined length; a sensor 52 to detect the presence or absence of the tag tape 26 at the outlet 44; a transmission/reception antenna (device-side antenna) 54 for communication with the RFID tags 24; a radio-frequency circuit 56 for writing information on the RFID tag circuit elements 24a of the RFID tags 24 through the transmission/reception antenna 54; a signal processing circuit 58 for processing reply signals from the RFID tag circuit elements 24a and reading information from the RFID tag circuit elements 24a; and a control circuit 60 for controlling the above-described cartridge-motor driver circuit 32, printer driver circuit 36, feed-roller driver circuit 42, solenoid 48, radio-frequency circuit 56, signal processing circuit 58, etc., to control the operation of the RFID tag reader/writer 12. The control circuit 60 is connected to the above-described communication line 14 through an input/output interface 62.

Figure 3:
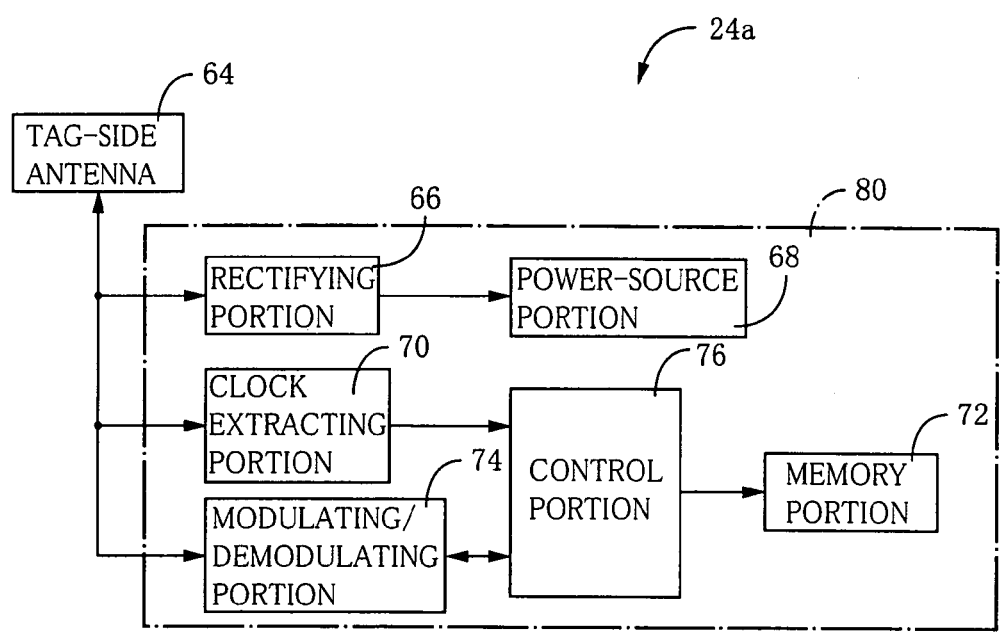
FIG. 3 is a plan view illustrating an RFID tag according to one embodiment of this invention.

Referring to FIG. 3, there is illustrated an arrangement of the above-described RFID tag circuit element 24a. As shown in FIG. 3, the RFID tag circuit element 24a includes: the tag-side antenna 64 for signal transmission and receptions to and from the transmission/reception antenna 54 of the RFID tag reader/writer 12, or an interrogator different from the RFID tag reader/writer 12; a rectifying portion 66 to rectify a carrier wave received by through the tag-side antenna 64; a power-source portion 68 for storing an energy of the carrier wave rectified by the rectifying portion 66; a clock extracting portion 70 for extracting a clock signal from the carrier wave received through the tag-side antenna 64 and applying the clock signal to a control portion 76; a memory portion 72 functioning as an information storing portion capable of storing desired information signals; a modulating/demodulating portion 74 connected to the above-described antenna 64; and the control portion 76 for controlling the above-described rectifying portion 66, clock extracting portion 70, modulating/demodulating portion, etc., to control the above-described ratio tag 24. The control portion 76 perform basic control operations such as a control operation to store the desired information in the memory portion 72 by communication with the RFID tag reader/writer 12, and a control operation to control the modulating/demodulating portion 74 for modulating the carrier wave received through the antenna 64 on the basis of the information signals stored in the memory portion 72, and transmitting a reply signal in the form of a reflected wave through the antenna 64. The above-described antenna 64 is a half-wave dipole antenna having a pair of linear elements.

Figure 4:
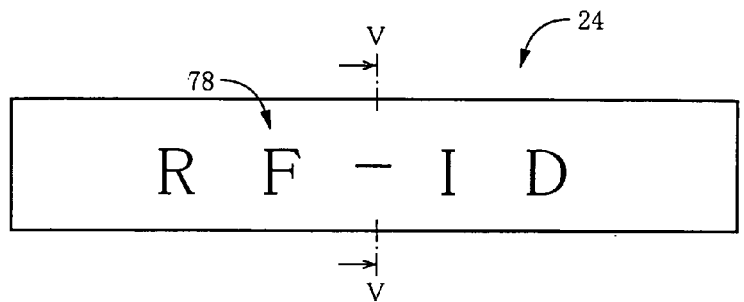
FIG. 4 is a plan view illustrating an outer appearance of the RFID tag of FIG. 3.
Figure 5:
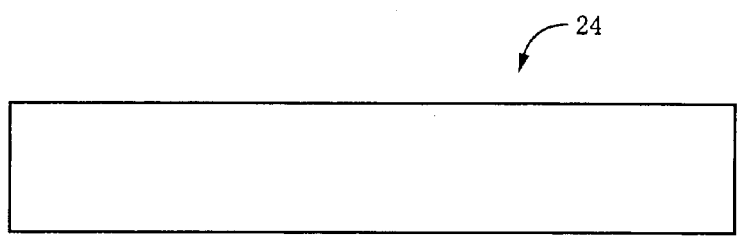
FIG. 5 is a bottom view illustrating the outer appearance of the RFID tag of FIG. 3.
Figure 6:
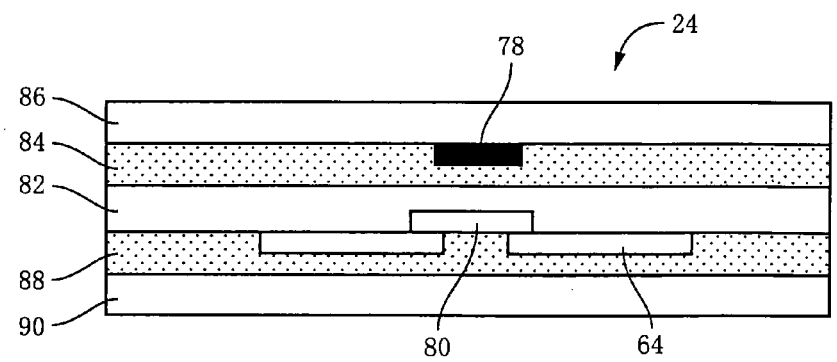
FIG. 6 is a cross sectional view taken along line V-V of FIG. 4.

Referring to the plan view of FIG. 4, there is illustrated an outer appearance of the RFID tag 24. FIG. 5 is the bottom view of the RFID tag 24. As shown in these views, the RFID tag 24 has a printing 78 printed on one surface (front surface) thereof, for example, "RF-ID" indicating the kind of the RFID tag 24. As shown in the cross sectional view of FIG. 6 taken along line V-V of FIG. 4, the IC circuit portion 80 including the rectifying portion 66, clock extracting portion 70, memory portion 72, modulating/demodulating portion 74, control portion 76, etc. is formed integrally with a colored base film 82 formed of PET (polyethylene terephthalate), and the antenna 64 is formed by printing, for instance, on a surface of the base film 82. A transparent covering film 86 is bonded to the front surface of the base film 82 through an adhesive layer 84, while a releasing paper layer 90 is bonded to the back surface of the base film 82 through an adhesive layer 88. The above-described printing 78 is printed on the back surface of the covering film 86, that is, on the surface on the side of the adhesive layer 84. When the RFID tag 24 is bonded to a desired article of commodity, the releasing paper layer 80 is removed, and the rest of the RFID tag 24 is bonded to the article through the adhesive layer 88.

Figure 7:
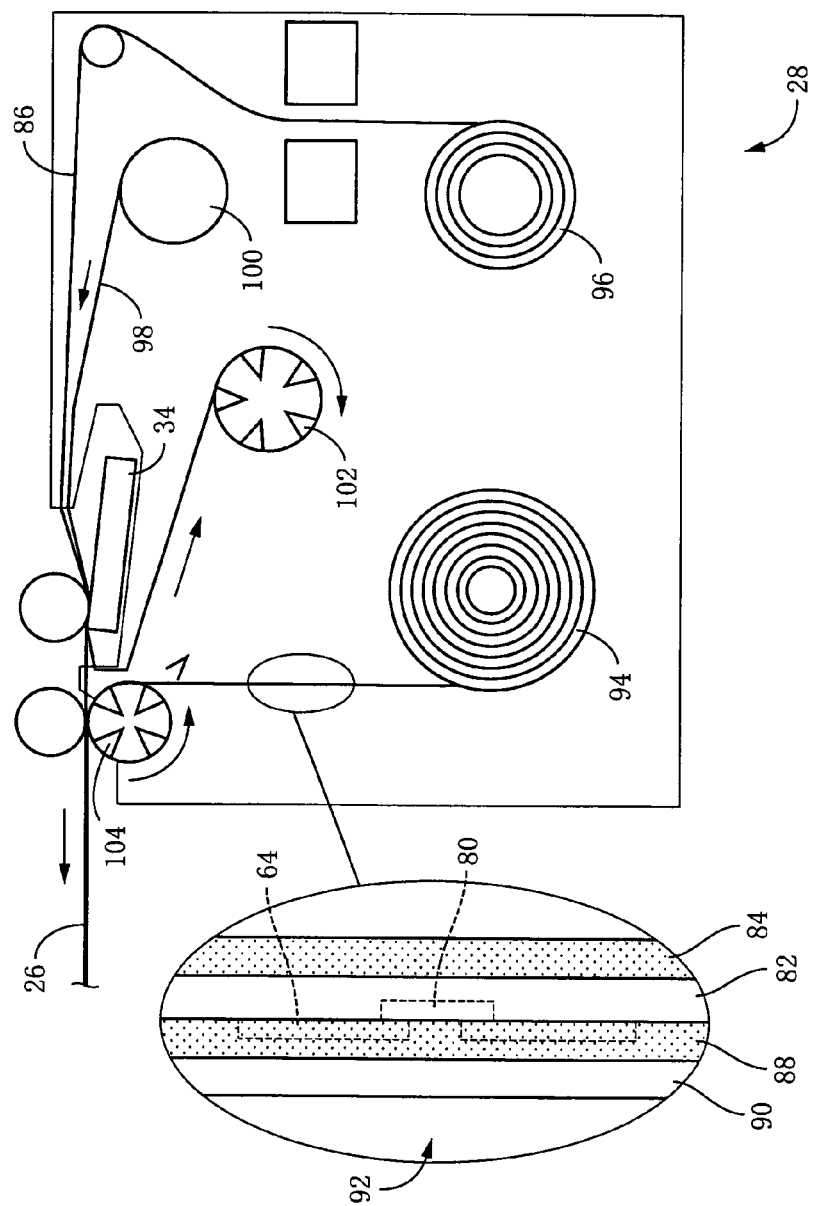
FIG. 7 is a view showing in detail a structural arrangement of a cartridge shown in FIG. 2.

Referring to FIG. 7, there is shown in detail an arrangement of the cartridge 28. This cartridge 28 includes: a first roll 94 holding a roll of the substrate tape 92 having a succession of the strips each including the above-described antenna 64 and IC circuit portion 80, as shown in enlargement; a second roll 96 holding a roll of the covering film 86 having the same width as the substrate tape 92; an ink-ribbon roll 100 holding a roll of the above-described ink ribbon 98; a take-up roller 102 for winding the ink ribbon 98; and a pressure roller 104 for pressing the substrate tape 92 and the covering film 86 onto each other for bonding them together, and feeding them in the direction indicated by the arrow-headed line. Those rolls 94, 96, 100 and rollers 102, 104 are rotatable about their axes. The ink-ribbon roll 100 and the take-up roller 102 are disposed on the back side of the covering film 86, that is, on the side of the back surface of the covering film 86 to be bonded to the substrate tape 92. The ink ribbon 98 is forced onto the thermal head 34 disposed in the main body of the RFID tag reader/writer 12, such that the ink ribbon 98 is held in contact with the back surface of the covering film 86.

To produce the tag tape 26, the take-up roller 102 and the pressure roller 104 are rotated by the cartridge motor 30, in the direction indicated by the arrow-headed line, in synchronization with each other. At this time, a plurality of heat generating elements provided on the thermal head 34 are energized by the printer driver circuit 36, so that the desired letters, symbols or bar code is/are printed on the back surface of the covering film 86 which is to be bonded to the substrate tape 92. The printed covering film 86 is bonded to the substrate tape 92 by the pressure roller 104, whereby the tag tape 26 is produced. Desired information is written on each of the IC circuit portions 80 formed on the tag tape 26, by the control of the radio-frequency circuit 56, etc., and the tag tape 26 is then cut by the cutter 54, into the individual RFID tags 24 each having the predetermined length.

Figure 8:
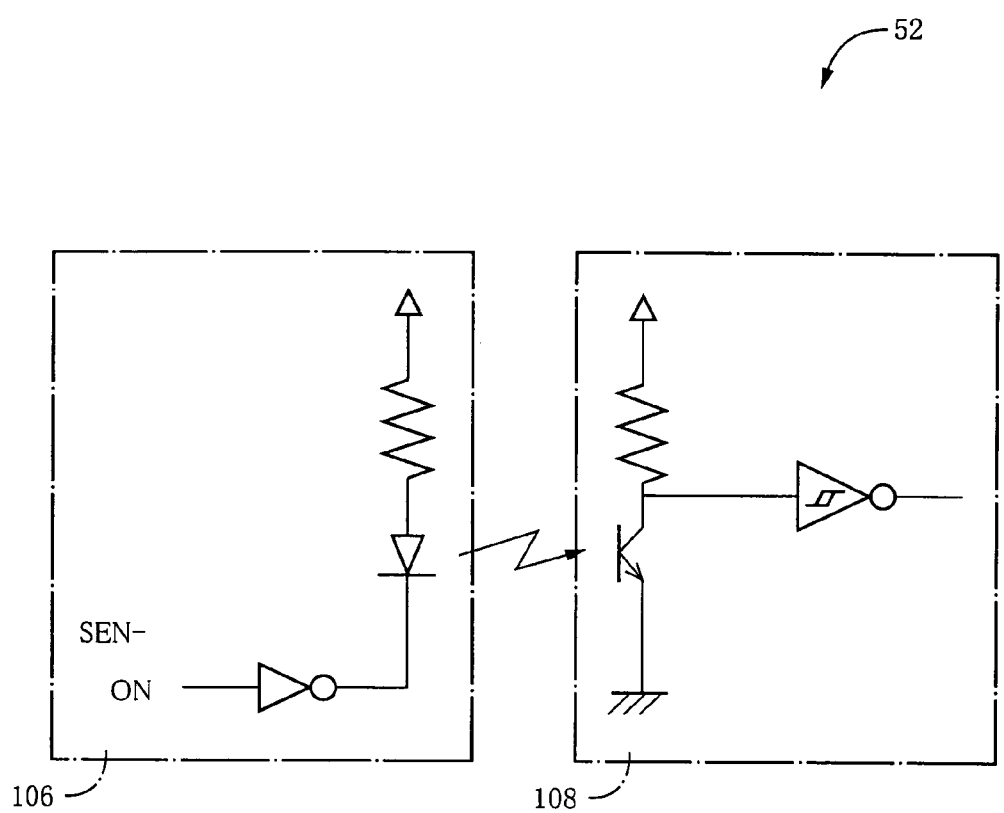
FIG. 8 is a view illustrating an electrical arrangement of a sensor shown in FIG. 2.

Referring to FIG. 8, there is illustrated an electrical arrangement of the above-described sensor 52. As shown in FIG. 8, the sensor 52 is a light-transmission type photoelectric sensor consisting of a light emitter 108 and a light receiver 108, for example. When the tag tape 26 or RFID tag 24 is not present between the light emitter 106 and light receiver 108, a light emitted from the light emitter 106 is received by the light receiver. When the tag tape 26 or RFID tag 24 is present between the light emitter and receiver 106, 108, on the other hand, the light emitted from the light emitter 106 is intercepted by the tag tape 26 or RFID tag 24, so that the output of the light receiver 108 is reversed.

Figure 9:
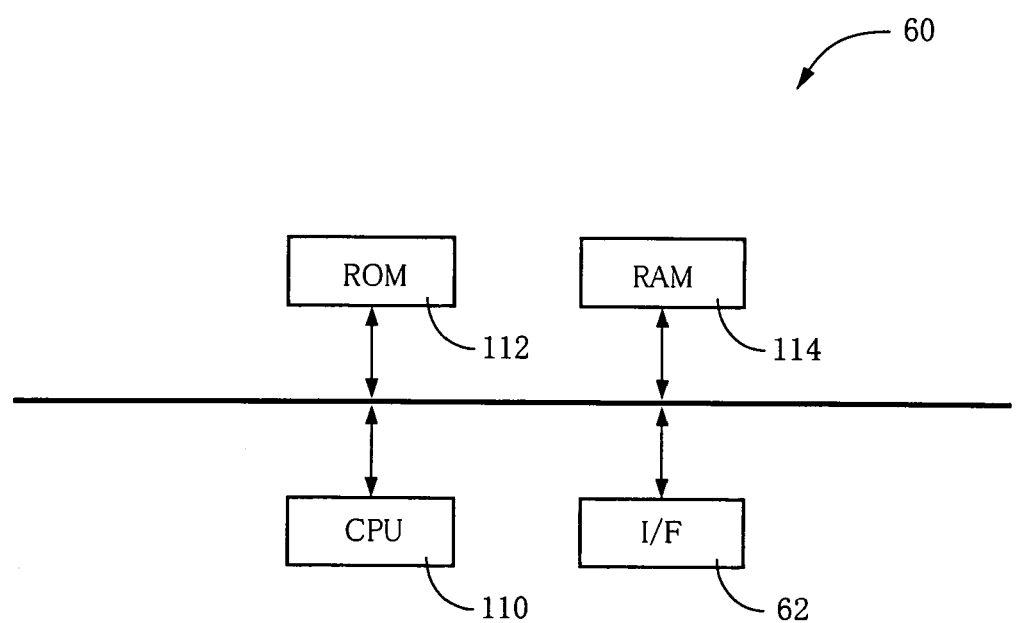
FIG. 9 is a view illustrating an arrangement of a control circuit shown in FIG. 2.
Figure 10:
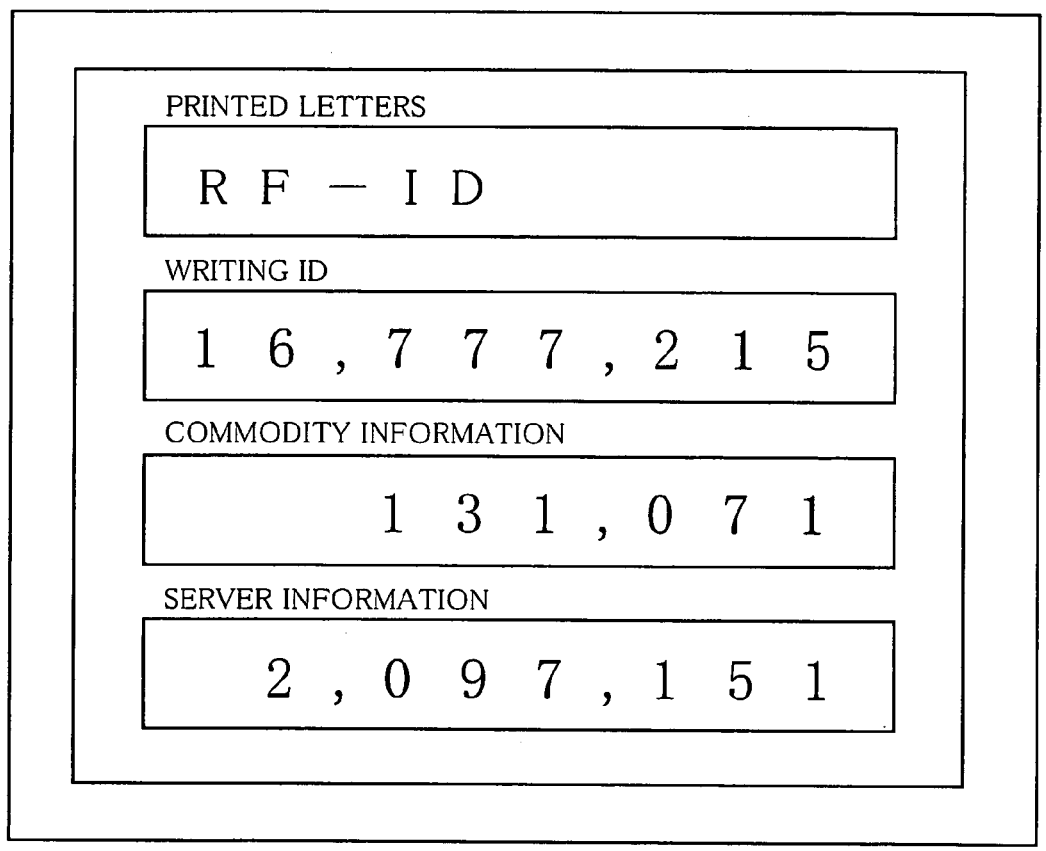
FIG. 10 is a view showing an example of a display view provided on a terminal or general-purpose computer shown in FIG. 1, when information is written on the RFID tag by the RFID tag reader/writer of FIG. 2.

Referring to FIG. 9, there is illustrated an arrangement of the control circuit 60. As shown in FIG. 9, the control circuit 60 is a so-called microcomputer which incorporates a CPU 110 functioning as a central processing unit, a ROM (read-only memory) 112, and a RAM (random-access memory) 114 and which operates to perform signal processing operations according to programs stored in the ROM 112, while utilizing a temporary data storage function of the RAM 114. The control circuit 60 is connected to the above-described communication line 14 through the input/output interface 62, for transmission and reception of information to and from the above-described route server 16, terminal 18, general-purpose computer 20 and information servers 22. FIG. 10 shows an example of a display view provided on the above-described terminal 18 or general-purpose computer 20 when information is written on the RFID tag 24 by the RFID tag reader/writer 12. As shown in FIG. 10, the terminal 18 or general-purpose computer 20 is capable of displaying the printed letters to be printed on the RFID tag 24, writing ID specific to that RFID tag 24, and addresses of the information servers 22 at which the commodity information is stored, and addresses of the route server 16 at which server information is stored. By manipulating the terminal 18 or general-purpose computer 20, the RFID tag reader/writer 12 is operated to print the letters on the covering film 86, and store the writing ID, commodity information, etc. on the IC circuit portion 80. The route serve 16 stores data indicative of a relationship between the ID of each RFID tag 24 and the information written on the RFID tag 24. Reference to this relationship can be made as needed.

Figure 11:
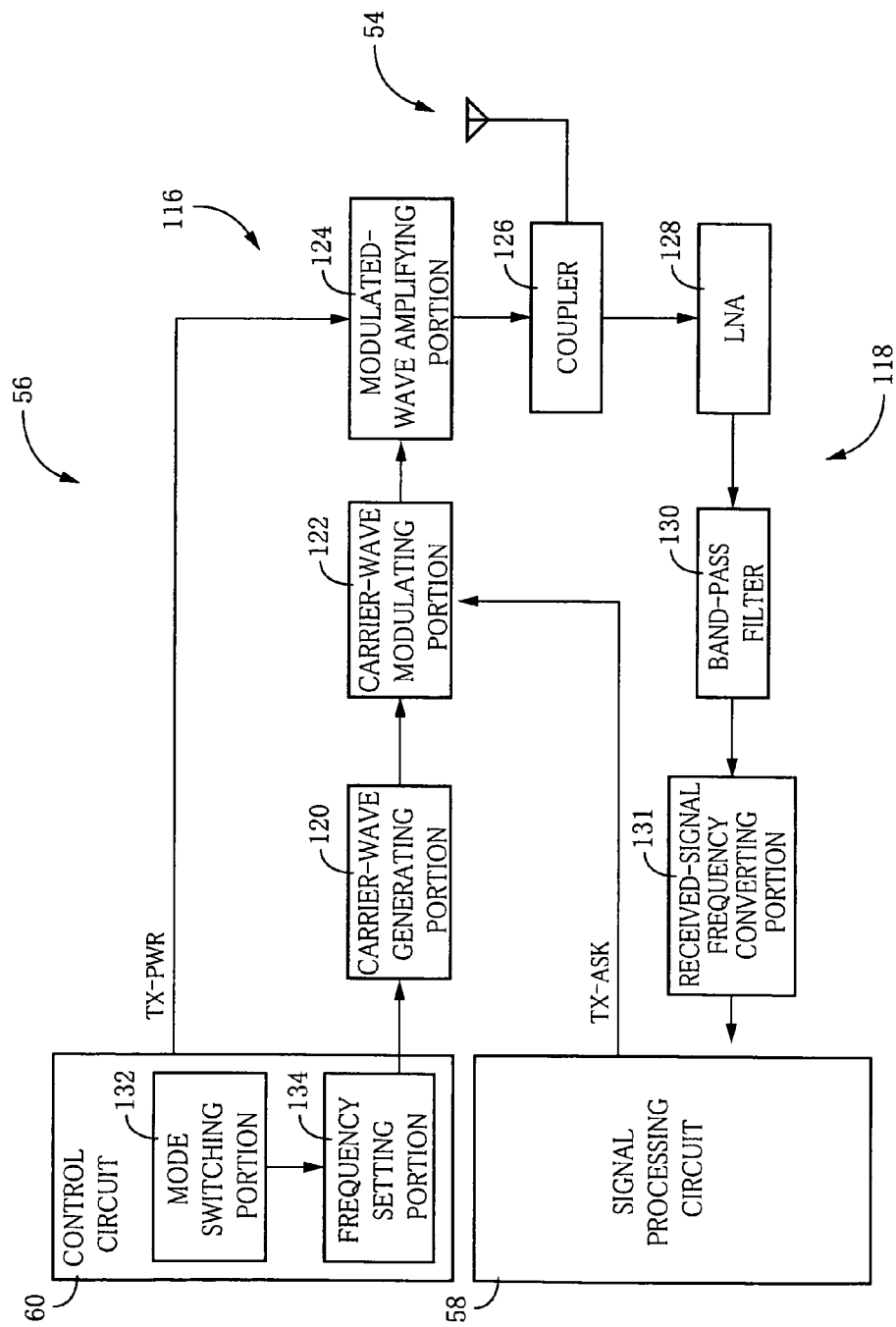
FIG. 11 is a view showing in detail a radio-frequency circuit shown in FIG. 2.

Referring to FIG. 11, there is shown in detail an arrangement of the radio-frequency circuit 56. As shown in FIG. 11, the radio-frequency circuit 56 includes a transmitting portion 116 operable to transmit a suitable signal to the RFID tag circuit element 24a, and a receiving portion 118 operable to receive a reflected wave from the RFID tag 24. The transmitting portion 116 includes: a carrier-wave generating portion 120 operable to generate a carrier wave for writing information on the RFID tag 24; a carrier-wave modulating portion 122 operable to modulate the carrier wave generated by the carrier-wave generating portion 120, on the basis of an information signal received from the signal processing portion 58 (for example, operable to effect amplitude modulation of the generated carrier wave on the basis of TX-ASK signal); and a modulated-wave amplifying portion 124 operable to amplify the carrier wave modulated by the carrier-wave modulating portion 122. An output of the modulated-wave amplifying portion 124 is transmitted to the above-described transmission/reception antenna 54 through a coupler 126, and transmitted from the antenna 54 to the IC circuit portion 80 through the antenna 64 of the RFID tag circuit element 24a.

The reflected wave received from the RFID tag circuit element 24a through the transmission/reception antenna 54 is received by the receiving portion 118 through the coupler 126. This receiving portion 118 includes: a LNA (low noise amp.) 128 operable to amplify the signal received from the transmission/reception antenna 54; a band-pass filter 130 which passes only a frequency component of the signal amplified by the LNA 128, which frequency component has a frequency within a predetermined frequency band; and a received-signal frequency converting portion 131 operable to effect frequency conversion of an output signal of the band-pass filter 130 into a signal that can be processed by the signal processing circuit 58. A output of the received-signal frequency converting portion 131 is input to the signal processing circuit 58, and demodulated by the signal processing circuit 58, so that the information relating to the modulation by the RFID tag circuit element 24a, that is, the information stored in the memory portion 72 is read out.

A mode switching portion 132 and a frequency setting portion 134, which are shown in FIG. 11, are functional portions of the above-described control circuit 60. The mode switching portion 132 is operable to switch the radio-frequency circuit 56 between a nearby communication mode for communication with only the RFID tag circuit element or elements 24a located within a predetermined nearby communication area, and a far communication mode for communication with the RFID tag circuit element or elements 24a located outside the nearby communication area. The frequency setting portion 134 is operable to set the frequency of the carrier wave generated by the carrier-wave generating portion 120 of the radio-frequency circuit 56 in the nearby communication mode, and the frequency of the carrier wave generated by the carrier-wave generating portion 120 of the radio-frequency circuit 56 in the far communication mode, such that those frequencies are different from each other.

Figure 12:
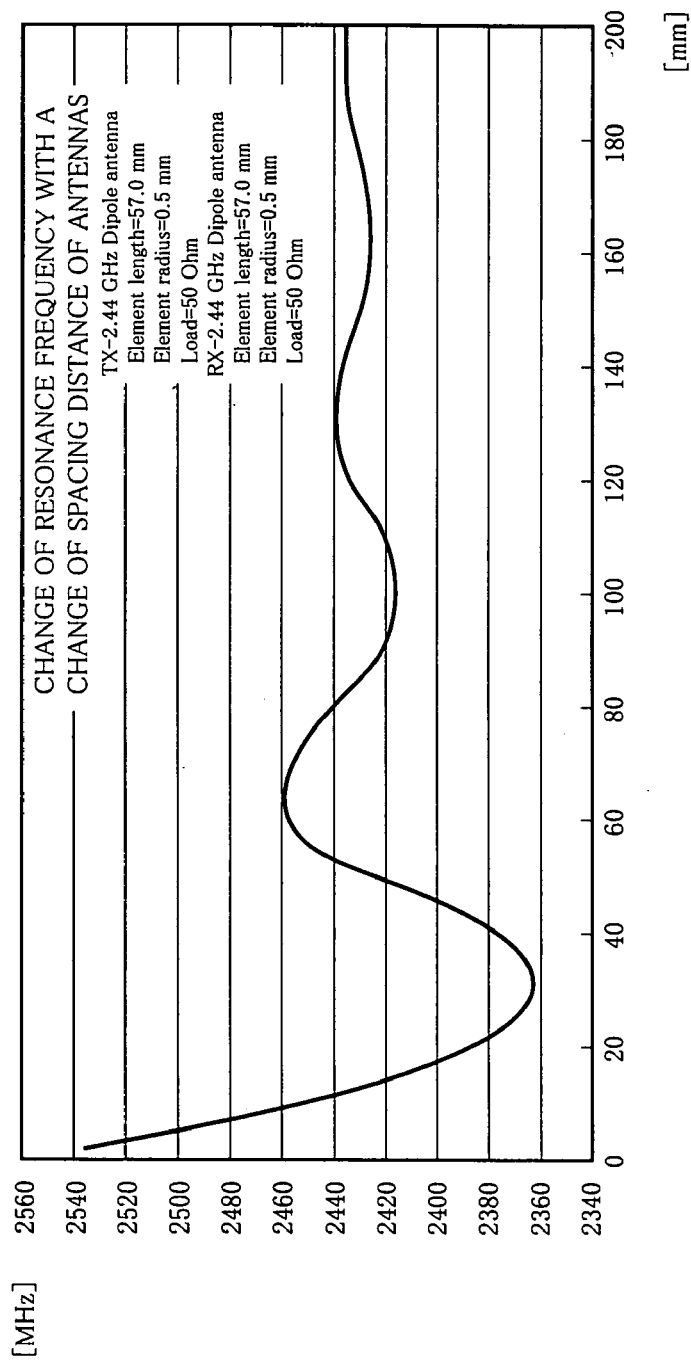
FIG. 12 is a view indicating a change of a resonance frequency with a change of a distance between a transmission/reception antenna of the RFID tag reader/writer of FIG. 2 and an antenna of the RFID tag of FIG. 3, where each of those antennas is a half-wave dipole antenna having linear elements with a length of 57.0 mm, a cross sectional radius of 0.5 mm, a resistance of 50Ω and a resonance frequency of 2.44 GHz.

FIG. 12 indicates a change of the resonance frequency with a change of a spacing distance between the transmission/reception antenna 54 of the RFID tag reader/writer 12 and the antenna 64 of the RFID tag circuit element 24a, where each of those antennas is a half-wave dipole antenna having linear elements with a length of 57.00 mm, a cross sectional radius of 0.5 mm, a resistance of 50Ω, and a free-space resonance frequency of 2.44 GHz. The frequency of the carrier wave normally generated by the radio-frequency circuit 56, that is, an ideal carrier wave (hereinafter referred to as "basic carrier wave") upon communication without a change of the resonance frequency due to mutual coupling is about 2.44 GHz. This basic carrier wave has a wavelength of about 123 mm. As shown in FIG. 12, the resonance frequency changes with a change of the spacing distance between the transmission/reception antenna 54 of the RFID tag reader/writer 12 and the antenna 64 of the RFID tag circuit element 24a, at an interval of about 62 mm which is one half of the wavelength of the basic carrier wave. The resonance frequency has a maximal value when the spacing distance is equal to one half of the wavelength (equal to about 62 mm). Where the spacing distance between the antenna 54 of the RFID tag reader/writer 12 and the antenna 64 of the RFID tag circuit element 24a is not larger than about one tenth of the wavelength of the basic carrier wave (about 12 mm), which is smaller than one half of the wavelength, the resonance frequency is higher than the maximal value indicated above. Like FIG. 12, FIG. 13 indicates a change of the resonance frequency with a change of the spacing distance between the transmission/reception antenna 54 of the RFID tag reader/writer 12 and the antenna 64 of the RFID tag circuit element 24a, where each of those antennas is a full-wave dipole antenna having linear elements with a length of 114.00 mm, a cross sectional radius of 0.5 mm, a resistance of 50Ω, and a resonance frequency of 2.44 GHz. In this case, too, the resonance frequency changes at an interval of about 62 mm which is one half of the wavelength of the basic carrier wave, and the resonance frequency has a maximal value when the spacing distance between the antenna 54 of the RFID tag reader/writer 12 and the antenna 64 of the RFID tag 24 is equal to one half of the wavelength (equal to about 62 mm). Where the spacing distance is not larger than about one tenth of the wavelength of the basic carrier wave (about 12 mm), which is smaller than one half of the wavelength, the resonance frequency is higher than the maximal value indicated above.

The above-described frequency setting portion 134 is preferably arranged to set the frequency of the carrier wave generated by the carrier-wave generating portion 120 of the radio-frequency circuit 56 in the nearby communication mode, to be higher than the resonance frequency when the spacing distance between the transmission/reception antenna 54 of the RFID tag reader/writer 12 and the antenna 64 of the RFID tag circuit element 24a is equal to one half of the wavelength of the basic carrier wave, that is, 0.5 times the wavelength. The frequency setting portion 134 is preferably arranged to set the frequency of the carrier wave generated by the carrier-wave generating portion 120 of the radio-frequency circuit 56 in the far communication mode, to be equal to the frequency of the basic carrier wave. In this arrangement, the predetermined nearby communication area is set by setting the spacing distance between the antenna 54 of the RFID tag reader/writer 12 and the antenna 64 of the RFID tag circuit element 24a, to be not larger than one tenth of the wavelength of the basic carrier wave (not larger than about 12 mm), namely, not larger than 0.1 times the wavelength, and the predetermined far communication area is set by setting the spacing distance otherwise. The resonance frequency in the nearby communication area is higher than the resonance frequency where the spacing distance between the antenna 54 of the RFID tag reader/writer 12 and the antenna 64 of the RFID tag circuit element 24a is equal to one half of the wavelength of the basic carrier wave (equal to about 62 mm), so that in the nearby communication mode, the RFID tag circuit element or elements 24a located within the nearby communication area has/have a high degree of sensitivity, and the RFID tag circuit element or elements 24a located outside the nearby communication area has/have a low degree of sensitivity, whereby the RFID tag reader/writer 12 has a high degree of stability of communication with only the RFID tag element or elements 24a located within the nearby communication area.

Figure 13:
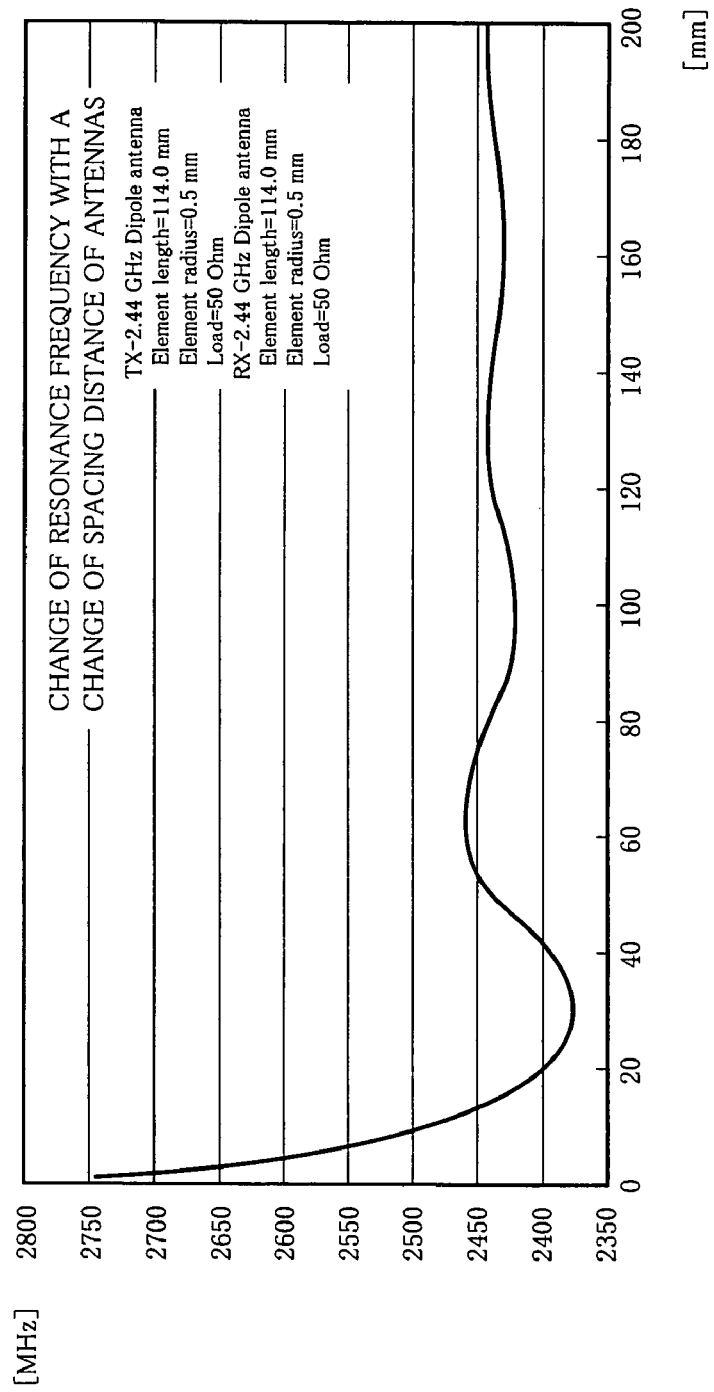
FIG. 13 is a view indicating a change of a resonance frequency with a change of the distance between the transmission/reception antenna of the RFID tag reader/writer of FIG. 2 and the antenna of the RFID tag of FIG. 3, where each of those antennas is a full-wave dipole antenna having linear elements with a length of 114.0 mm, a cross sectional radius of 0.5 mm, a resistance of 50Ω and a resonance frequency of 2.44 GHz.

It will be understood from FIGS. 12 and 13 that the resonance frequency is not smaller than 1.03 times the free-space resonance frequency of 2.44 GHz of the RFID tag 24, when the spacing distance between the transmission/reception antenna 54 of the RFID tag reader/writer 12 and the antenna 64 of the RFID tag circuit element 24a is not larger than one twentieth of the wavelength of the basic carrier wave (not larger than about 6 mm).

The frequency setting portion 134 is preferably arranged to set the frequency of the carrier wave generated by the carrier-wave generating portion 120 of the radio-frequency circuit 56, to the frequency which is at least 1.03 times the resonance frequency of the antenna 64 of the RFID tag circuit element 24a. In this arrangement, the predetermined nearby communication area is set by setting the spacing distance between the antenna 54 of the RFID tag reader/writer 12 and the antenna 64 of the RFID tag circuit element 24a, to be not larger than one twentieth of the wavelength of the basic carrier wave, namely, not larger than 0.05 times the wavelength, and the predetermined far communication area is set by setting the spacing distance otherwise. The RFID tag circuit element or elements 24a located within the nearby communication area has/have a high degree of sensitivity when the frequency of the carrier wave generated by the carrier-wave generating portion 120 of the radio-frequency circuit 56 is equal to 1.03 times the resonance frequency of the antenna 64 of the RFID tag 24, and the RFID tag circuit element or elements 24a located outside the nearby communication area has/have a low degree of sensitivity, so that the RFID tag reader/writer 12 has a high degree of stability of communication with only the RFID tag element or elements 24a located within the nearby communication area.

It will also be understood from FIGS. 12 and 13 that the resonance frequency is about 0.97 times the resonance frequency of 2.44 GHz of the antenna, and has a minimal value, when the spacing distance between the transmission/reception antenna 54 of the RFID tag reader/writer 12 and the antenna 64 of the RFID tag circuit element 24a is not smaller than two tenths of the wavelength of the basic carrier wave (not smaller than about 25 mm) and not larger than tree tenths of the wavelength (not larger than about 37 mm).

The above-described nearby communication area is preferably set by setting the frequency of the carrier wave generated by the carrier-wave generating portion 120 of the radio-frequency circuit 56, to a value within a range of the resonance frequency of the antenna 64 of the RFID tag circuit element 24a when the spacing distance between the antenna 54 of the RFID tag reader/writer 12 and the antenna 64 of the RFID tag circuit element 24a is within a range between not smaller than 0.2 times and not larger than 0.4 times the wavelength corresponding to the resonance frequency of the antenna 64. In this arrangement, the nearby communication area is set by setting the spacing distance between the antenna 54 of the RFID tag reader/writer 12 and the antenna 64 of the RFID tag circuit element 24*a*, to be within the range not smaller than 0.2 times and not larger than 0.4 times the wavelength corresponding to the resonance frequency of the antenna 64, and the far communication area is set by setting the spacing distance otherwise. Thus, the use of the frequency lower than the frequency of the basic carrier wave also permits the RFID tag circuit element 24*a* to have a high degree of sensitivity when the circuit element 24*a* is located in the nearby communication area, and a low degree of sensitivity when the circuit element 24*a* is located in the far communication area, so that the RFID tag reader/writer 12 has a high degree of stability of communication with only the RFID tag element or elements 24*a* located within the nearby communication area.

Then, there will be described an operation to write information on the RFID tag circuit element 24*a* in the FRID system 10 constructed as described above, and a preceding operation for preparation for the information writing operation.

Figure 14:
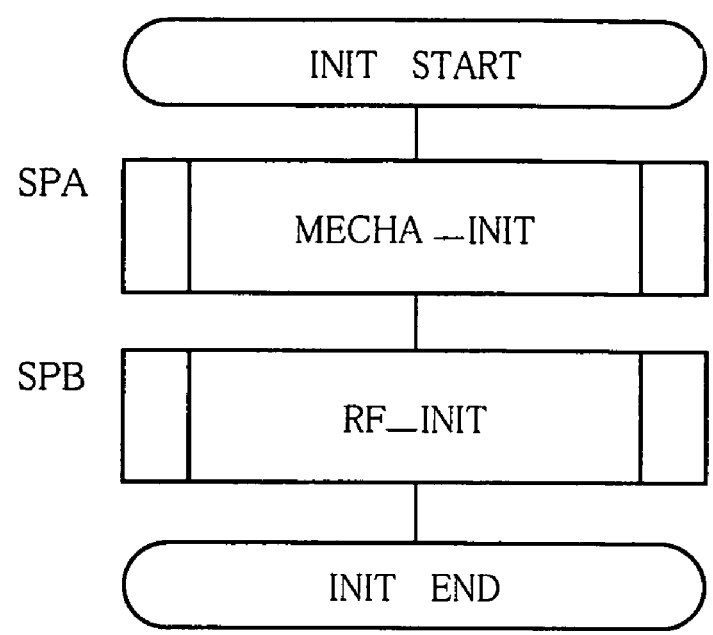
FIG. 14 is a flow chart illustrating an initializing operation of the RFID tag reader/writer of FIG. 2, which is performed before information is written on the RFID tag of FIG. 3 in the RFID system of FIG. 1.

Referring to the flow chart of FIG. 14, there will be described an initializing operation of the RFID tag reader/writer 12, which is performed prior to the operation to write information on the RFID tag circuit element 24*a* in the RFID system 10. Initially, step SPC (hereinafter the "step" will be omitted) is implemented to initialize mechanical information of the above-described RFID tag reader/writer 12. Then, SPB is implemented to initialize the settings of the carrier-wave generating portion 120, and the execution of the present routine is terminated.

Figure 15:
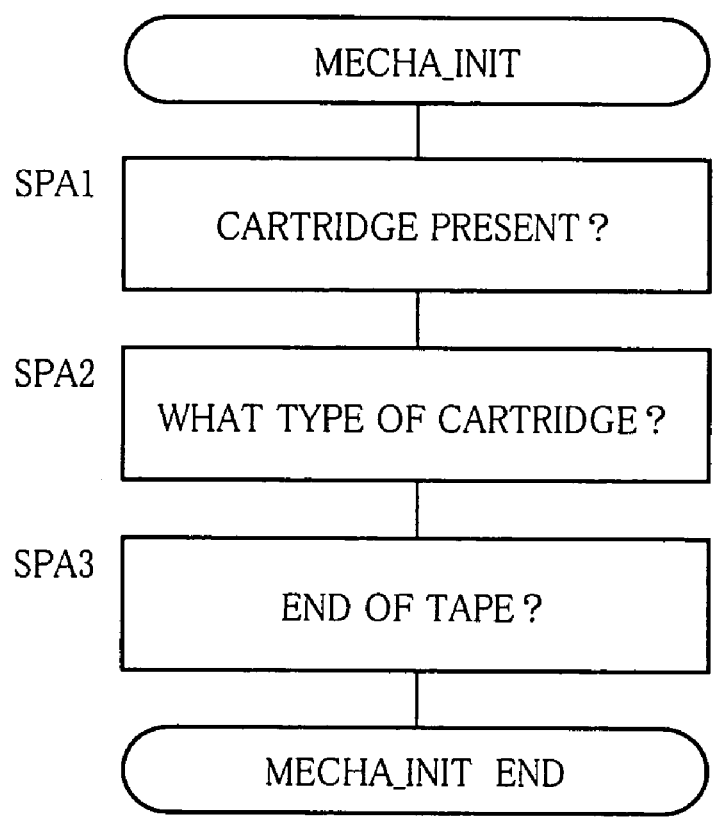
FIG. 15 is a flow chart illustrating initialization of mechanical information of the RFID tag reader/writer in step SPA of FIG. 14.

Referring to the flow chart of FIG. 15, there will be described the initializing operation of the mechanical information of the RFID tag reader/writer 12 in SPA of FIG. 14. Initially, SPA1 is implemented to determine whether the cartridge 28 is present or not. Then, SPA2 is implemented to determine the type of the cartridge 28, that is, check the width of the tag tape 26 and determine whether the FRID is present or not. Then, SPA3 is implemented to determine whether the tag tape 26 of the cartridge 28 has been exhausted, and the execution of the present routine is terminated.

Figure 16:
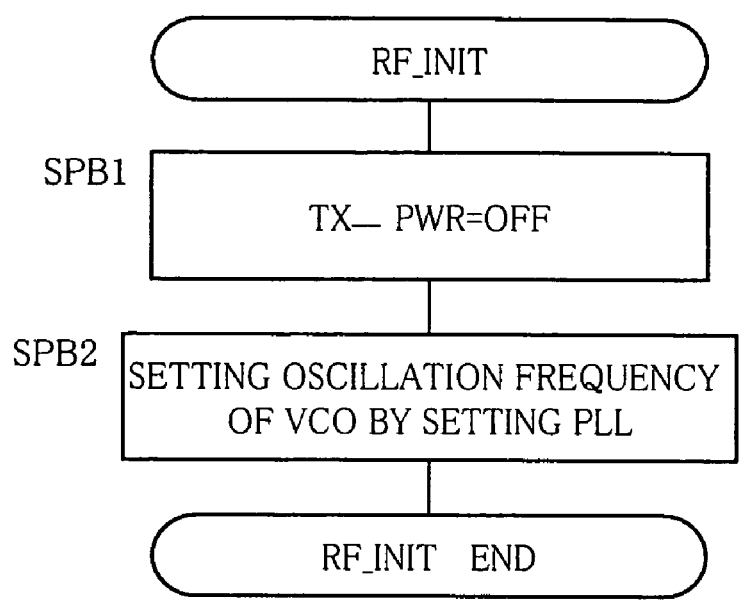
FIG. 16 is a flow chart illustrating a setting initializing operation of a carrier-wave generating portion provided in the radio-frequency circuit of the RFID tag reader/writer in step SPB of FIG. 14.

Referring to the flow chart of FIG. 16, there will be described a setting initializing operation of the carrier-wave generating portion 120 of the radio-frequency circuit 56 of the above-described ratio tag reader/writer 12 in SPB of FIG. 14. Initially, SPB1 is implemented to turn off a signal TX_PWR which is applied to the above-described modulated-wave amplifying portion 124 to set its signal intensity. Then, SPB2 is implemented to set the carrier wave frequency in PLL (Phase Locked Loop) provided in the carrier-wave generating portion 120, and lock the oscillation frequency of VCO (Voltage Controller Oscillator) also provided in the carrier-wave generating portion 120, by a control voltage from the PLL.

Figure 17:
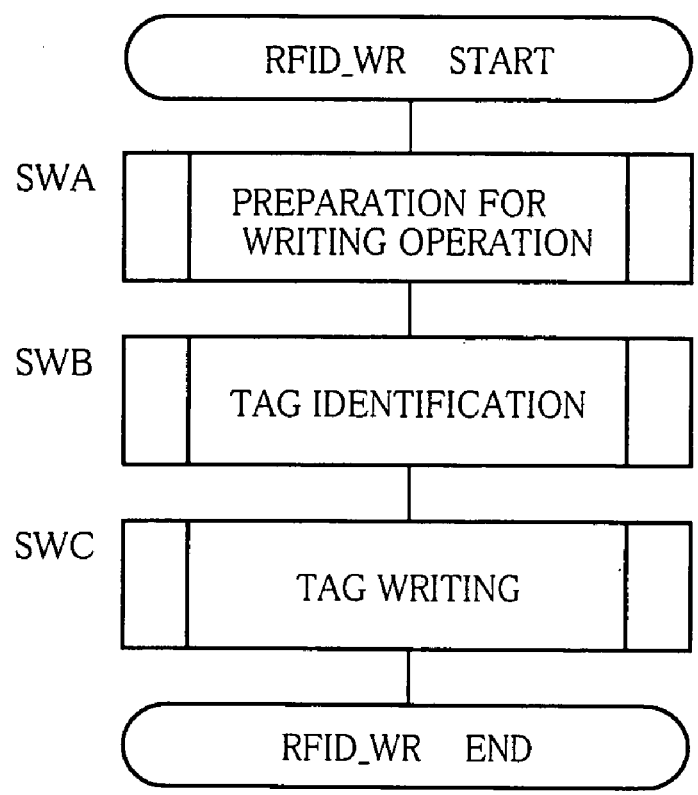
FIG. 17 is a flow chart illustrating an operation of the RFID tag reader/writer of FIG. 2 to write information on the RFID tag of FIG. 3.

Referring to the flow chart of FIG. 17, there will be described an operation of the RFID tag reader/writer 12 to write information on the RFID tag 24. Initially, SWA is implemented to prepare for an operation to write information on the RFID tag circuit element 24*a*. Then, SWB is implemented to identify the selected or desired RFID tag circuit element 24*a* on which the information is to be written. Then, SWC is implemented to write information on the RFID tag circuit element 24*a*, and the execution of the present routine is terminated.

Figure 18:
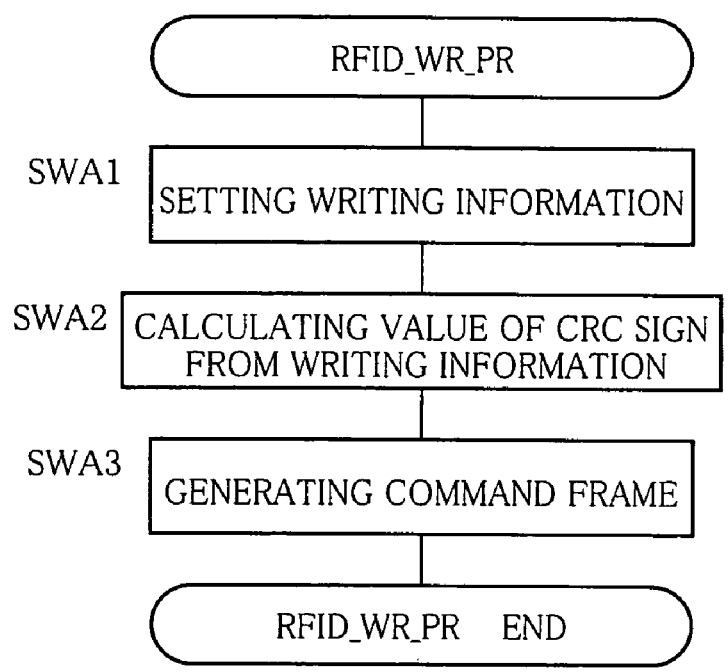
FIG. 18 is a flow chart illustrating an operation to prepare for information writing on the RFID tag in step SWA of FIG. 17.

Referring to the flow chart of FIG. 18, there will be described an operation to prepare for information writing on the RFID tag circuit element 24*a* in SWA of FIG. 17. Initially, SWA1 is implemented to set the information to be written on the RFID tag 24, such as writing ID and commodity information. A relationship between the writing ID and the commodity information is registered in the above-described information servers 22 through the communication line 14, before or after the information writing on the RFID tag circuit element 24*a*. Then, SWA2 is implemented to calculate a value of a CRC (Cyclic Redundancy Check) sign from the information set in SWA1. This CRC sign is a signal for detecting an error of communication with the RFID tag circuit element 24*a*, and its value is represented by a polynominal, for example, $X^{16}+X^{12}+X^5+1$. In the operation to identify the RFID tag circuit element 24*a*, the RFID tag reader/writer 12 calculates the value of the CRC sign from received data, and detect the communication error by comparing a received value of the CRC sign with the thus calculated CRC value. Then, SWA3 is implemented to generate a command frame on the basis of the information set in SWA1, and the execution of the present routine is terminated.

Referring to the flow chart of FIG. 19, there will be described an operation to generate modulating information for transmitting information to the RFID tag circuit element 24*a*. Initially, SWD1 is implemented to identify the desired RFID tag circuit element 24*a* on which the information is to be written, or to set a function of the information writing on the RFID tag circuit element 24*a*. Then, SWD2 is implemented to determine a command corresponding to the function set in SWD1. Then, SWD3 is implemented to generate a command frame on the basis of the command determined in SWD2, the writing information set in SWA1 of FIG. 18, and the CRC sign set in SWA2. Then, SWD4 is implemented to store the command frame generated in SWD3, in a memory buffer of the above-described control circuit 60. Then in SWD5, the modulating information in the form of a TX-ASK signal is generated by the signal processing circuit 58 on the basis of the command frame stored in the memory buffer.

Figure 19:
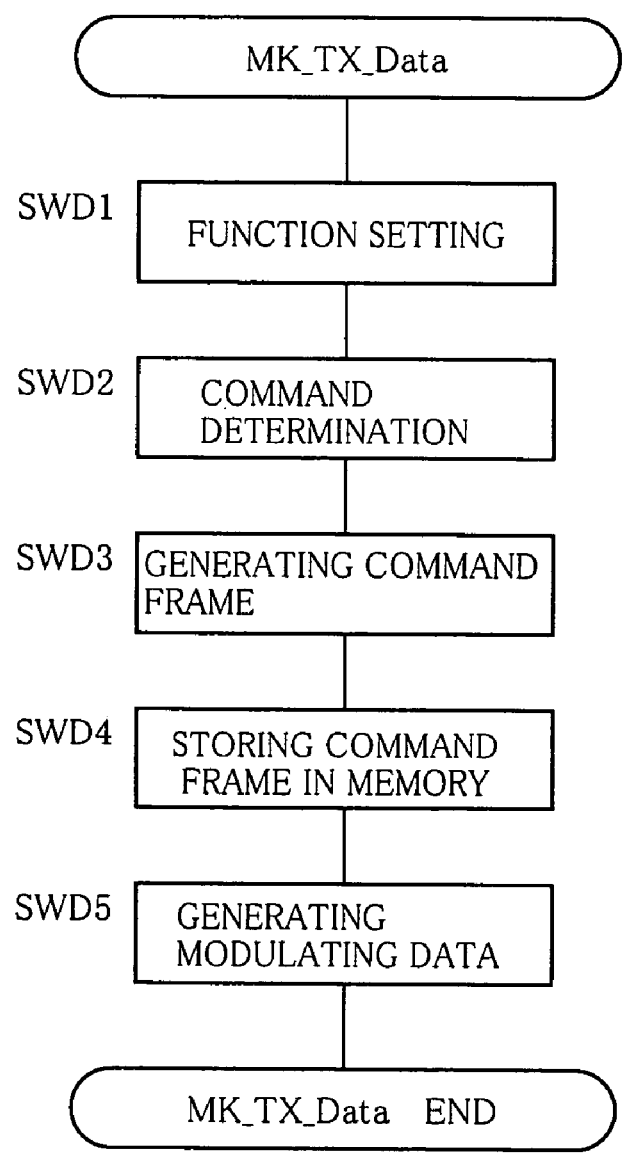
FIG. 19 is a flow chart illustrating generation of modulating information for transmitting information to the RFID tag of FIG. 3.

FIG. 20 indicates the kinds of commands determined by the command determining routine of FIG. 19. The communication to identify the desired RFID tag 24 on which the information is to be written uses commands such as "PING" and "SCROLL ID" for reading out the information stored in the RFID tag 24 are used. The communication to write the information on the RFID tag 24 uses commands such as "ERASE ID" for initializing the information stored in the RFID tag 24, "PROGRAM ID" for information writing, "VERIFY" for verifying the information written, and "LOCK" for inhibiting writing of new information.

Figure 21:
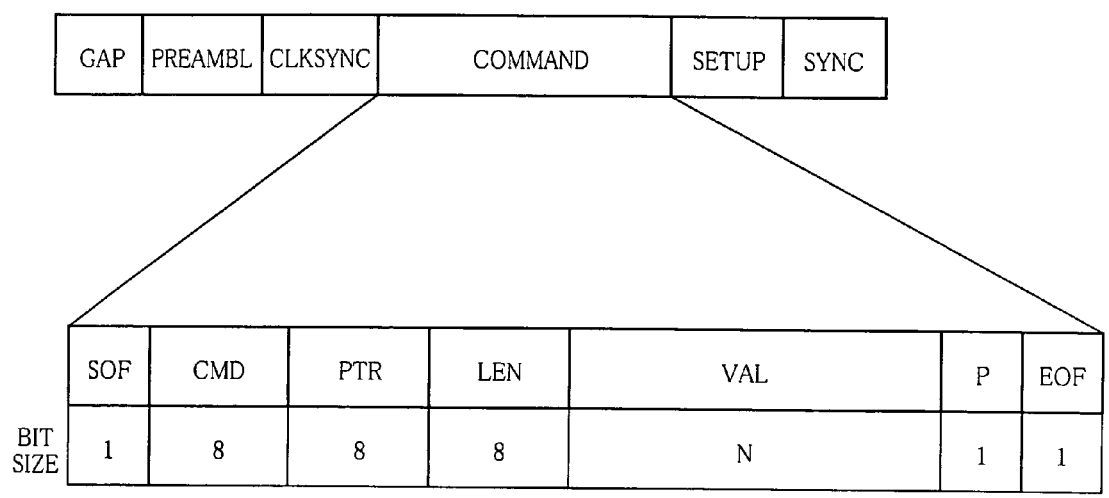
FIG. 21 is a view showing in detail a structure of a command frame of FIG. 19.

Referring to FIG. 21, there will be described in detail a structure of the command frame generated in SWD3 of FIG. 19. The above-described command frame uses unit time $T_0$ for transmission of one-bit information, and consists of "GAP" which is a $2T_0$ transmission power-off period, "PRE-AMBL" which is a $5T_0$ transmission power-on period, "CLKSYNC" for transmission of twenty "0" signals, "COMMAND" which are the contents of the commands, "SET UP" which is a $8T_0$ transmission power-on period, and "SYNC" for transmission of one "1" signal. The "COMMAND" which is interpreted by the tag consists of "SOF" indicating the start of the commands, "CMD" which are the commands indicated in FIG. 20, "PTR" which is a pointer specifying the memory address of the selected or desired RFID tag circuit element 24*a*, "LEN" which indicates the length of the information to be written, "VAL" which is the content of information to be written, "P" which is parity information of "PTR", "LEN" and "VAL", and "EOF" which indicates the end of the commands.

Figure 22:
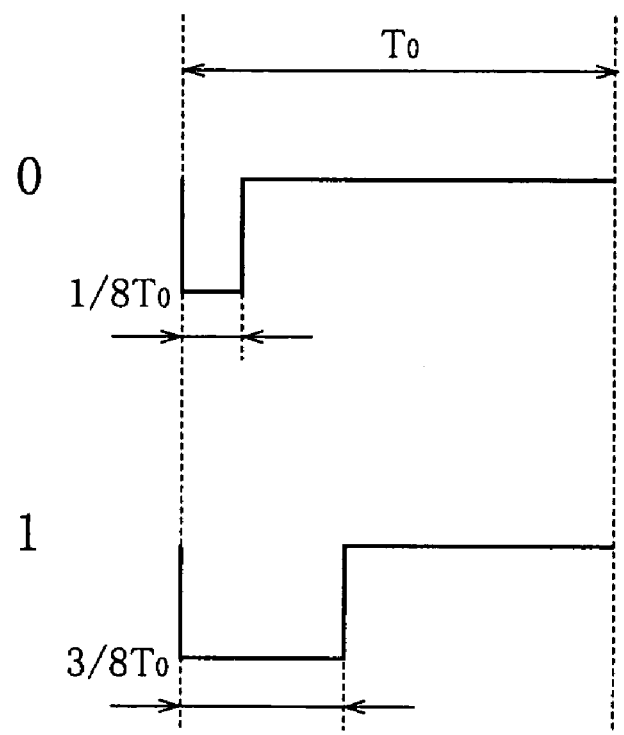
FIG. 22 is a view illustrating "0" signal and "1" signal which are elements of the command frame of FIG. 19.

The command frame described above is a series of elements consisting of the "0" and "1" signals indicated in FIG. 22, and the transmission power-on and power-off periods. For the operation to identify the desired RFID tag circuit element 24a on which the information is to be written, or the operation to write the information on the RFID tag circuit element 24a, the modulating information in the form of the TX-ASK signal on the basis of the command frame is supplied to the carrier-wave generating portion 122 of the radio-frequency circuit 56, and the carrier wave is subjected to ASK modulation by the carrier-wave modulating portion 122, so that the modulated carrier wave is transmitted to the RFID tag 24. The RFID tag circuit element 24a which receives the modulated carrier wave performs the information writing on the memory portion 72 and information replying operation, according to the commands.

Figure 23:
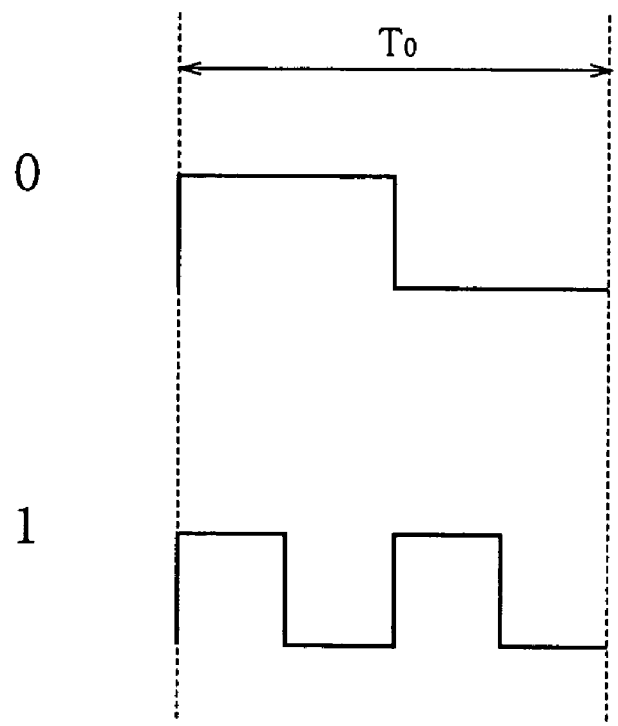
FIG. 23 is a view illustrating "0" signal and "1" signal used for generation of a reply signal transmitted from the RFID tag.
Figure 24:
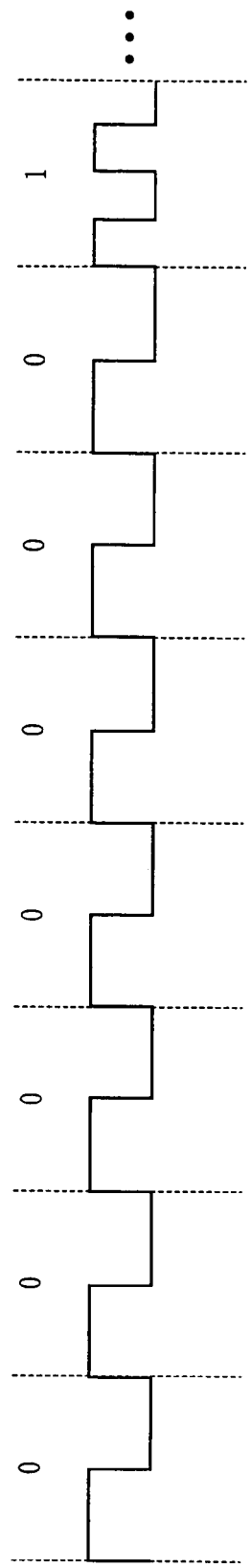
FIG. 24 is a view illustrating an example of an ID signal specific to the RFID tag of FIG. 3.

In the information replying operation of the RFID tag circuit element 24a, reply information discussed below in detail is constituted by a series of elements consisting of FKS-modulated "0" and "1" signals indicated in FIG. 23. On the basis of these signals, the carrier wave is reflection-modulated, and transmitted to the RFID tag reader/writer 12. In the operation to identify the desired RFID tag circuit element 24a, for instance, a reflected wave modulated according to an ID signal specific to the RFID tag circuit element 24a, which is shown in FIG. 24, is transmitted to the RFID tag reader/writer 12.

Figure 25:
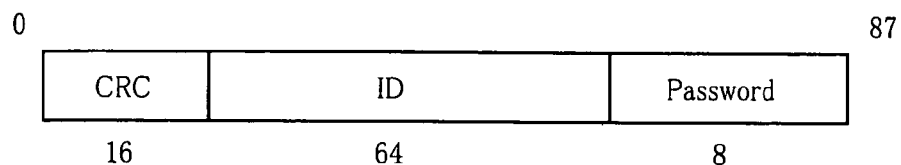
FIG. 25 is a view illustrating a memory structure of the RFID tag of FIG. 3.
Figure 26:
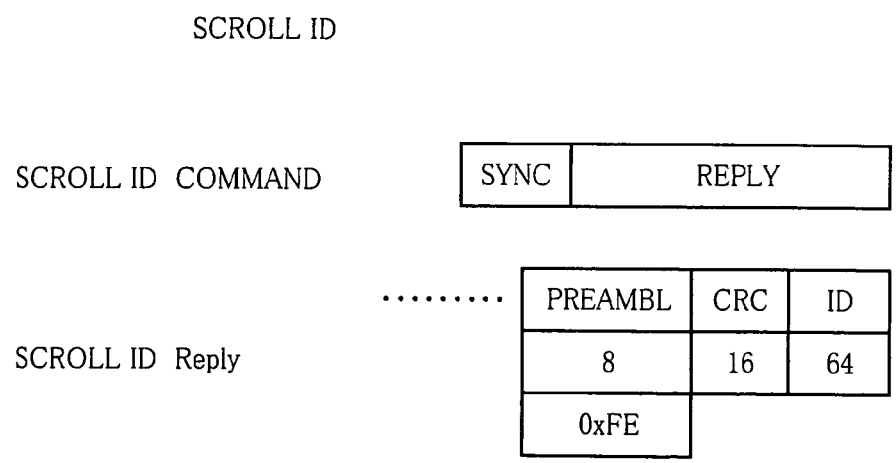
FIG. 26 is a view for explaining "SCROLL ID Reply" transmitted in response to a signal including a "SCROLL ID", when the signal is received by the RFID tag of FIG. 3.
Figure 27:
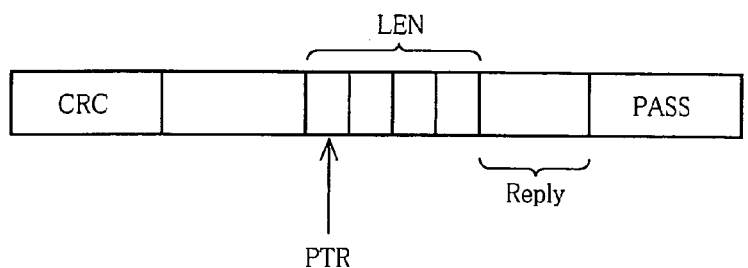
FIG. 27 is a view for explaining extraction of information following "LEN" which is a part of the information stored in a memory portion shown in FIG. 3.

Referring to FIG. 25, there will be described an arrangement of the memory of the RFID tag circuit element 24a. As shown in FIG. 25, the memory portion 72 of the RFID tag 24 stores a result of calculation of the CRC sign value, the ID specific to the desired RFID tag circuit element 24a, and a password. When a signal including the "SCROLL ID" command as shown in FIG. 26 is received, the generated reply signal consists of the 8-bit "PREAMBL" signal represented by 0×FE, "CRC" representing the result of calculation of the CRC sign value stored in the memory portion 72, and the "ID" identifying the RFID tag 24.

The above-described "PING" command of FIG. 20 is used to read out information stored in the memory portion 72 of each of the plurality of RFID tag circuit elements 24a, which information corresponds to the "CRC" and "ID", that is, to specify the reading start position. As shown in FIG. 21, the "PING" command includes the start address pointer "PTR", the data length "LEN", and the value "VAL. Where the number of data sets stored in the memory portion 72, which number is represented by the data length "LEN" as counted from the address represented by the pointer "PTR", is equal to a value represented by the value "VAL", as indicated in FIG. 26, the reply signal consists of 8-bit data sets following the address (PTR+LEN+1). If the number of the data sets stored in the memory portion 72 as represented by the data length "LEN" as counted from the address represented by the pointer "PTR" is not equal to the value represented by the value "VAL", the reply signal is not generated.

Figure 28:
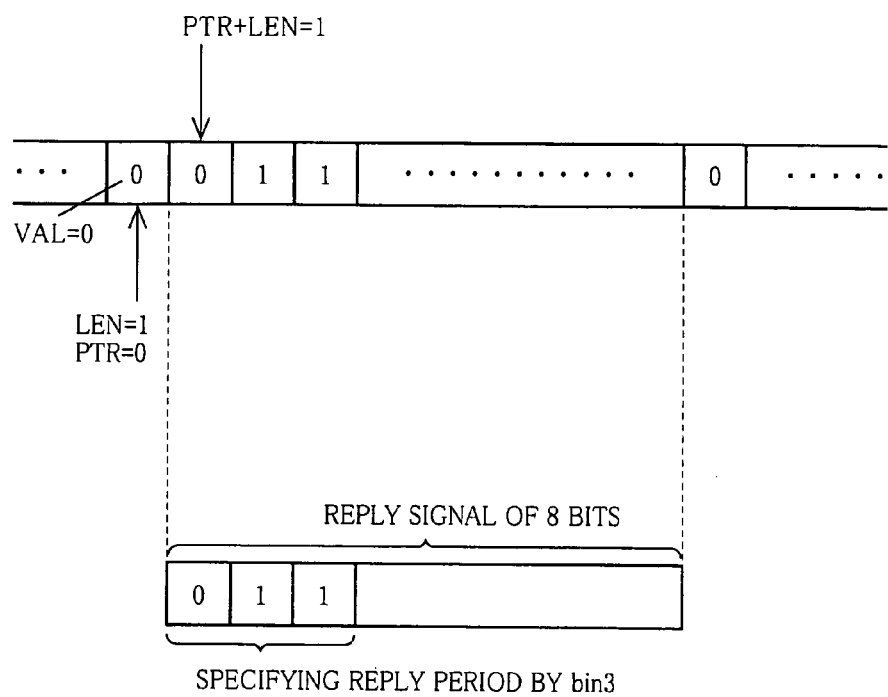
FIG. 28 is a view showing in detail the "SCROLLED ID Reply" of FIG. 26.
Figure 29:
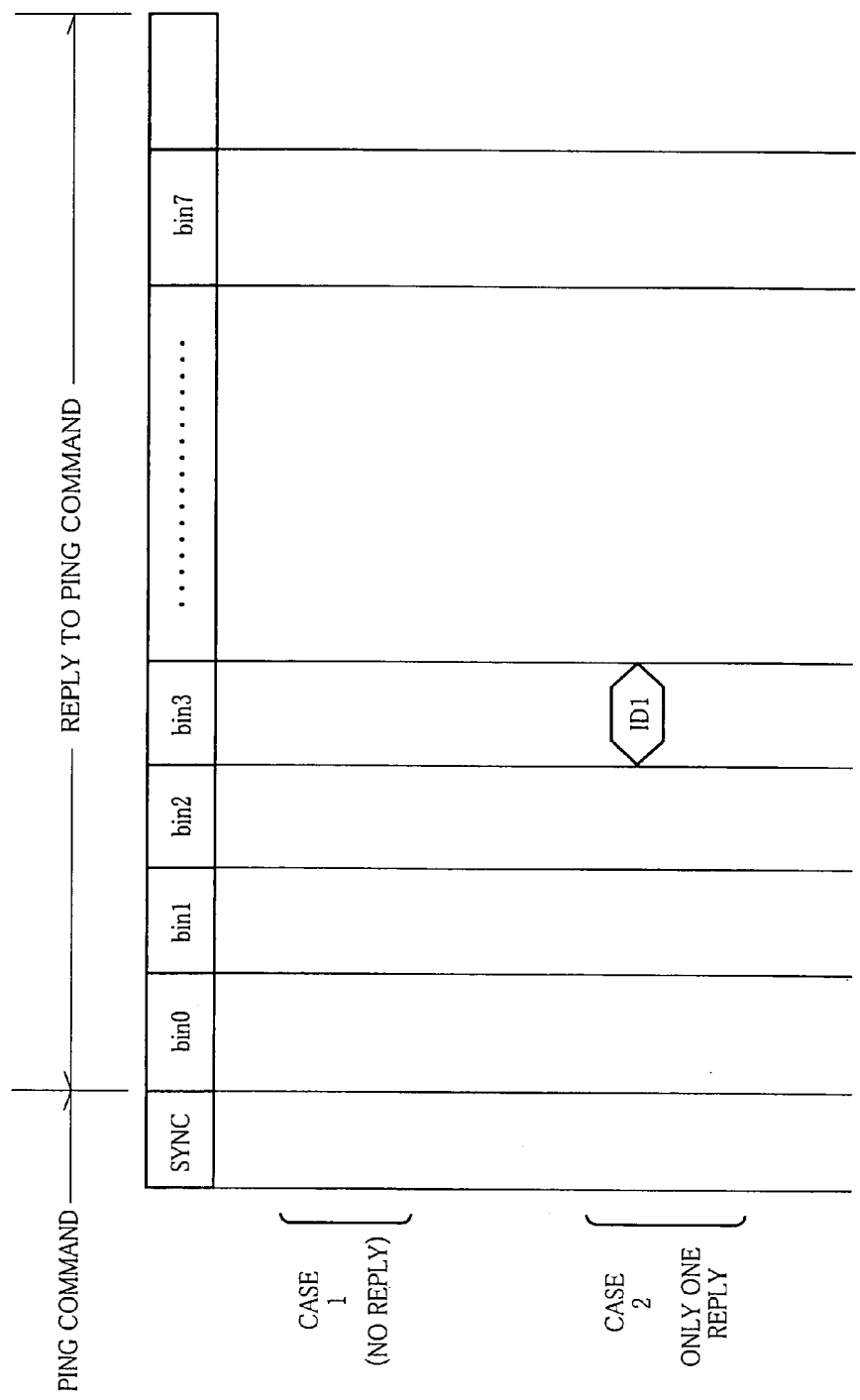
FIG. 29 is a view illustrating an example of a reply from an RFID tag, which possibly takes place when the RFID tag reader/writer of FIG. 2 operates to identify the RFID tags located within an area of possible radio communication.

The timing at which the RFID tag circuit element 24a replies to the "PING" command is determined by upper three bits of the reply signal. That is, the reply signal is transmitted during one of periods "bin0" through "bin7" separated from each other by "BIN" pulses transmitted from the RFID tag reader/writer 12, following the "PING" command. Where the "PIN" command includes "PTR=0", "LEN=1" and "VAL=0", for example, the RFID tag 24 wherein the first bit stored in the memory portion 72 is equal to "0" represented by the value "VAL" extracts a signal as shown in FIG. 28, and incorporates this signal into the reply signal. Where the upper three bits of the reply signal are "0", "1" and "1", the reply signal is transmitted in response to the "PING" command, during a reply period "bin3" as indicated in FIG. 29.

Figure 30:
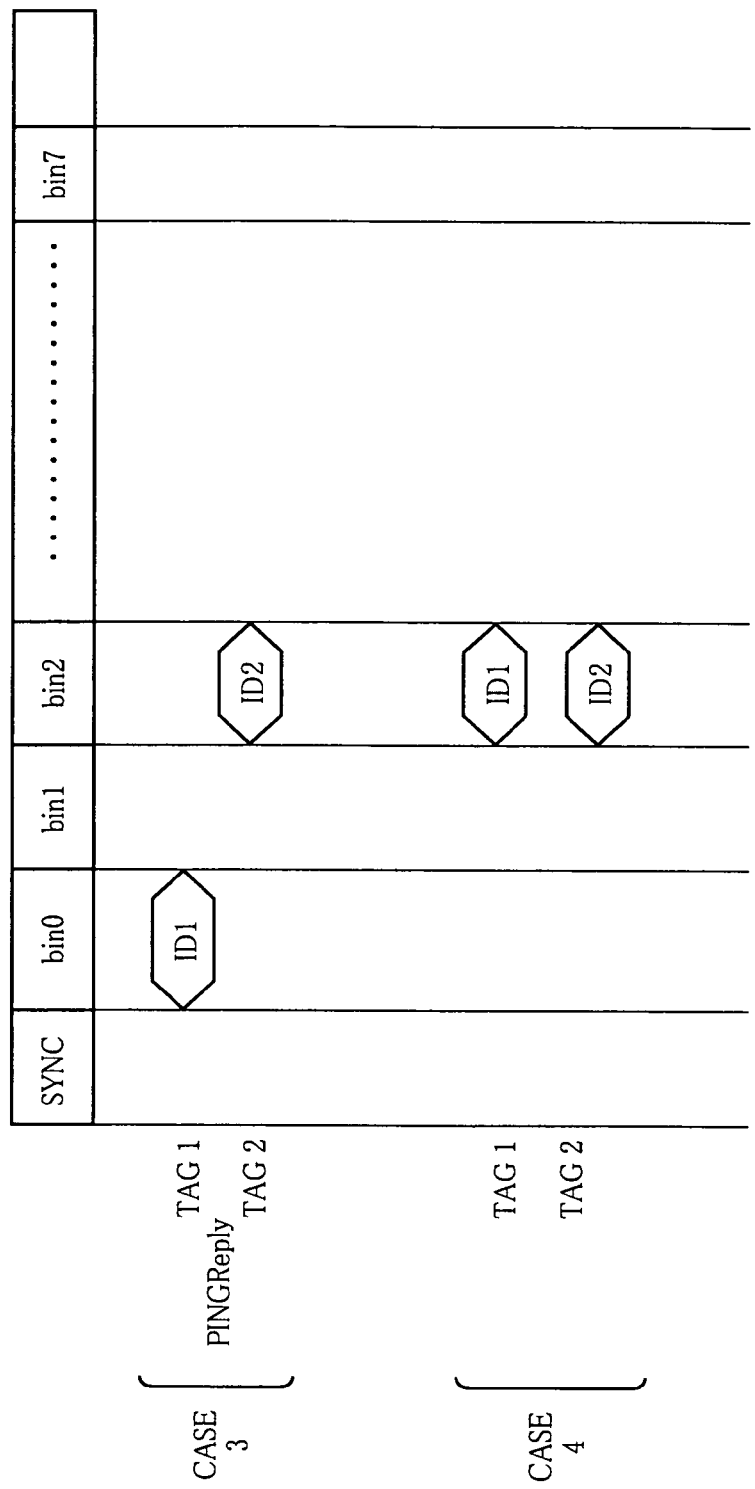
FIG. 30 is a view indicating another example of a reply from an RFID tag, which possibly takes place when the RFID tag reader/writer of FIG. 2 operates to identify the RFID tags located within the area of possible radio communication.

The reply to the "PING" command differs depending upon the number of the tags, as described below. That is, where any RFID tag 24 is present within the communication area of the RFID tag reader/writer 12, no reply is transmitted, as in CASE 1 of FIG. 29. Where one RFID tag circuit element 24a is present within the communication area, the reply signal indicating "ID1" is transmitted during the period "bin3", for example, as in CASE 2 of FIG. 29. Where two RFID tag circuit elements 24a are present within the communication area, the reply signal indicating "ID1" is transmitted during a period "bin0", for example, while the reply signal indicating "ID2" is transmitted during a period "bin2", for example, as in CASE 3 of FIG. 30. Where two RFID tag circuit elements 24a are present within the communication area, the reply signal indicating "ID1" and the reply signal indicating "ID2" are transmitted during the period "bin2", for example, as in CASE 4 of FIG. 30, if the value of the upper three bits of ID1 and that of the upper three bits of ID2 are equal to each other. The number of the RFID tag circuit elements 24a within the communication area and the ID of each of those circuit elements 24a can be obtained by repetition of the "PING" command after changing "PTR", "LEN" and "VAL". By using the obtained ID, the information writing on the desired or selected RFID tag circuit element 24a can be effected.

Figure 31:
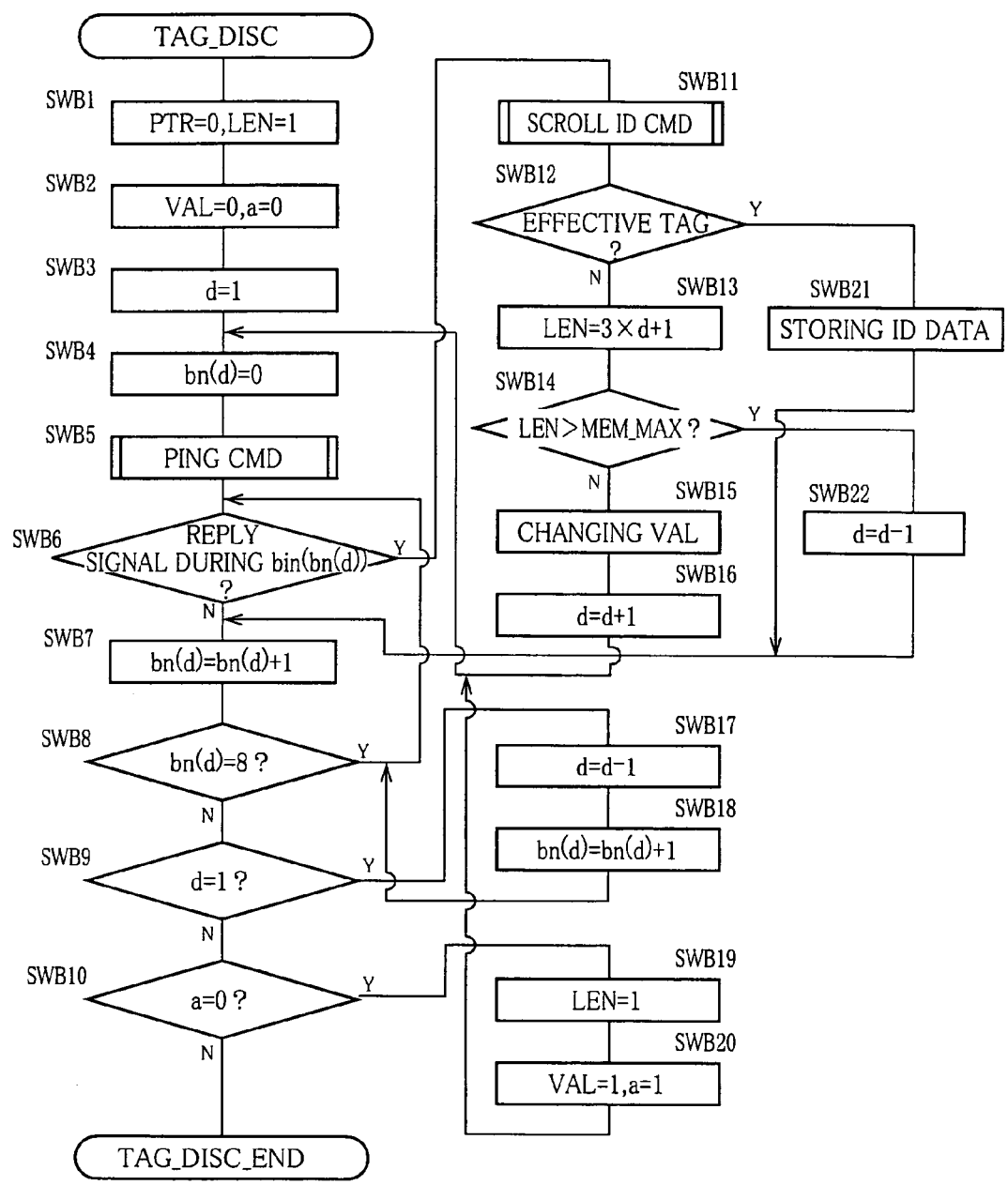
FIG. 31 is a flow chart illustrating an operation to identify the RFID tag selected for information writing thereon, in step SWB of FIG. 17.

Referring to the flow chart of FIG. 31, there will be described an operation in SWB of FIG. 17 to identify the selected RFID tag circuit element 24a on which the information is to be written. Initially, SWB1 is implemented to set "PTR=0" and "LEN=1", and SWB2 is implemented to set "VAL=0" and a leading data flag "a=0". Then, SWB3 is implemented to set "1" as a value "d" indicative of the number of repetition of the "PING" command, and SWB4 is implemented to set "0" as "bd(d)" indicative of bin number in the above-indicated value "d". SWB5 is implemented to generate the "PING" command frame. Then, SWB6 is implemented to determine whether the reply signal is present at "bin(bn(d))", namely, at "bin0". If an affirmative decision is obtained in SWB6, it is estimated that the leading four bits in the memory portion 72 of the selected RFID tag are "0", "0", "0" and "0". In this case, SWB11 is implemented to generate the "SCROLL ID" command frame according to the estimation, and transmit the generated command frame, so that the CRC sign and ID of the selected RFID tag 24 can be read. Then, SWB12 is implemented to calculate the value of the CRC sign of the read ID, and compare the calculated value with the value of the received CRC sign, for determining whether the ID in question is effective or not, depending upon whether the calculated value is equal to the value of the received CRC sign. If an affirmative decision is obtained in SWB12, it is determined that the read ID is effective. In this case, SWB21 is implemented to store the ID data, and SWB7 is then implemented. If a negative decision is obtained in SWB6, SWB7 is also implemented. IN this SWB7, "1" is added to the bin number "dn(d)". Then,SWB8 is implemented to determine whether the bin number "bin(d)" has increased to "8" which is a total number of the bin periods. If a negative decision is obtained in SWB8, the above-described step SWB6 and the following steps are implemented again. If an affirmative decision is obtained in SWB8, SWB9 is implemented to determine whether the "d" indicative of the number of repletion of the "PING" command is equal to "1". If a negative decision is obtained in this step SWB9, SWB17 is implemented to add "1" to "d", and SWB18 is implemented to add "1" to "bn(d)". Then, the above-described step SWB6 and the following steps are implemented again. If an affirmative decision is obtained in SWB8, this means that all of the RFID tag circuit elements 24a having the same leading data in the memory area 72 have been checked, so that SWB10 is then implemented. If a negative decision is obtained in SWB12, it is possible that a plurality of RFID tags have replied during the period "bin(bn(d))". In this case, it is necessary to check in more detail the ID data of the RFID tag circuit elements 24a, by generating and transmitting again a new "PING" command on the basis of the data obtained from the previous "PING" commands. In this case, SWB13 is first implemented to calculate again the length of the length data "LEN". Then, SWB 14 is implemented to determine whether the length of the length data "LEN" is larger than a total number "MEN MAX" of storage of the memory portion 72. If an affirmative decision is obtained in SWB14, this means that all data in the memory portion 72 have been read out and that the data in the memory portion 72 have some error or defect. In this case, the ID data are not stored, and SWB 22 is implemented to subtract "1" from "d" to effect determination for the next BIN period. If a negative decision is obtained in SWB14, it is necessary to check in more detail the ID data of the RFID tag circuit element 24a. In this case, SWB15 is implemented to change the value "VAL" on the basis of the data obtained from the previous "PING" command. Then, SWB16 is implemented to add "1" to "d", and the step SWB4 and the following steps are implemented. In SWB10, a determination as to whether the value of the leading bit data flag "a" is equal to "0". If an affirmative decision is obtained in SWB10, this means that all of the RFID tag circuit elements 24a wherein the leading data in the memory portion 72 are "0"have been checked. In this case, SWB19 is implemented to set "LEN=1", and SWB20 is implemented to set "VAL=1" and the leading bit data flag "a=1". Then, the step SWB4 and the following steps are implemented again. If a negative decision is obtained in SWB10, the ID data of all of the RFID tag circuit elements 24a within the communication area have been checked. In this case, the execution of the present routine is terminated. If a plurality of RFID tag circuit elements 24a have been detected according to the present routine, the circuit elements 24a other than the desired circuit element 24a are excluded to inhibit their replies, according to a "Quiet" command which will not be described in detail. To find the desired circuit element 24a, the detected circuit element 24a having the smallest ID number is selected first for determining whether this circuit element 24a is the desired one. If none of the circuit elements 24 is detected, the present routine is terminated with a determination of an error.

Figure 32:
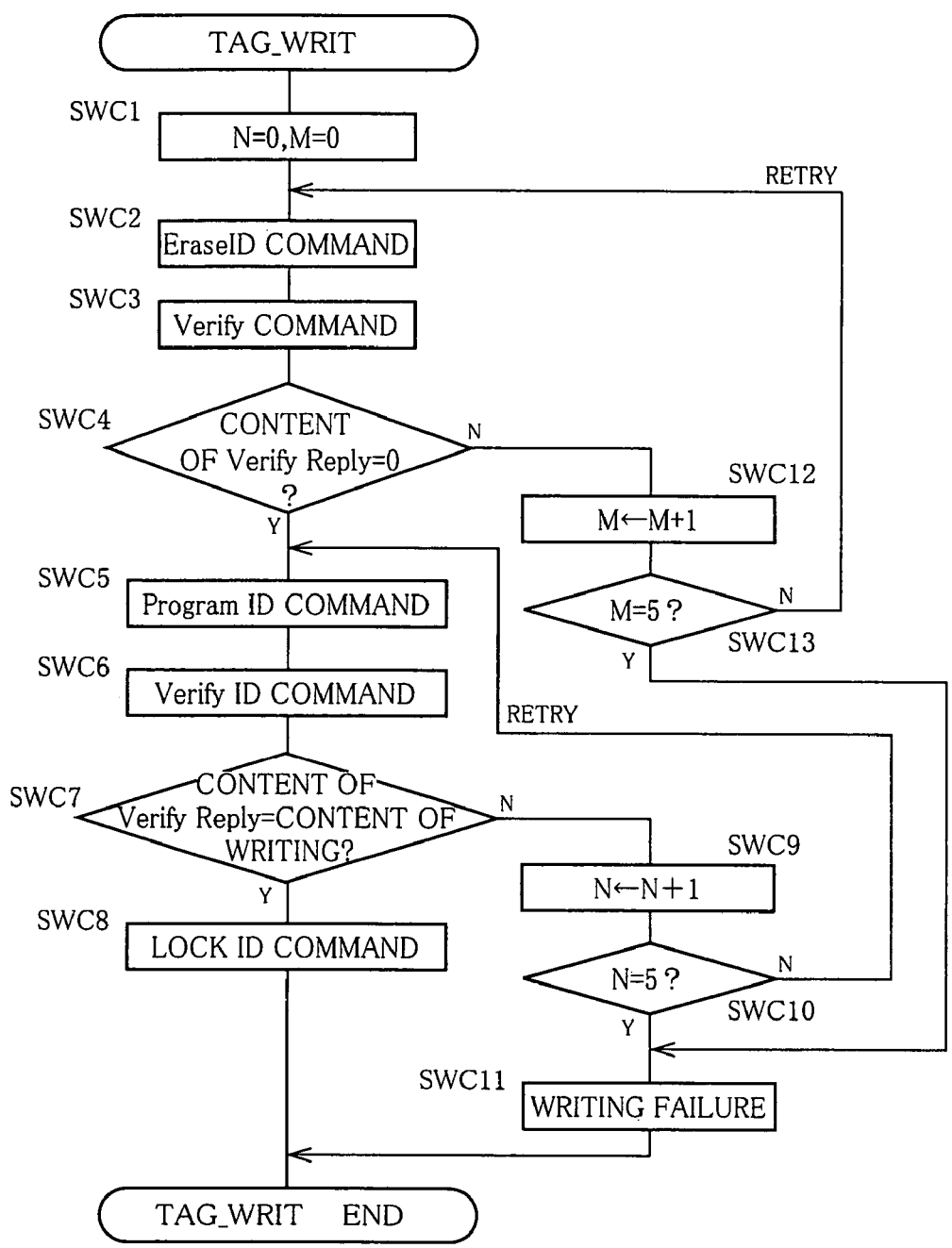
FIG. 32 is a flow chart illustrating an operation to write information on the RFID tag in step SWC of FIG. 17.

Referring to the flow chart of FIG. 32, there will be described the information writing on the RFID tag circuit element 24a in SWC of FIG. 17. Initially, SWC1 is implemented to set "N=0" and "M=0", and then SWC2 is implemented so that a signal modulated on the basis of an "ERASE" command is transmitted from the transmission/reception antenna 54, and the memory portion 72 of the desired RFID tag circuit element 24a on which the information is to be written is initialized. Then in SWC3, a signal modulated on the basis of a "VERIFY" command is transmitted from the transmission/reception antenna 54, and SWC4 is implemented to verify the information stored in the memory portion 72 of the RFID tag circuit element 24a, on the basis of the reply signal from the RFID tag circuit element 24a, for determining whether the memory portion 72 of this circuit element 24a has been correctly initialized. If an affirmative decision is obtained in SWC4, SWC5 is implemented so that a signal modulated on the basis of a "PROGRAM" command is transmitted from the transmission/reception antenna 54, and the information is written on the RFID tag circuit element 24a. SWC7 is then implemented to verify the information stored in the memory portion 72 of that RFID tag circuit element 24a, on the basis of the reply signal from the circuit element 24a, for determining whether this information is coincident with the information written in SWC5. If an affirmative decision is obtained in SWC7, SWC8 is implemented so that a signal modulated on the basis of a "LOCK" command is transmitted from the transmission/reception antenna 54, to inhibit writing of new information on the RFID tag circuit element 24a, and the execution of the present routine is terminated. If a negative decision is obtained in SWC7, SWC9 is implemented to set "N+1" to "N", and SWC10 is then implemented determine whether "N" is equal to "5". If a negative decision is obtained in SWC10, the step SWC5 and the following steps are implemented again. If an affirmative decision is obtained in SWC10, namely, if the information writing operation in the step SWC 5 and the following steps fails five or more times, SWC11 is implemented to confirm this failure of the information writing on the RFID tag circuit element 24a, and the execution of the present routine is terminated. If a negative decision is obtained in SWC4, that is, if it is determined that the memory portion 72 of the RFID tag circuit element 24a has not been correctly initialized, SWC12 is implemented to set "M+1" to "M", and SWC13 is then implemented to determine whether "M" is equal to "5". If a negative decision is obtained in SWC13, the step SWC2 and the following steps are implemented again. If an affirmative decision is obtained in SWC13, that is, if the initializing operation in the step SWC2 and the following steps fails five or more times, SWC11 is implemented to confirm this failure of the information writing on the RFID tag circuit element 24a, and the execution of the present routine is terminated. According to the present routine described above, the desired information can be written on the RFID tag circuit element 24a located within the communication area.

According to the present invention described above, communication with a plurality of RFID tag circuit elements 24a is not possible. Therefore, only the "SCROLL ID" command in place of the "PING" command may be used in SWC of FIG. 17. This modification is advantageous in that the time required for the tag specifying procedure in SWB can be considerably reduced.

Figure 33:
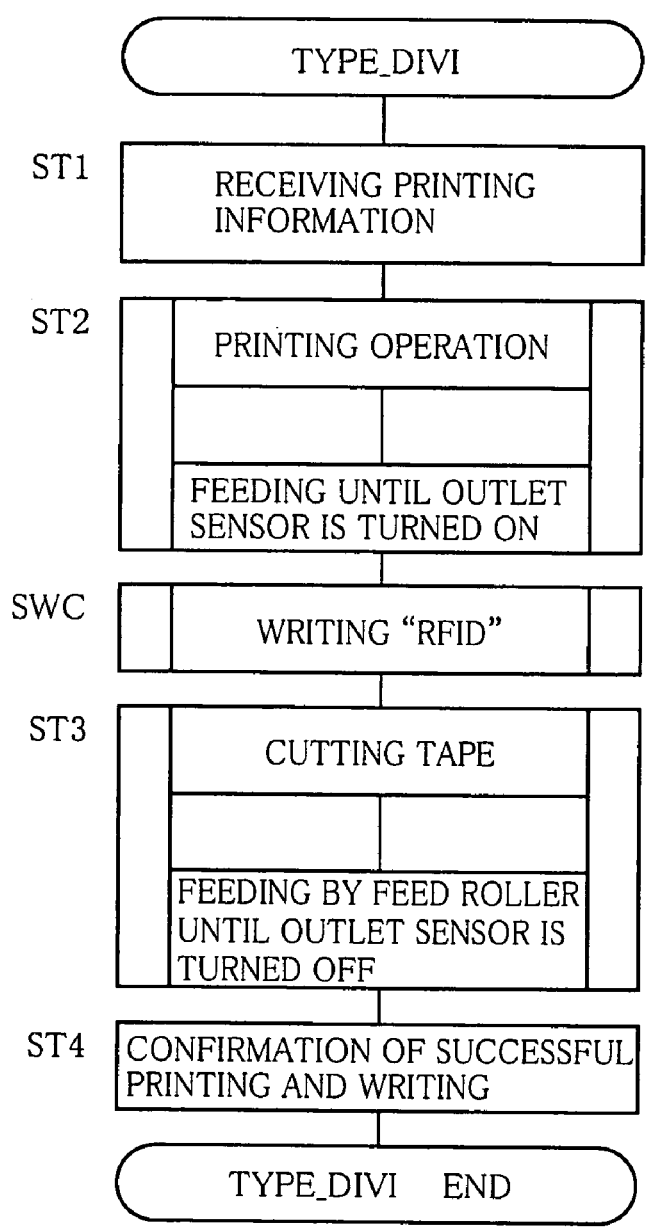
FIG. 33 is a flow chart illustrating an operation to effect printing on a covering film and an operation to cut a tag tape, in the step SWC of FIG. 17, which are performed concurrently with the operation to write information on the RFID tag.

Referring to the flow chart of FIG. 33, there will be described a printing operation on the covering film 86 and an operation to cut the tag tape 26, which are performed concurrently with the information writing on the RFID tag circuit element 24a in SWC of FIG. 17. Initially, STI is implemented to effect down loading or up loading of printing information from the information server 22 through the communication line 14. Then, ST2 is implemented to effect the printing operation on the covering film 86, by means of the above-described cartridge-motor driver circuit 32, printer driver circuit 36 and feed-roller driver circuit 42, and at the same time feed the tag tape 26 by the feed roller 38 until the sensor 52 is turned on. Then, the information writing operation on the RFID tag circuit element 24a in the above-described step SWC is performed. Then, the tag tape 26 is cut by the cutter 50 through the solenoid 48, and the thus obtained RFID tag 24 is fed by the feed roller 38 until the sensor 52 is turned off. ST4 is then implemented to confirm the successful printing operation and information writing operation, and the execution of the present routine is terminated. According to the present routine described above, the RFID tag 24 on which the printing operation has been performed and on which the desired information has been written is obtained.

In the present embodiment described above, the resonance frequency of the antenna 64 of the RFID tag circuit element 24a of each RFID tag 24 located within the predetermined nearby communication area, which resonance frequency changes due to mutual coupling between the antenna 64 of that RFID tag circuit element 24*a* and the transmission/reception antenna 54 of the RFID tag reader/writer 12, is used to set the frequency of the carrier wave to be transmitted from the RFID tag reader/writer 12. This setting permits the communication of the RFID tag reader/writer 12 with only the RFID tag circuit element or elements 24*a* located within the nearby communication area. That is, each RFID tag circuit element 24*a* located within the nearby communication area has a high degree of sensitivity, and each ratio-tag circuit element 24*a* located outside the nearby communication area has a low degree of sensitivity, so that it is possible to effectively prevent an interference between the communication of the RFID tag reader/writer 12 with each desired or selected RFID tag circuit element 24*a* and the communication of the reader/writer 12 with the other or non-selected RFID tag circuit element or elements 24*a*. Thus, the present embodiment provides the RFID tag reader/writer 12 which has a high degree of stability of communication with only the desired RFID tag circuit element or elements 24*a*.

It is also noted that the above-described nearby communication area is set by setting the spacing distance between the transmission/reception antenna 54 of the RFID tag reader/writer 12 and the antenna 64 of the RFID tag circuit element 24*a*, to be not larger than 0.1 times the wavelength corresponding to the free-space resonance frequency of the antenna 64 of the RFID tag circuit element 24*a*. The RFID tag reader/writer 12 generates the carrier wave having a frequency higher than the resonance frequency of the antenna 64 of the RFID tag circuit element 24*a* when the spacing distance between the transmission/reception antenna 54 of the RFID tag reader/writer 12 and the antenna 64 of the RFID tag circuit element 24*a* is 0.5 times the wavelength of the above-described free-space resonance frequency. Accordingly, the amount of capacitive and inductive change of the resonance frequency has a maximal value when the spacing distance between the transmission/reception antenna 54 of the RFID tag reader/writer 12 and the antenna 64 of the RFID tag circuit element 24*a* is one half of the wavelength of the carrier wave having the above-described free-space resonance frequency, and exceeds the maximal value when the spacing distance is not larger than one tenth of the wavelength of each antenna, so that the RFID tag reader/writer 12 has a high degree of stability of communication with only the desired RFID tag circuit element or elements 24*a* located within the nearby communication area described above.

It is further noted that the RFID tag reader/writer 12 is operable to effect information reading and writing communication with the RFID tag circuit element 24*a* provided with a half-wave dipole antenna as the tag-side antenna 64, and has the predetermined nearby communication area which is set by setting the spacing distance between the transmission/reception antenna 54 of the reader/writer 12 and the antenna 64 of the RFID tag circuit element 24*a*, to be not larger than 0.05 times the wavelength corresponding to the above-described free-space resonance frequency. The RFID tag reader/writer 12 is arranged to generate the carrier wave having the frequency not smaller than 1.03 times the above-described free-space resonance frequency, so that when the RFID tag reader/writer 12 generates the carrier wave having the frequency not smaller than 1.03 times the resonance frequency of the antenna 64 of the RFID tag circuit element 24*a*, the RFID tag circuit element 24*a* has a high degree of sensitivity when the spacing distance between the antenna 54 of the RFID tag reader/writer 12 and the antenna 64 of the RFID tag circuit element 224*a* is not larger than one twentieth of the wavelength of the carrier wave having the above-described free-space resonance frequency, whereby the RFID tag reader/writer 12 has a high degree of stability of communication with only the RFID tag circuit element or elements 24*a* located within the nearby communication area described above.

It is also noted that the predetermined nearby communication area is set by setting the spacing distance between the antenna 64 of the RFID tag circuit element 24*a* and the transmission/reception antenna 54 of the RFID tag reader/writer 12, to be within the range not smaller than 0.2 times and not larger than 0.4 times the wavelength corresponding to the above-described free-space resonance frequency, and that the RFID tag reader/writer 12 is arranged to generate the carrier wave having the resonance frequency of the antenna 64 of the RFID tag circuit element 24*a* when the spacing distance between the antenna 64 of the RFID tag circuit element 24*a* and the antenna 54 of the RFID tag reader/writer 12 is within the above-indicated range. Accordingly, the amount of change of the resonance frequency of the antenna 64 of the RFID tag circuit element 24*a* due to mutual coupling between the antenna 64 of the RFID tag circuit element 24*a* and the antenna 54 of the RFID tag reader/writer 12 has a minimal value when the spacing distance between the antenna 64 of the RFID tag circuit element 24*a* and the antenna 54 of the RFID tag reader/writer 12 is within the range between not smaller than 0.2 times and not larger than 0.4 times the wavelength corresponding to the above-described free-space resonance frequency, so that the RFID tag reader/writer 12 has a high degree of stability of communication with only the RFID tag circuit element or elements 24*a* located within the predetermined nearby communication area described above.

It is further noted that the RFID tag reader/writer 12 is provided with the mode switching portion 132 operable to place the carrier-wave generating portion 120 in one of the nearby communication mode for communication with only the RFID tag circuit element or elements 24*a* located within the nearby communication area, and the far communication mode for communication with the RFID tag circuit element or elements 24*a* located outside the nearby communication area, so that the carrier-wave generating portion 120 is operable to generate the carrier waves having respective different frequencies when the carrier-wave generating portion 120 is placed in the near communication mode and the far communication mode, respectively. That is, the frequency of the carrier wave generated by the carrier-wave generating portion 120 can be changed depending upon whether the RFID tag circuit element 24*a* in question is located within the nearby communication area or not. Accordingly, the RFID tag reader/writer 12 can communicate with only the circuit element or elements 24*a* within the nearby communication area, with a high degree of stability, but also can communicate suitably with the circuit element or elements 24*a* outside the nearby communication area.

While the preferred embodiment of this invention has been described above in detail by reference to the drawings, it is to be understood that the first aspect of the invention is not limited to the preceding embodiment, but may be otherwise embodied.

Figure 34:
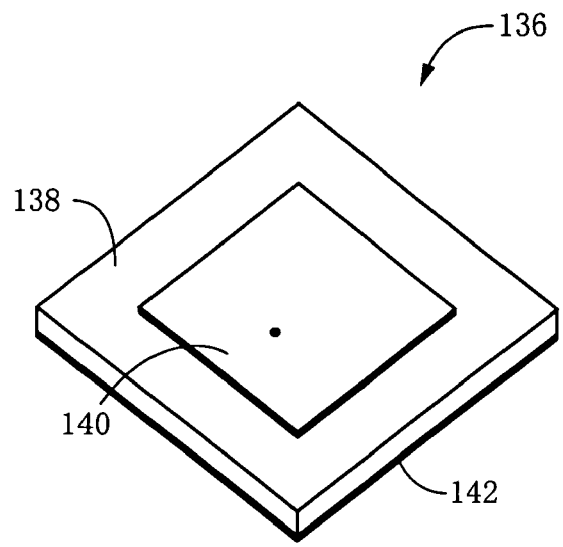
FIG. 34 is a view illustrating another configuration of the RFID tag with which the RFID tag reader/writer of FIG. 2 is communicable.
Figure 35:
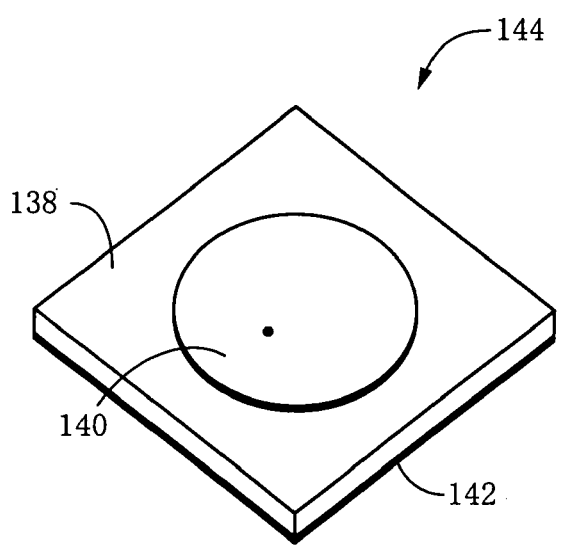
FIG. 35 is a view illustrating a further configuration of the RFID tag with which the RFID tag reader/writer is communicable.

Referring to FIG. 34, there will be described a modification of the RFID tag with which the above-described RFID tag reader/writer 12 is communicable. The RFID tag 136 shown in FIG. 34 includes a micro strip antenna consisting of a micro strip antenna element 140 formed on an upper surface of a substrate 138 formed of a highly insulating body, and a base plate 142 formed on a lower surface of the substrate 138. The above-described RFID tag reader/writer 12 is also operable to suitably communicate with this RFID tag 136. Other possible modifications of the RFID tag include an RFID tag 144 including a micro strip antenna having a circular micro strip antenna element as shown in FIG. 35, and an RFID tag including a Yagi antenna.

It is to be understood that the frequency of the carrier wave generated by the carrier-wave generating portion 120 of the radio-frequency circuit 56 and the nearby communication area of the RFID tag reader/writer 12 in the preceding embodiment have been described for illustrative purpose only, but may be suitably determined on the basis of the resonance frequency of the tag-side antenna 64 of the RFID tag circuit element 24a, which resonance frequency changes due to mutual coupling between the tag-side antenna 64 of the RFID tag circuit element 24a and the transmission/reception antenna 54 of the RFID tag reader/writer 12

While the RFID tag reader/writer 12 described above is arranged to not only write information on the RFID tag circuit element 24a, but also perform a printing operation for identification of the RFID tag 24 including the circuit element 24a, the reader/writer 12 need not be arranged to perform the printing operation, and may be arranged to perform only an information writing or reading operation with respect to the circuit element 24a.

It is to be further understood that the present invention may be embodied with various other changes without departing from the sprint of the invention.

Then, there will be described embodiments according to second through sixth aspects of this invention, by reference to the drawings. These embodiments are applicable to systems for producing read-only RFID tags (on which information cannot be written). That is, the embodiments in question are RFID tag readers that are arranged to read information from selected RFID tags.

Embodiment 2

Figure 36:
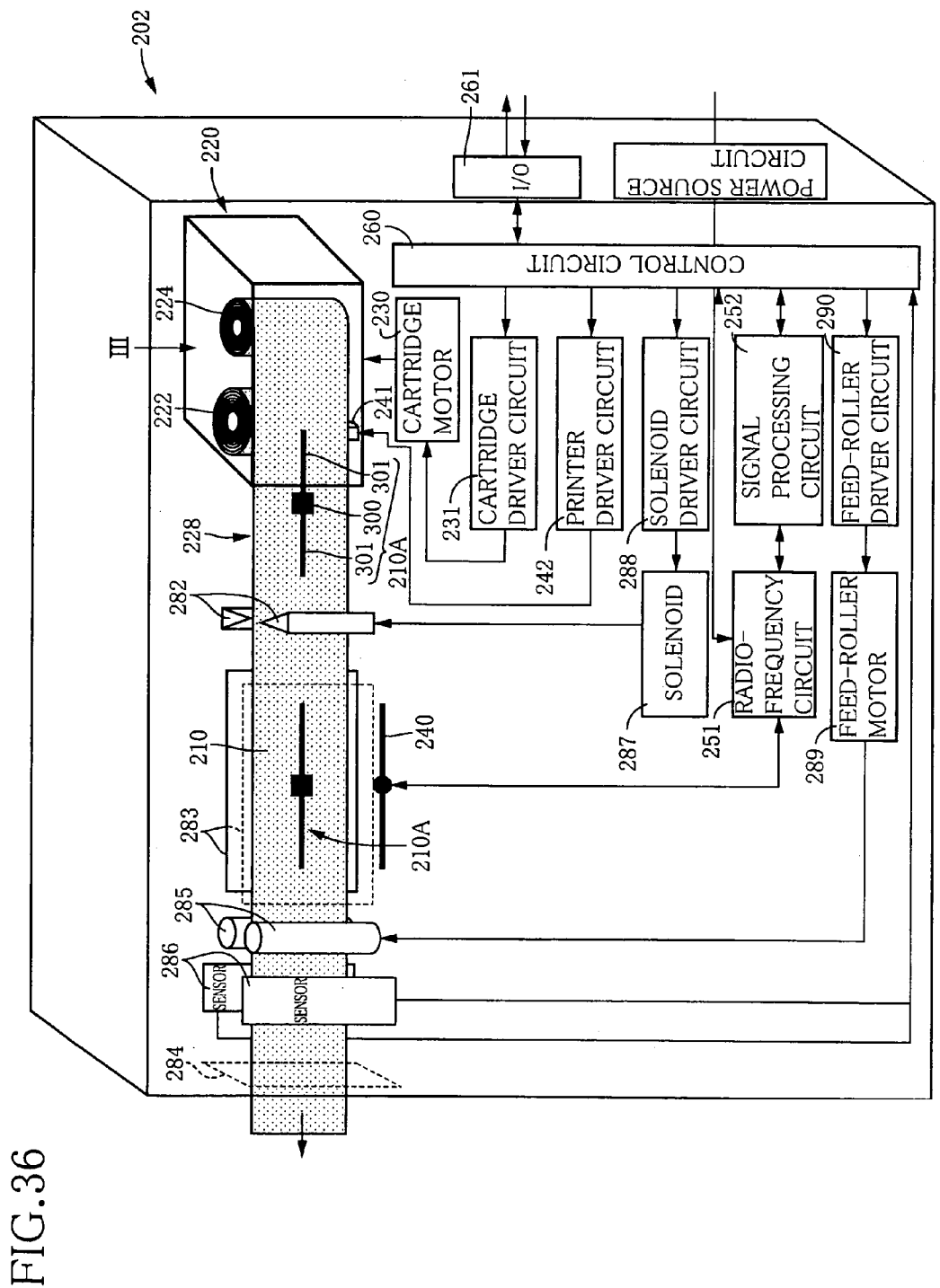
FIG. 36 is a schematic view showing in detail an arrangement of an RFID tag reader/writer according to a second embodiment of this invention.

Referring to FIG. 36, there is schematically shown in detail an arrangement of an RFID tag reader 202 according to the present embodiment. This RFID tag reader 202 is suitably used in a communication system such as the communication system 10 in the first embodiment described above. The portions of the present embodiment which are identical with those of the first embodiment will not be described.

As shown in FIG. 36, the RFID tag reader 202 includes a removably installed cartridge (RFID tag circuit-element accommodating portion) 220 which accommodates a plurality of RFID tag circuit elements 210A such that the circuit elements 210A can be sequentially taken out. Since each RFID tag circuit element 210A in the present embodiment is identical in construction with the RFID tag circuit element 24a in the first embodiment described above, the description of the RFID tag circuit element 210A is omitted.

Figure 37:
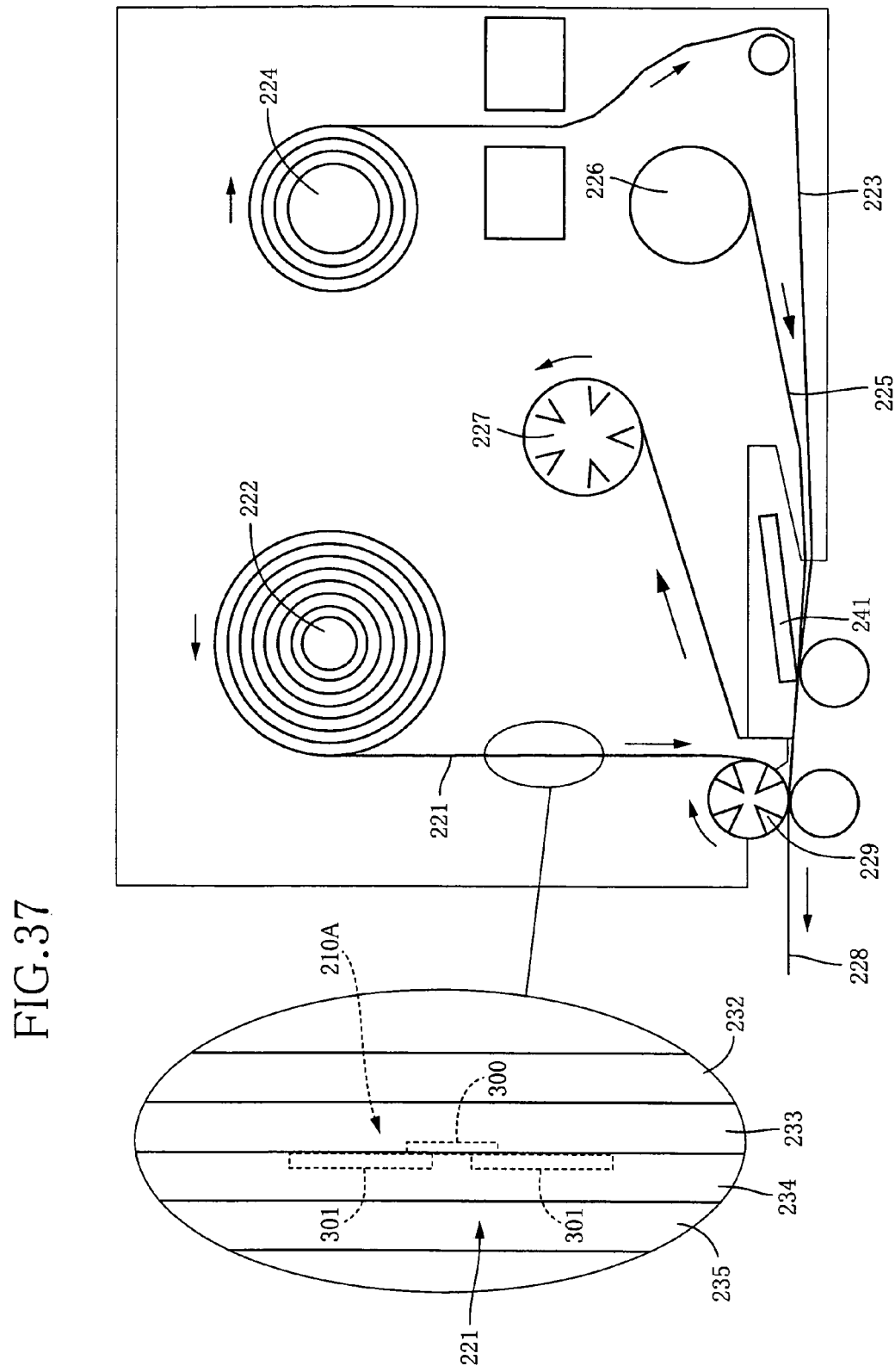
FIG. 37 is a view taken in a direction of arrow-headed line III of FIG. 36, showing in detail a structural arrangement of a cartridge shown in FIG. 36.

FIG. 37 is a view taken in a direction of arrow-headed line III of FIG. 36, showing in detail the structural arrangement of the cartridge 220.

As shown in FIGS. 37 and 36, the cartridge 220 includes: a first roll (reel member) 222 holding a roll of a substrate tape (label material in the form of a tape) 221 having the plurality of RFID tag circuit elements successively formed in its longitudinal direction (as described below in detail); a second roll 224 holding a roll of a transparent covering film 223 having almost the same width as the substrate tape 221; an ink-ribbon roll 226 holding a roll of an ink ribbon 225 used for printing; a take-up roller 227 for winding a used length of the ink ribbon 225; and a pressure roller 229 for pressing the substrate tape 221 and the covering film 223 onto each other for bonding them together into a tag tape 228, and feeding the tag tape 228 in the direction indicated by an arrow-headed line. Those rolls 22, 224, 226 and rollers 227, 229 are rotatable about their axes. The take-up roller 227 and the pressure roller 229 are rotated by a drive force of a cartridge motor 230 (shown in FIG. 36) which is disposed outside the cartridge and which is a stepping motor, for example. This cartridge motor 230 is controlled by a cartridge driver circuit 231 (shown in FIG. 36).

As shown in enlargement in FIG. 37, the substrate tape 221 consists of four layers which are an adhesive layer 232, a colored base film 233 formed of PET (polyethylene terephthalate), for example, an adhesive layer 234, and a releasing paper layer 235, which are laminated in the order of description in a direction from the side (right side as seen in FIG. 37) on which the covering film 223 is bonded, to the other side (left side as seen in FIG. 37). The substrate tape 221 and the first roll 222 constitute an RFID tag circuit-element accommodating body.

An IC circuit portion 300 is formed integrally on the back side (on the left side as seen in FIG. 37) of the base film 233, and tag-side antennas 301 are formed on the back surface of the base film 233. The IC circuit portion 300 and each tag-side antenna 301 constitute the RFID tag circuit element 210A.

The above-described adhesive layer 232 for subsequently bonding the covering film 223 is formed on the front surface (on the right side as seen in FIG. 37) of the base film 233, while the above-described adhesive layer 234 on which the releasing paper layer 235 is bonded is formed on the back surface of the base film 233. When the produced RFID tag 210 is bonded to a desired article of commodity, the releasing paper layer 235 is removed, so that the RFID tag 210 is bonded to the article through the adhesive layer 234.

The ink-ribbon roll 226 and the take-up roll 227 are disposed on the back side of the covering film 223 on which the covering film 223 is bonded to the substrate tape 221. Adjacent to the cartridge 220, there is disposed a thermal head 241 which is energized by a printer driver circuit 242 (shown in FIG. 36) to perform a printing operation on the covering film 223, with the ink ribbon 225 held in pressing contact with the back surface of the covering film 223 by the thermal head 241.

In this arrangement, the take-up roller 227 and the pressure roller 229 are rotated by the cartridge motor 230, in the direction of the arrow-headed line, in synchronization with each other, while a plurality of heat generating elements of the thermal head 241 are energized by the printer driver circuit 242, so that a desired printing 243 in the form of letters, symbols or bar codes, for example, is printed on the back surface of the covering film 223 (on its surface on the side of the adhesive layer 232). Since the printing 243 is printed on the back surface of the covering film 223, the printing 243 in the form of letters, for example, is printed as a mirror image as seen toward the printing 243 on the back side of the covering film 223. After this printing operation, the covering film 223 is boned to the substrate tape 221 by means of the pressure roller 229, to produce the tag tape 228, and the tag tape 228 is fed out of the cartridge 220 while being guided by feeding guides 283.

Referring back to FIG. 36, the RFID tag reader 202 includes: the above-described tag-side antenna 240 for transmission and reception of signals to and from the above-described RFID tag circuit elements 210A provided on the tag tape 228 being fed along the feeding guides 283 during the above-described printing operation, such that the signal transmission and reception are effected by radio communication using a radio-frequency such as UHF bands; a radio-frequency circuit 251 for obtaining access to information (RFID tag information) of the IC circuit portion 300 of the RFID tag circuit element 210A through the antenna 240 (for reading the RFID tag information, in this specific embodiment); a signal processing circuit 252 which is arranged to process signals read out from the IC circuit portion 300 of the RFID tag circuit element 210A, for thereby reading the information from the IC circuit portion 300, and which also functions as an access-information generating portion for obtaining access to the IC circuit portion 300 of the RFID tag circuit element 310A; and a control circuit 260 for controlling the RFID tag reader 202 as a whole through the above-described cartridge driver circuit 231, printer driver circuit 242, radio-frequency circuit 251 and signal processing circuit 252, and through a solenoid driver circuit 288 and a feed-roller driver circuit 290 which will be described.

The control circuit 260 is a so-called microcomputer (a detailed construction of which is not shown), which is constituted by a CPU (central processing unit), a ROM (Read Only Memory), a RAM (Random Access Memory), etc., and which operates to perform a signal processing operation according to programs stored in the ROM, while utilizing a temporary data storage function of the RAM. The control circuit 260 is connected to the communication line 14 described above with respect to the first embodiment, through an input/output interface 261, for transmission and reception of information to and from the route server 16, terminal 18, general-purpose computer 20 and information servers 22.

Figure 38:
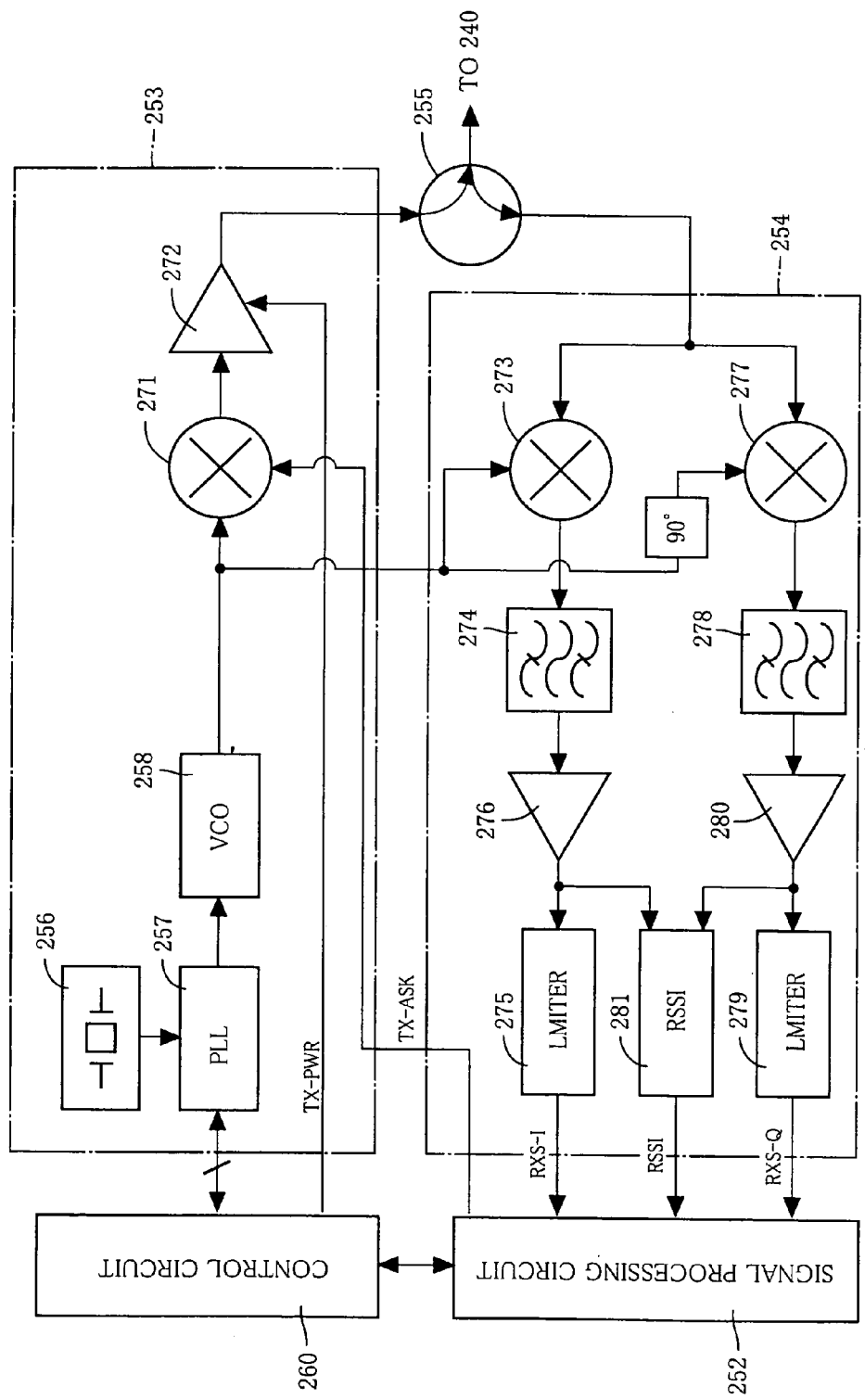
FIG. 38 is a functional block diagram showing in detail the functions of a radio-frequency circuit provided in the radio reader/writer of FIG. 36.

FIG. 38 is a functional block diagram showing in detail the functions of the radio-frequency circuit 251.

As shown in FIG. 38, the radio-frequency circuit 251 consists of a transmitting portion 253 operable to transmit signals to the RFID tag circuit element 210A through the antenna 240, a receiving portion 254 operable to receive a reflected wave received by the antenna 240 from the RFID tag circuit element 210A, and a directional coupler 255.

The transmitting portion 253 includes: a quartz resonator 256 functioning as a carrier-wave generating portion operable to generate a carrier wave for obtaining access to the RFID tag information of the IC circuit portion 300 of the RFID tag circuit element 210A (for reading the RFID tag information from the IC circuit portion 300, in this specific embodiment); a PLL (Phase Locked Loop) 257; a VCO (Voltage Controlled Oscillator) 258; a first mixer 271 functioning as a carrier-wave generating portion operable to modulate (by amplitude modulation on the basis of TX-ASK signals, for example) the carrier wave generated by the above-described carrier-wave generating portion, on the basis of signals received from the above-described signal processing circuit 252: and a first amplifier 272 functioning as a modulated-wave amplifying portion operable to amplify the wave modulated by the first mixer 271. The carrier wave generated by the above-described carrier-wave generating portion preferably has a frequency in a UHF band, and an output of the first amplifier 272 is transmitted to the antenna 240 through the directional coupler 255 and supplied to the IC circuit portion 300 of the RFID tag circuit element 210A.

The receiving portion 254 includes: a second mixer 273 operable to multiply the reflected wave received by the antenna 240 from the RFID tag circuit element 210A, and the carrier wave generated by the above-described carrier-wave generating portion; a second amplifier 276 operable to receive an output of the second mixer 273 through a band-pass filter 274, amplify this received output and supply the amplified output to a first limiter 275; a third mixer 277 operable to multiply the reflected wave received by the antenna 240 from the RFID tag circuit element 240A, and the carrier wave which is generated by the above-described carrier-wave generating portion and the phase of which is shifted by 90°; and a third amplifier 280 operable to receive an output of the third mixer 277 through a band-pass filter 278, amplify the received output and supply the amplified output to a second limiter 279. A signal RXS-I generated by the first limiter 275 and a signal RXS-Q generated by the second limiter 279 are received and processed by the above-described signal processing circuit 252.

The output signals of the first amplifier 276 and third amplifier 280 are also received by an RSSI (Received Signal Strength Indicator) 281, and an output signal RSSI of the RSSI 281 indicative of the intensities of the output signals of those amplifiers 276, 280 is received by the signal processing circuit 252. Thus, the RFID tag reader 202 according to the present embodiment is arranged to demodulate the reflected wave from the RFID tag 210, by I-Q orthogonal demodulation.

Referring back again to FIG. 36, the RFID tag reader 202 further includes: a cutter 282 which is disposed adjacent to an outlet of the cartridge 220 and which is operable to cut the tag tape 228 for producing each RFID tag (RFID tag label) 224 in the form of a label having a predetermined length when the RFID tag information has been read out from (or written on, as in a modification described below) the IC circuit portion 300 of each RFID tag circuit element 210A provided on the tag tape 228; the pair of feeding guides (RFID tag circuit-element holding portion) 283 which are provided to hold the RFID tag circuit element 210A in a predetermined access area (at a reading position, or at a writing position as in the modification described below) opposite to the antenna 240 during the information reading operation (during the information writing operation as in the modification described below), and to guide each RFID tag 210 produced by cutting the tag tape 228; feed rollers 285 operable to feed the RFID tag 210 to an outlet 284; and a sensor 286 operable to detect the RFID tag 210 located at the outlet 284.

The cutter 282 is driven by a solenoid 287 to perform its cutting operation, and the solenoid 287 is controlled by a solenoid driver circuit 288. The feed rollers 285 are driven by a feed-roller motor 298, and this motor 289 is controlled by a feed-roller driver circuit 290. The sensor 286 is a light-transmission type photoelectric sensor consisting of a light emitter and a light receiver, for example. When the tag tape 210 is not present between the light emitter and light receiver, a light emitted from the light emitter is received by the light receiver. When the tag tape 210 is present between the light emitter and receiver, on the other hand, the light emitted from the light emitter is intercepted by the tag tape 210, so that the output of the light receiver is reversed.

Figure 39:
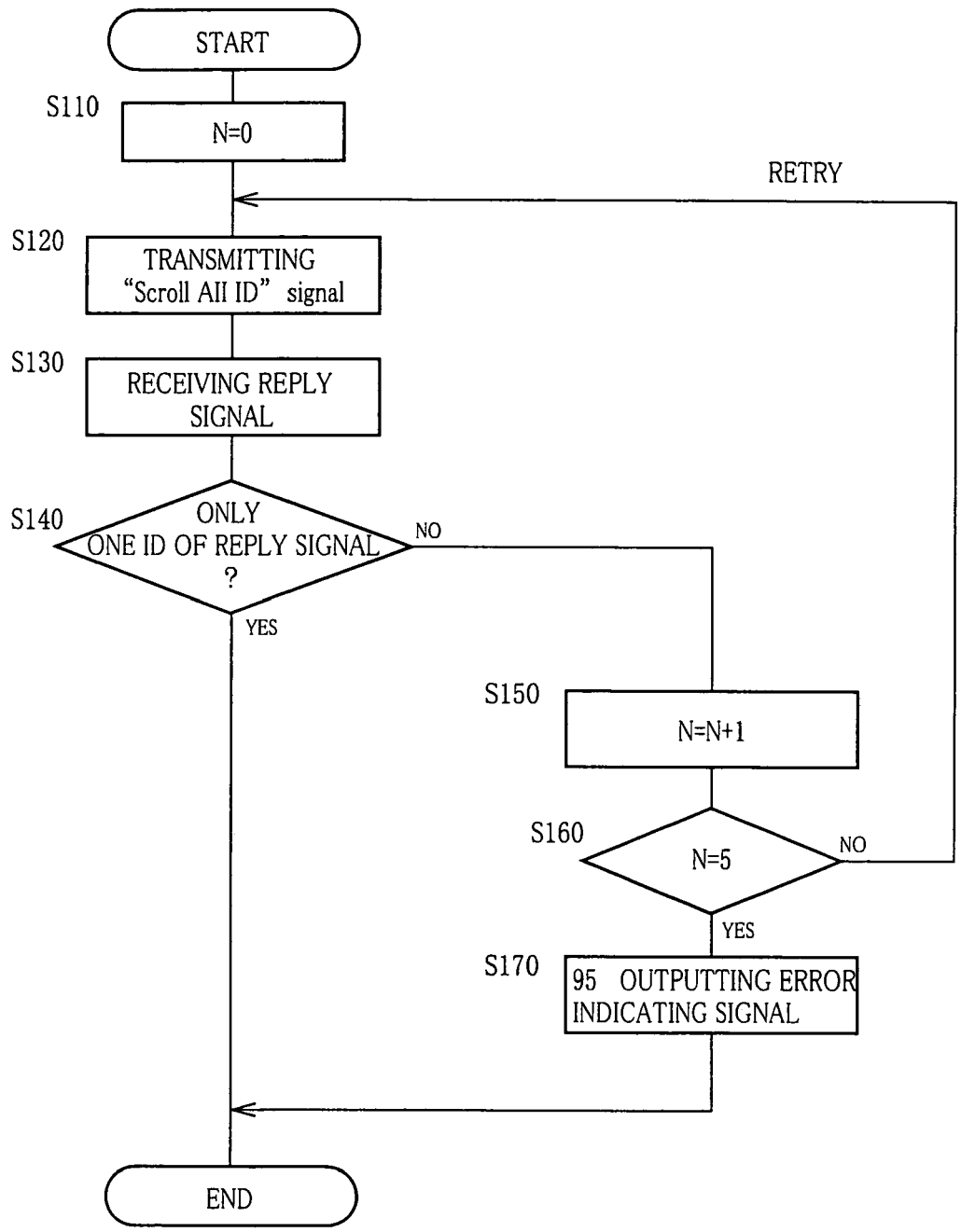
FIG. 39 is a flow chart illustrating a routine to read information from the RFID tag, which is controlled by a control circuit.

Referring to the flow chart of FIG. 39, there is illustrated a routine executed by the control circuit 260, to read the RFID tag information from the IC circuit portion 300 of the RFID tag circuit element 210A.

As shown in FIG. 39, the routine is initiated when the information reading operation of the RFID tag reader 202 is performed. Initially, step S110 is implemented to initialize an operand N which is provided to count the number of retry operations when there is a possibility of a communication failure.

Then, step S120 is implemented to supply the signal processing circuit 252 with a "Scroll All ID" command which requests all of the RFID tag circuit elements 210A located within an accessible area, to send back ID information. In response to this command, the signal processing circuit 252 generates a "Scroll All ID" signal as access information, which is transmitted through the radio-frequency circuit 251 to the RFID tag circuit element 210A located within the accessible area (a readable area in the present embodiment, which is defined as described below), to request this RFID tag circuit element 210A to reply to the received signal.

Step S130 is then implemented to receive a reply signal (RFID tag information such as commodity information) through the antenna 240 that is transmitted from the RFID tag circuit element 210A within the accessible area, in response to the above-described "Scroll All ID" signal, so that the radio-frequency circuit 251 and the signal processing circuit 252 are supplied with the replay signal.

Then, step S140 is implemented to determine whether only one reply signal has been received in the above-described step S130.

If a negative decision is obtained in step S140, the control flow goes to step S150 to increment the count N, and then to step S160 to determine whether the count N has been incremented to "5". If the count N is equal to or smaller than "4", a negative decision is obtained in step S160, and the control flow goes back to step S120, and the above-described steps are implemented again. If the count N is equal to "5", the control flow goes to step S170 to transmit an error indication signal to the terminal 18 or general-purpose computer 20 through the input/output interface 261 and the communication line 14, to provide an indication of the corresponding reading failure (error), and the execution of the present routine is terminated. Thus, up to five retry operations are performed in the event of a reading failure.

If an affirmative decision is obtained in step S140, the RFID tag information is read out from the RFID tag circuit element 210A in question, and the execution of the present routine is terminated.

According to the routine described above, the RFID tag information of the IC circuit portion 300 of the desired RFID tag circuit element 210A can be accessed and read out.

In the example described above, the RFID tag circuit element 210A is held within the accessible area and accessed while the tag tape 228 is fed along the feeding guides 283 during the printing operation. However, the accessing operation is not limited to this example. For example, the accessing operation may be performed while the tag tape 228 is held stationary at a predetermined position by the feeding guides 283.

In the information reading operation described above, the relationship between the IDs of the produced RFID tags 210 and the information read out from the IC circuit portion 300 of the RFID tags 210 is stored in the route server 16, and can be accessed as needed.

Figure 40:
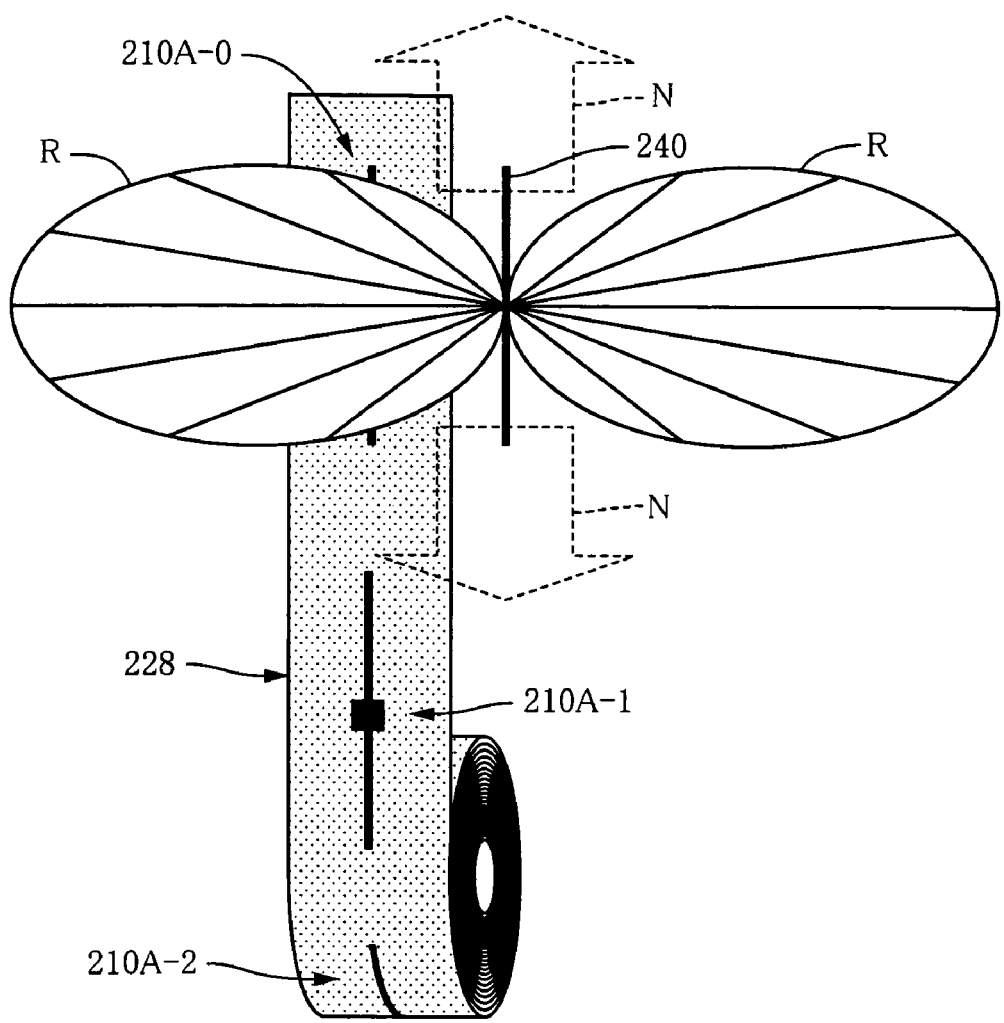
FIG. 40 is a view schematically indicating radiation directivity of a device-side antenna.
Figure 41:
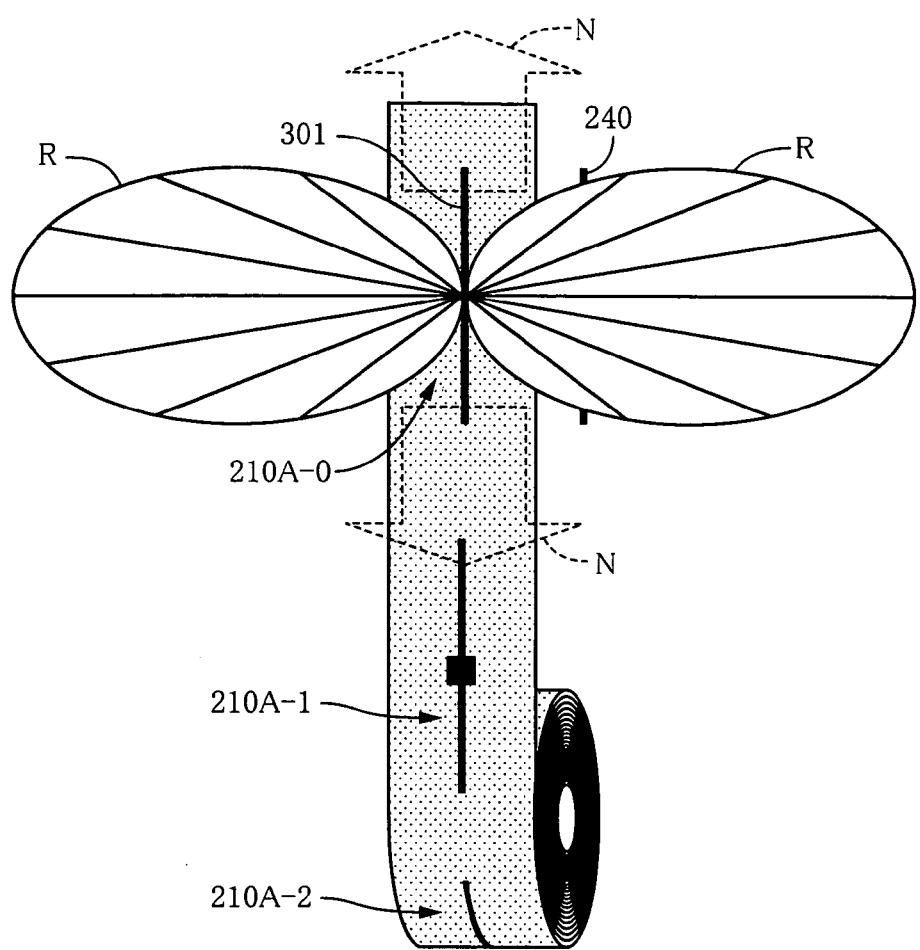
FIG. 41 is a view schematically indicating radiation directivity of an antenna of the circuit element of the RFID tag selected for information reading therefrom.
Figure 42:
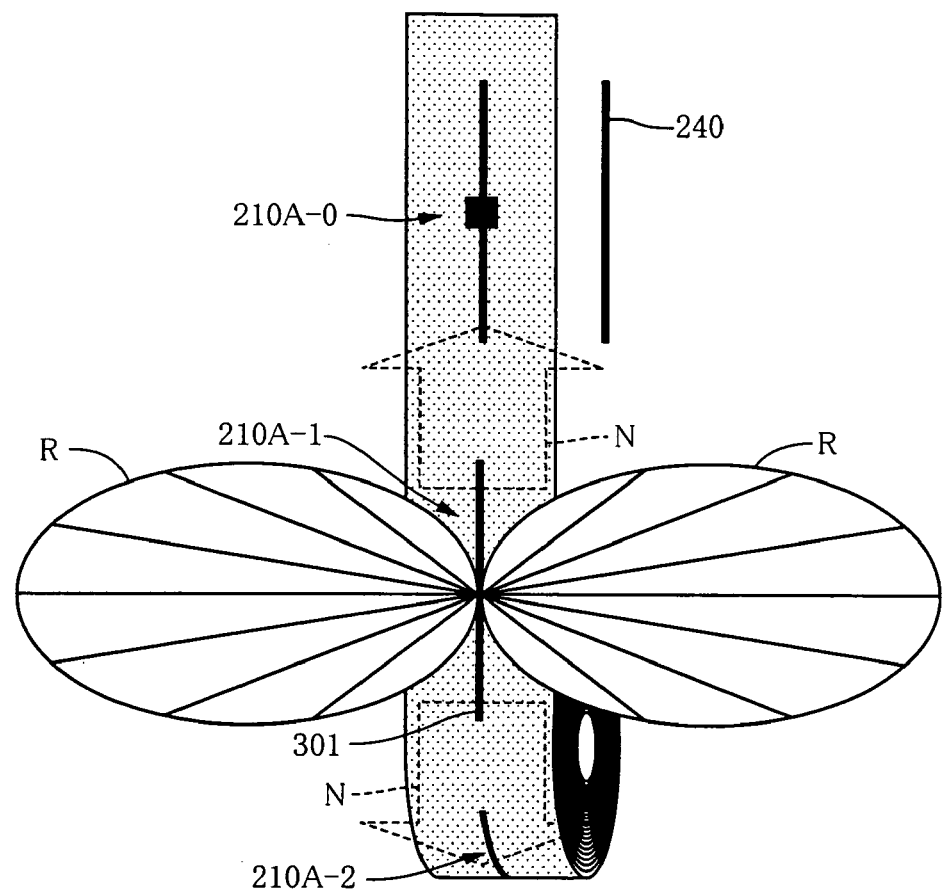
FIG. 42 is a view schematically indicating radiation directivity of the antenna of the circuit element of the non-selected RFID tags.

While the basic arrangement of the present RFID tag reader 202 has been described, the most prominent feature of the RFID tag reader 202 resides in that the antennas 301 of all RFID tag circuit elements 210A which are accommodated within the cartridge 220 (and which include the RFID tag circuit element 210A that has just been taken out from the cartridge 220) are located within an area in which the directivity of the antenna 240 of the RFID tag reader 202 is almost equal to the lowest value (within an area that is offset in a so-called "null direction" in which the electric field intensity of the antenna 240 is almost zero, namely, in an area that is offset in a direction almost parallel to the axial direction of the element of the antenna 240, where the antenna 240 is a linear dipole antenna). Referring to FIG. 40 through FIG. 42, there will be described the operation and functions of the present embodiment described above.

In this RFID tag producing system, the RFID tag circuit elements 210A which are carried by the tag tape 228 to be fed out from the cartridge 220 and which are held by the feeding guides 283 at the predetermined position opposite to the device-side antenna 240 (within the accessible area) are sequentially accessed (to read the RFID tag information from the IC circuit portion 300 in this example). That is, the access information (above-described "Scroll All ID" signal) generated by the signal processing circuit 252 of the RFID tag reader 202 is used by the first mixer 271, to modulate the carrier wave from the VCO 258, and the modulated carrier wave is amplified by the first amplifier 272 and then transmitted to the IC circuit portion 300 of the RFID tag circuit element 210A through the device-side antenna 240, in a non-contact fashion. Where a radio frequency in a UHF band is used for radio communication, the communication distance inherently tends to be large, so that there is a high possibility that the RFID tag information is read out from not only the desired RFID tag circuit element 210A held by the feeding guides 283, but also the following RFID tag circuit elements 224A (the RFID tag circuit element which has just been taken out from the cartridge 220, and the other RFID tag circuit elements still accommodated within the cartridge 220).

In view of the above-described drawback, the RFID tag reader 202 according to the present embodiment is arranged such that the antennas 301 of the RFID tag circuit elements 210A not to be accessed (for reading the information) are located within the area in which the directivity of the device-side antenna 240 is almost equal to the lowest value (within the area offset in the so-called "null direction").

Referring to FIG. 40, there is schematically shown the position of the antenna 240 relative to the RFID tag circuit elements 210A not to be accessed for information reading (which elements 210A include the RFID tag circuit element 210A that has just been taken out from the cartridge 220 in this specific example). As shown in FIG. 40, a signal radiation pattern (radiation directivity pattern) of the device-side antenna 240 covers the RFID tag circuit element 210A-0 desired to be accessed, but the RFID tag circuit elements 210A-1, 210A-2, etc. not desired to be accessed are located outside the area R of directivity of the device-side antenna 240, that is, located in an area that is offset almost in the null direction N. FIGS. 41 and 42 are views showing signal radiation patterns of the tag-side antennas 301. That is, FIG. 41 schematically shows a signal radiation pattern of the tag-side antenna 301 of the RFID tag circuit element 210A-0 desired to be accessed for information reading, while FIG. 42 schematically shows a signal radiation pattern of the tag-side antenna 301 of the RFID tag circuit element 210A-1 not desired to be accessed for information reading.

As shown in FIG. 41, the radiation pattern of the tag-side antenna 301 of the RFID tag circuit element 210A-0 desired to be accessed for information reading covers the device-side antenna 240, and the device-side antenna 240 is located within the area R of directivity of the tag-side antenna 301 of the RFID tag circuit element 210A-0. On the other hand, the device-side antenna 240 is located outside the area R of directivity of the tag-side antenna 301 of the RFID tag circuit element 210A-1, and the radiation pattern of this tag-side antenna 301 is offset from the device-side antenna 240 almost in the null direction N.

According to the relative positional relationships described above, the communication signal from the device-side antenna 240 (the communication signal to the device-side antenna 240) has a relatively high intensity for the RFID tag circuit element 210A-0 desired to be accessed for information reading, but has a relatively low intensity for the RFID tag circuit elements 210A-1, 210A-2, etc. which have just been taken out from the cartridge 220 or are accommodated in the cartridge 220, so that the device-side antenna 240 is communicable with only the RFID tag circuit element 210A-0. Therefore, even when a radio frequency in the UHF band is used for communication, the RFID tag reader 202 can read the RFID tag information from the IC circuit portion 300 of only the RFID tag circuit element 210A-0 desired to be accessed, with a simple arrangement and in a simple manner, as described above, without the provision of a conventionally required shielding means, or without reduction of the signal output or without the provision of specific communication means for identification of individual RFID tag circuit elements.

The second embodiment described above uses the RFID tag circuit-element accommodating portion in the form of the cartridge 220 provided with the first roll 222 holding a roll of the substrate tape 221 having the plurality of RFID tag circuit elements 210A successively arranged in its longitudinal direction. However, the RFID tag circuit-element accommodating portion is not limited to the cartridge 220, but may take any other form.

Referring to the perspective view of FIG. 43, there will be described an example of a modified form of the RFID tag circuit-element accommodating portion.

Figure 43:
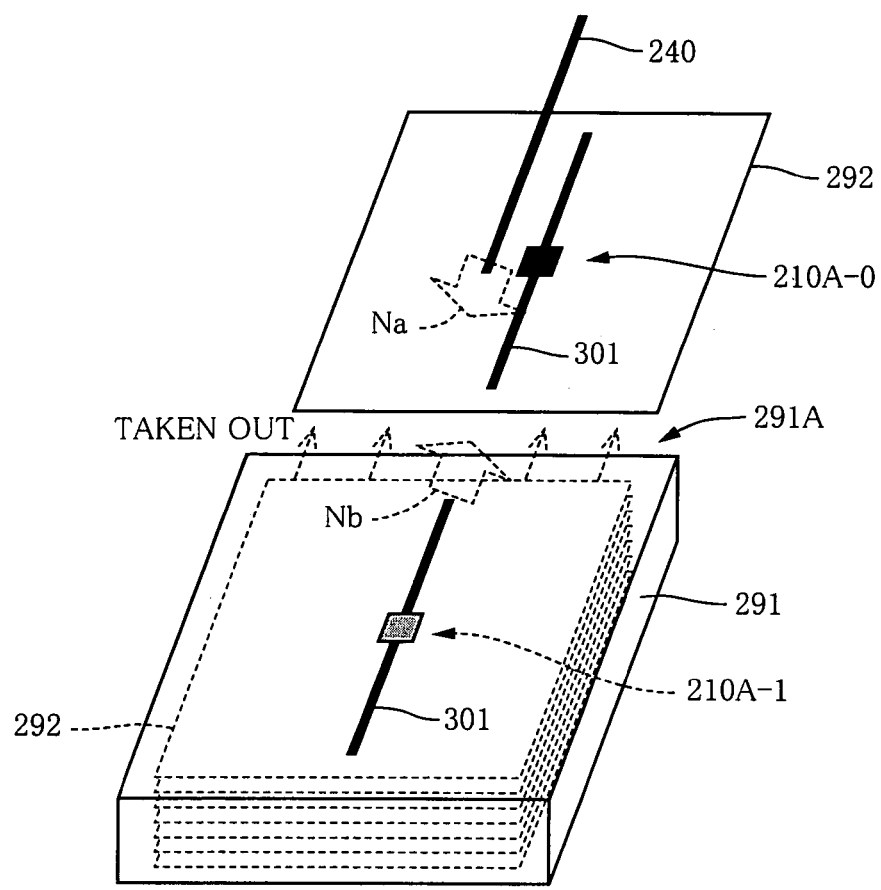
FIG. 43 is a perspective view schematically showing a modified arrangement of an RFID tag which is provided with a tray member functioning as a circuit-element accommodating portion.

In the modified form shown in FIG. 43, there is provided a tray member 291 in the form of a substantially rectangular box having a horizontally extending attitude, which serves as the RFID tag circuit-element accommodating portion. This tray member 291 accommodates a stack of a plurality of planar label elements 292 which are laminated on each other and each of which carries one RFID tag circuit element 210A formed thereon. The tray member 291 has an outlet 291A open on one of its sides (on the upper side as seen in FIG. 43), so that the planar label elements 292 are successively taken out from the tray member 291 through the outlet 291A, whereby the RFID tag circuit elements 210A are successively taken out from the tray member 291.

In the present modified form, the tray member 291 is positioned such that the RFID tag circuit element 210A-0 which has just been taken out is opposed to (located right below) the device-side antenna 240 provided in the RFID tag reader 202. In this arrangement, the RFID tag circuit elements 210A-1, etc. not desired to be accessed, which are accommodated in the tray member 291, are located outside an area of directivity of the device-side antenna 240, that is, offset from the device-side antenna 240 in a null direction Na, while the device-side antenna 240 is located outside an area of directivity of the tag-side antennas 301 of the RFID tag circuit elements 210A-1, etc., that is, offset from the tag-side antennas 301 in a null direction Nb. Namely, the device-side antenna 240 and the tag-side antennas 301 are offset from each other in the null directions. As in the second embodiment, therefore, the communication signal from the device-side antenna 240 (the communication signal to the device-side antenna 240) has a relatively high intensity for the RFID tag circuit element 210A-0 desired to be accessed for information reading, but has a relatively low intensity for the RFID tag circuit elements 210A-1, etc. which not desired to be accessed, so that the device-side antenna 240 is communicable with only the RFID tag circuit element 210A-0. Thus, the present modified form has substantially the same advantages as the second embodiment described above.

Embodiment 3

Figure 44:
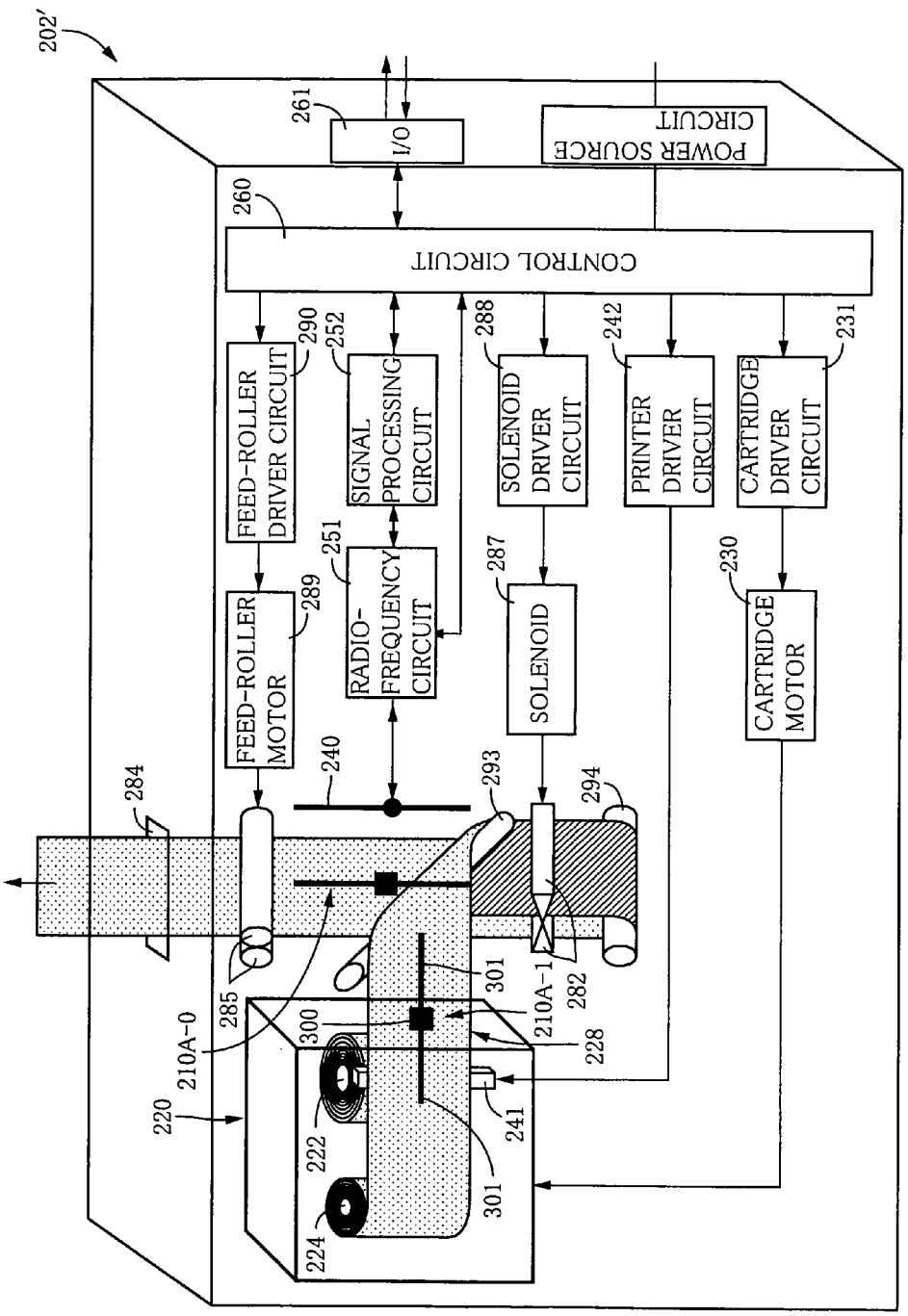
FIG. 44 is a view schematically showing in detail an arrangement of an RFID tag reader/writer according to a third embodiment of this invention.

Referring to FIG. 44, there will be described a third embodiment of this invention.

The present embodiment utilizes a difference between planes of polarization of the device-side and tag-side antennas. The same reference signs as used in the preceding second embodiment will be used to identify the corresponding elements of the third embodiment, the description of which will be omitted where appropriate.

FIG. 44 is a view which schematically shows in detail an arrangement of an RFID tag reader 202' according to the present embodiment and which corresponds to that of FIG. 36. In the interest of brevity, the feeding guides 283 and the sensor 286 are not shown in FIG. 44.

As is apparent from FIG. 44, the present embodiment is different from the second embodiment in the positional relationship between the cartridge 220 and the device-side antenna 240, and in the direction in which the tag tape 228 taken out from the cartridge is fed.

In the RFID tag reader 202', there are provided a deflecting feed roller 293 and a deflecting feed roller 294, which serve as a deflecting portion operable to feed the tag tape 228 such that the direction of feeding of the tag tape 228 is changed during the feeding action of the tag tape 228. In this embodiment, the tag tape 228 fed from the cartridge 220 substantially in the horizontal direction (in the right direction as seen in FIG. 44) is first deflected downwards by the deflecting feed roller 293, fed downwards to the deflecting feed roller 294 via a cutting position of the cutter 282, and then deflected upwards by the deflecting feed roller 294, to an accessible area opposite to the device-side antenna 240 which extends substantially in the vertical direction. After the RFID tag information is read out from the RFID tag circuit element 210A-0, the tag tape 228 is cut by the cutter 282 to produce the RFID tag 210, which is then fed upwards by the feed rollers 285 so that the RFID tag 210 is fed out through the upper outlet 284.

In the arrangement described above, the feeding path of the tag tape 228 is defined such that a plane of polarization of the tag-side antenna 301 of the RFID tag circuit element 210A-1 which has just been taken out from the cartridge 220, and a plane of polarization of the tag-side antenna 301 of the RFID tag circuit element 210A-0 held by the feeding guides 283 (not shown in FIG. 44) at a position opposite to the deice-side antenna 240 are inclined with respect to each other, namely, inclined by about 90° with respect to each other in this specific example. The plane of polarization of the antenna 301 is a plane which is defined by a magnetic field and an electric field of the signals generated by the antenna 301 and which includes a plane of the antenna 301. This definition also applies to the plane of polarization of the antenna 240. That is, the cartridge 220 and the device-side antenna 240 are positioned relative to each other such that the plane of polarization of the tag-side antenna 301 of each of the RFID tag circuit element 210A-1 which has just been taken out from the cartridge 220 and the RFID tag circuit elements 210A accommodated in the cartridge 220, and the plane of polarization of the device-side antenna 240 of the RFID tag reader 202' are inclined with respect to each other (so as to reduce a total area of projection of the antennas 240, 301), namely, inclined by about 90° with respect to each other in this example.

The third embodiment is almost identical with the second embodiment, in the other aspects.

The present third embodiment has the following advantages.

In the communication between two antennas, the communication signal between the two antennas has the highest intensity where the planes of polarization of the two antennas are parallel to each other, and the intensity of the communication signal decreases with an increase of an angle of inclination of the planes of polarization with respect to each other from the mutually parallel state. In the present embodiment, the plane of polarization of the tag-side antenna of each RFID tag circuit element 210A-1, etc. not desired to be accessed, and the plane of polarization of the device-side antenna 240 of the RFID tag reader 202' are inclined with respect to each other, and are not parallel to each other, so that the intensity of the communication signals is lower than the highest value. Accordingly, the device-side antenna 240 is communicable with only the RFID tag circuit element 210A-0 which has been taken out from the cartridge 220 and held in the accessible area. In particular, the present embodiment is arranged such that the planes of polarization of the tag-side antenna 301 and the device-side antenna 240 are inclined by 90° with respect to each other, the intensity of the communication signals between the tag-side antenna 301 of the RFID tag circuit elements 210A-1, etc. and the device-side antenna 240 of the RFID tag reader 202' is considerably reduced (to a level at which the communication is almost impossible), making it possible to effectively prevent an erroneous access to the RFID tag circuit elements 210A-1, etc. not desired to be accessed. Therefore, even when a radio frequency in the UHF band is used for communication, the RFID tag reader 202' can read the RFID tag information from the IC circuit portion 300 of only the RFID tag circuit element 210A-0 desired to be accessed, with a simple arrangement and in a simple manner, as described above, without the provision of a conventionally required shielding means, or without reduction of the signal output or without the provision of specific communication means for identification of individual RFID tag circuit elements.

Embodiment 4

Figure 45:
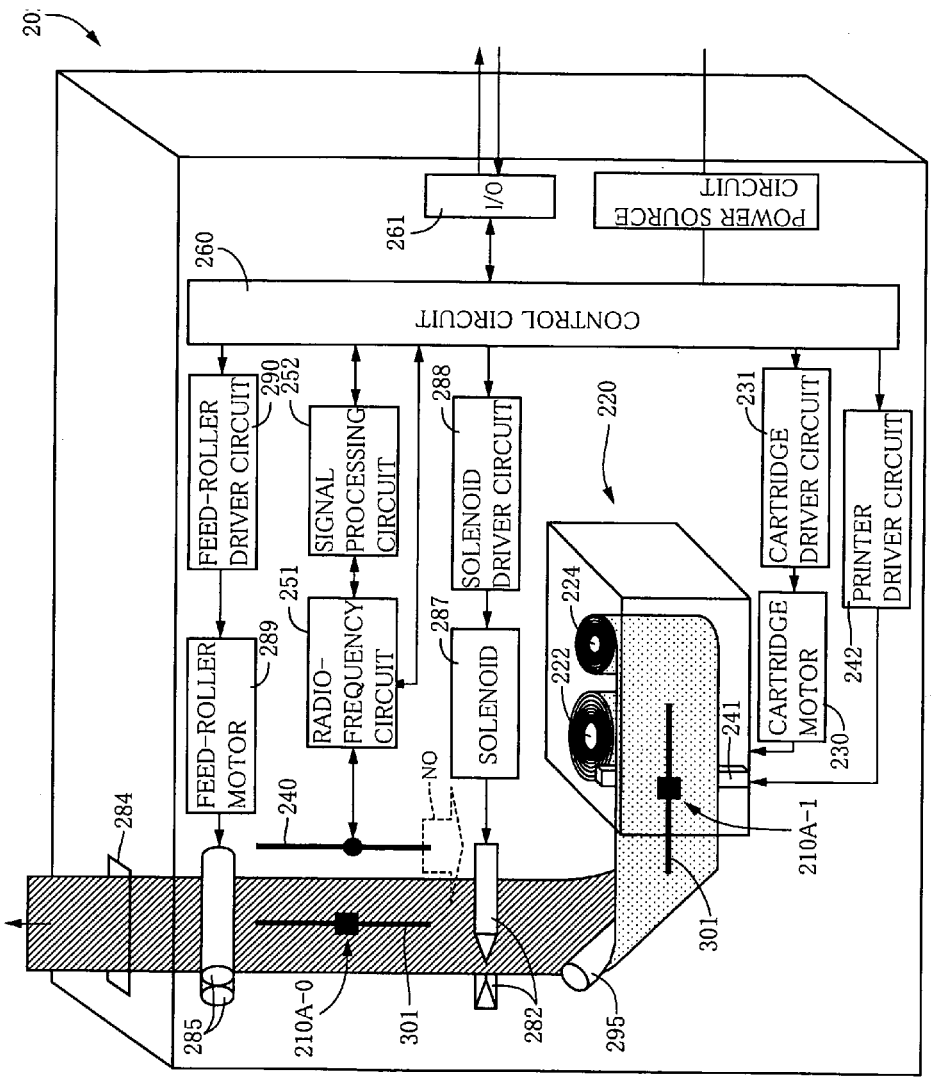
FIG. 45 is a view schematically showing in detail an arrangement of an RFID tag reader/writer according to a fourth embodiment of this invention.

Referring to FIG. 45, there will be described a fourth embodiment of the present invention.

The present embodiment utilizes both the directivity characteristics of the antennas according to the second embodiment, and the polarization plane characteristic of the antennas according to the third embodiment. The same reference signs as used in the second and third embodiments will be used to identify the corresponding elements of the fourth embodiment, the description of which will be omitted where appropriate.

FIG. 45 is a view which schematically shows in detail an arrangement of an RFID tag reader 202" according to the present embodiment and which corresponds to those of FIG. 36 of the second embodiment and FIG. 44 of the third embodiment. As in FIG. 44, the feeding guides 283 and the sensor 286 are not shown in FIG. 45, in the interest of brevity.

In the RFID tag reader 202", there is a deflecting feed roller 295, which serve as a deflecting portion operable to feed the tag tape 228 such that the direction of feeding of the tag tape 228 is changed during the feeding action of the tag tape 228. In this embodiment, the tag tape 228 fed from the cartridge 220 substantially in the horizontal direction (in the left direction as seen in FIG. 45) is first deflected upwards by the deflecting feed roller 295 to an accessible area opposite to the device-side antenna 240 extending substantially in the vertical direction, via the cutting position of the cutter 282. After the RFID tag information is read out from the RFID tag circuit element 210A, the tag tape 228 is cut by the cutter 282 to produce the RFID tag 210, which is then fed by the feed roller 295, so that the RFID tag 210 is fed out through the upper outlet 284. In this arrangement, the feeding path of the tag tape 228 is defined such that the plane of polarization of the tag-side antenna 301 of the RFID tag circuit element 210A-1 which has just been taken out from the cartridge 220, and the plane of polarization of the tag-side antenna 301 of the RFID tag circuit element 210A-0 held by the feeding guides 283 (not shown in FIG. 45) at the position opposite to the deice-side antenna 240 are inclined with respect to each other, namely, inclined by about 90° with respect to each other in this specific example.

Owing to the feeding path defined described above, the plane of polarization of the tag-side antenna 301 of each of the RFID tag circuit element 210A-1 which has just been taken out from the cartridge 220 and the RFID tag circuit elements 210A accommodated in the cartridge 220, and the plane of polarization of the device-side antenna 240 of the RFID tag reader 202' are inclined with respect to each other, namely, inclined by about 90° with respect to each other in this example, as in the third embodiment. In addition, the tag-side antenna 301 of the RFID tag circuit element 210A-1 which has just been taken out from the cartridge 220 and the tag-side antenna 301 of the RFID tag circuit elements 210A accommodated in the cartridge 220 are located in the area (area offset in the null direction No) in which the directivity of the device-side antenna 240 of the RFID tag reader 202" is almost equal to the lowest value, as in the second embodiment.

The fourth embodiment is almost identical with the second or third embodiment, in the other aspects.

The present embodiment has both the advantages of the second embodiment, and the advantages of the third embodiment.

That is, the RFID tag circuit elements 210A-1, etc. not desired to be accessed for information reading, which have just been taken out from the cartridge 220 or are accommodated in the cartridge 220 are located outside the area of directivity of the device-side antenna 240, namely, in the area offset in the null direction, so that the intensity of the communication signal from or to the device-side antenna 240 is considerably reduced. Further, since the planes of polarization of the tag-side antenna 301 and the device-side antenna 240 are inclined by 90° with respect to each other, the intensity of the communication signals between the tag-side antenna 301 of the RFID tag circuit element 210A-1 and the device-antenna 240 of the RFID tag reader 202" is considerably reduced (to a level at which the communication is almost impossible). Accordingly, the present fourth embodiment permits a higher degree of stability of information reading from only the desired RFID tag circuit element 210A-0, than the second and third embodiments.

In the present fourth embodiment, too, the RFID tag circuit-element accommodating portion may take any other form similar to the modified form of the second embodiment shown in FIG. 43.

Figure 46:
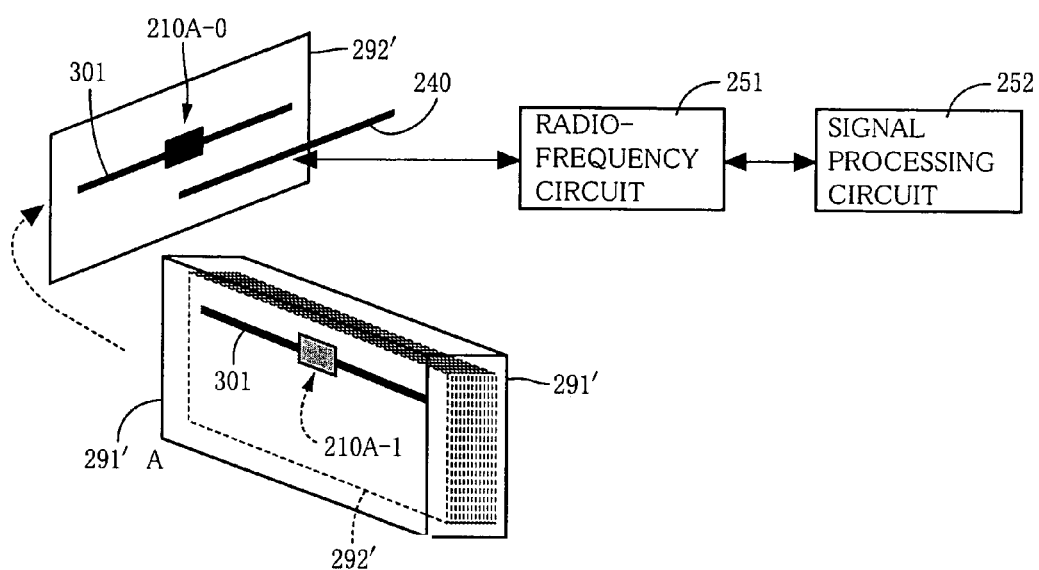
FIG. 46 is a perspective view schematically showing a modified arrangement of an RFID tag which is provided with a tray member functioning as a circuit-element accommodating portion.
Figure 47:
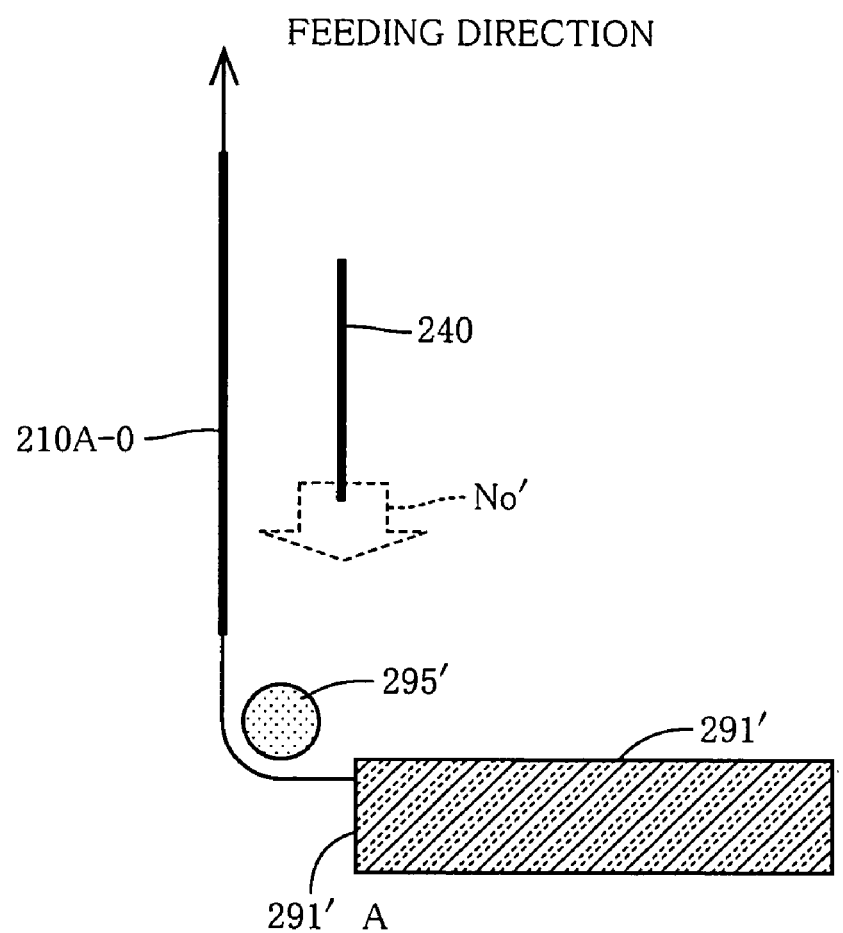
FIG. 47 is a plan view of the arrangement of FIG. 46.

FIG. 46 is a perspective view schematically showing an example of the modified form of the RFID tag circuit-element accommodating portion in the fourth embodiment, and FIG. 47 is a plan view of this modified form. In the interest of brevity, some parts of this RFID tag circuit-element accommodating portion are not shown.

In the modified form shown in FIGS. 46 and 47, there is provided a tray member 291' in the form of a substantially rectangular box standing upright, which serves as the RFID tag circuit-element accommodating portion. This tray member 291' accommodates a stack of a plurality of planar label elements 292' which are laminated on each other (in the vertical direction as seen in FIG. 47) and each of which carries one RFID tag circuit element 210A. The tray member 291' has an outlet 291'A open on one of its sides (on the left side as seen in FIG. 47), so that the planar label elements 292' are successively taken out from the tray member 291' through the outlet 291'A, whereby the RFID tag circuit elements 210A are successively taken out from the tray member 291'.

In the present modified form, the RFID tag circuit element 210A-0 which has just been taken out is deflected rightwards by 90° by a deflecting feed roller 295', and is located at a position opposite to the antenna 240 of the RFID tag reader.

In this arrangement, the RFID tag circuit elements 210A-1, etc. not desired to be accessed, which are accommodated in the tray member 291', are located outside the area of directivity of the device-side antenna 240, that is, offset from the device-side antenna 240 in a null direction No', and the planes of polarization of the tag-side antenna 301 and the device-side antenna 240 are inclined by 90° with respect to each other, so that the RFID tag reader can read the information from only the desired RFID tag circuit element 210A-0, as in the fourth embodiment.

In the second embodiment, its modification (shown in FIG. 43), the fourth embodiment and its modification (shown in FIGS. 46 and 47), the tag-side antennas 301 of all of the RFID tag circuit elements 210A-1, etc. accommodated in the RFID tag circuit-element accommodating portion (cartridge 220 or tray member 291 or 291') are located within the area (null area) in which the directivity of the device-side antenna 240 of the RFID tag reader 202 is almost equal to the lowest value. However, this arrangement is not essential. That is, for the purpose of preventing an erroneous reading by reducing a possibility of information reading from the RFID tag circuit elements 210A-1, etc. not desired to be accessed for information reading, as compared with that from the RFID tag circuit element 210A-0 desired to be accessed, the RFID tag circuit-element accommodating portion (cartridge 220 or tray member 291 or tray member 291') is merely required to be positioned such that the tag-side antenna 301 of the RFID tag circuit elements 210A-1, etc. not desired to be accessed are located in an area in which the directivity of the device-side antenna 240 of the RFID tag reader 202 is relatively low, for example, in an area in which the electric field intensity of the signal received from the device-side antenna 240 is not larger than one tenth of the electric field intensity at a position (in the accessible area) of the RFID tag circuit element 210A-0 desired to be accessed. In other words, the device-side antenna 240 of the RFID tag reader 202 is required to be positioned such that the sensitivity of the tag-side antennas 301 of the RFID tag circuit elements 210A-1, etc. not to be desired to be accessed is relatively low (for example, such that the intensity of the electric field of a signal which is received by the device-side antenna 240 and which is reflected from the tag-side antenna 301A is not larger than one tenth of that of a reflected signal received from the tag-side antenna 301 of the RFID tag circuit element 210A-0 desired to be accessed. This arrangement also has the same advantages.

In the third embodiment, the fourth embodiment and its modification (shown in FIGS. 46 and 47), the plane of polarization of the tag-side antenna 301 of each RFID tag circuit element 210A-1, etc. accommodated in the RFID tag circuit-element accommodating portion (cartridge 220), and the plane of polarization of the device-side antenna 240 of the RFID tag reader 202 are inclined by 90° with respect to each other. However, this arrangement is not essential. That is, for the purpose of preventing an erroneous reading by reducing the possibility of information reading from the RFID tag circuit elements 210A-1, etc. not desired to be accessed, as compared with that from the RFID tag circuit element 210A-0 desired to be accessed, the plane of polarization of the tag-side antennas 301 and the plane of polarization of the device-side antenna 240 of the RFID tag reader 202 are merely required to be inclined with respect to each other by a suitable angle, without parallelism of those two planes of polarization. In this sense, the two planes of polarization are required to be simply inclined with respect to each other. In this respect, it is noted that the intensity of the communication signals decreases with an increase of the angle of inclination of the two planes of polarization with respect to each other from the mutually parallel state, as described above. Preferably, the angle formed between the two planes of polarization is not smaller than 60° (and not larger than 90°), so that the intensity of the communication signals is reduced to a half of the intensity where the two planes of polarization are parallel to each other. The adjustment of this angle can be easily achieved by adjusting the angle of deflection of the substrate tape by the deflecting rollers 293, 294, or the deflecting roller 295 or 295'.

It is needless to say that the third embodiment described above may use an RFID tag circuit-element accommodating portion of a so-called stack type, such as the tray member 291 of FIG. 43 used in the modified form of the second embodiment, and the tray member 291' of FIGS. 46 and 47 used in the modified form of the fourth embodiment.

The RFID tag producing systems according to all of the embodiments described above and their modified forms are arranged to be able to read information from the RFID tags (but not able to write information on the RFID tags). However, these systems may be modified to be able to write information on the IC circuit portion 300 of the RFID tag circuit element 210A.

In this modification of the RFID tag reader 202, the radio-frequency circuit 251 is capable of functioning to obtain access to the RFID tag information in the IC circuit portion 300 of the RFID tag circuit element 210A through the device-side antenna 240, for writing information on the IC circuit portion 300, while the quartz oscillator 256, PLL 257 and VCO 256 of the transmitting portion 253 are capable of functioning as a carrier-wave generating portion operable to generate a carrier wave for access to the RFID tag information in the IC circuit portion 300, for writing the information on the IC circuit portion 300. Further, the signal processing circuit 252 is capable of functioning as an access-information generating portion operable to generate access information ("Erase" signal, "Verify" signal, "Program" signal, etc. which will be described) for access to the IC circuit portion 300.

In the above-described modification, the terminal 18 or the general-purpose computer 20 displays the printing 243, access ID (writing ID) of the RFID tag circuit element 210A, address of the article of commodity, and address of a storage of the corresponding information, as described with respect to the first embodiment by reference to FIG. 10. By manipulating the terminal 18 or the general-purpose computer 20, the RFID tag reader 202 is operated to print the printing 243 on the covering film 223, and write information such as the above-described writing ID and commodity information, on the IC circuit portion 300.

Figure 48:
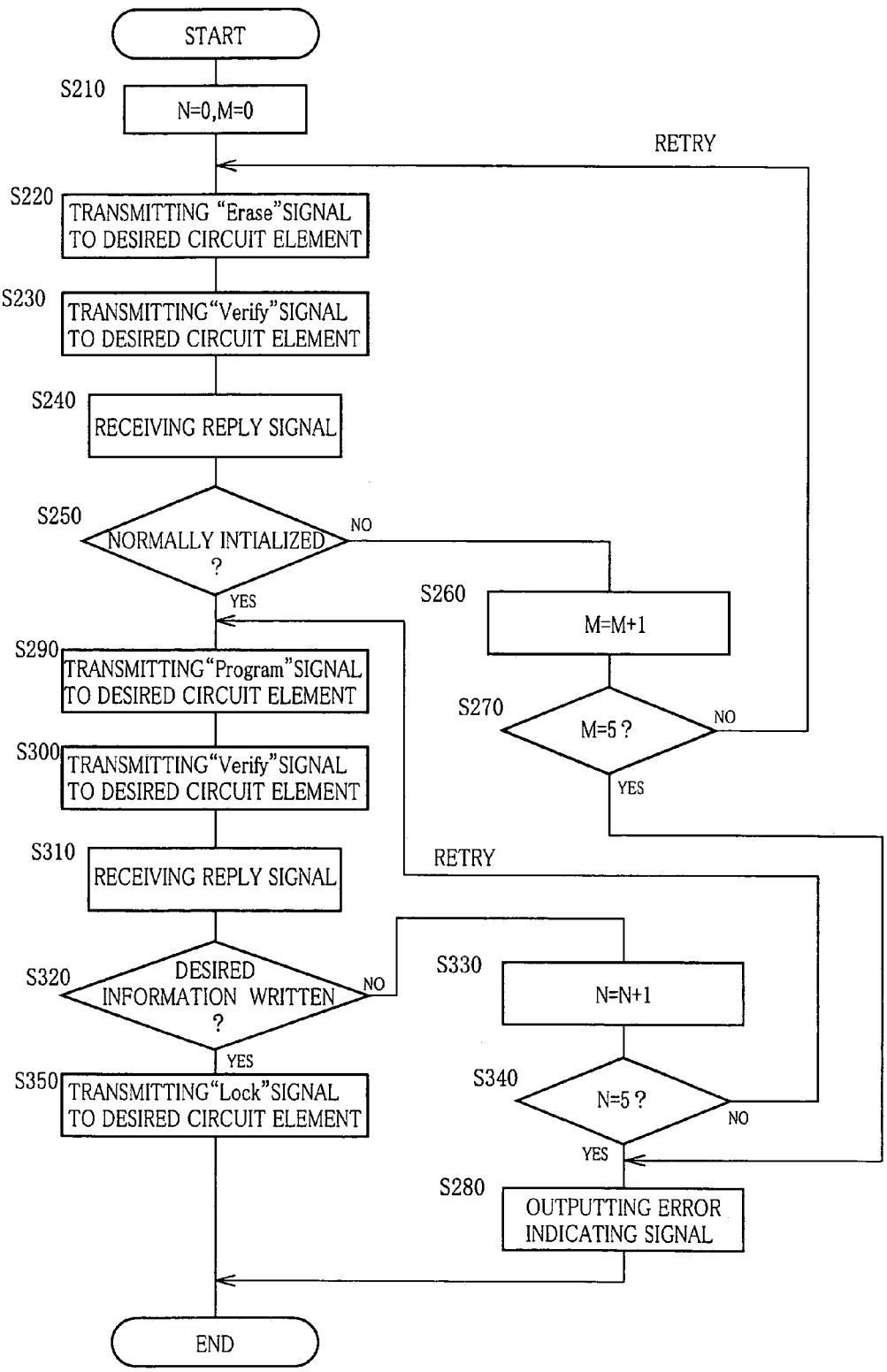
FIG. 48 is a flow chart illustrating a procedure to write information in an IC circuit portion of the RFID tag, which is controlled by a control circuit, in the modified arrangement.

Referring to the flow chart of FIG. 48, there is illustrated a routine executed by the control circuit 260, to write the RFID tag information on the IC circuit portion 300 of the RFID tag circuit element 210A, in the above-described modification.

As shown in FIG. 48, the routine is initiated when the information writing operation of the RFID tag reader 202 is performed. Initially, step S210 is implemented to initialize operands N and M which are provided to count the number of retry operations when there is a possibility of a communication failure.

Then, step S220 is implemented to transmit an Erase" command to the signal processing circuit 252. As a result, an "Erase" signal is generated as access information by the signal processing circuit 252, and is transmitted through the radio-frequency circuit 251 to the RFID tag circuit element 210A desired to be accessed (for information writing), and the memory portion 72 of this circuit element 210A is initialized.

Step S230 is then implemented to transmit a "Verify" command to the signal processing circuit 252. As a result, a "Verify" signal is generated as access information by the signal processing circuit 252, and is transmitted through the radio-frequency circuit 251 to the RFID tag circuit element 210A desired to be accessed for information writing, so that the circuit element 210A is requested to reply to the "Verify" signal. Step S240 is then implemented to receive through the antenna 240 a reply signal which is transmitted from the RFID tag circuit element 210A desired to be accessed, in response to the "Verify" signal. The received reply signal is fed to the radio-frequency circuit 251 and the signal processing circuit 252.

Then, step S250 is implemented to check the information in the memory portion 72 of the RFID tag circuit element 210A, on the basis of the reply signal, and to determine whether the memory 72 has been normally initialized.

If a negative decision is obtained in step S250, the control flow goes to step S260 to increment the count M, and to step S270 to determine whether the count M is equal to "5". If the counter M is equal to or smaller than "4", the negative decision is obtained in step S270, and the control flow goes back to step S220, so that the above-described steps are implemented again. If the count M is equal to "5", the control flow goes to step S280 to transmit an error indication signal to the terminal 18 or the general-purpose computer 20 through the input/output interface 261, for commanding the terminal 18 or general-purpose computer 20 to provide an indication of the information writing failure (error), and the execution of the present routine is terminated. Thus, up to five retry operations are performed in the event of abnormal initialization of the memory portion 72.

If an affirmative decision is obtained in step S250, the control flow goes to step S290 to transmit a "Program" command to the signal processing circuit 252. As a result, a "Program" signal is generated by the signal processing circuit 252, as the access information, that is, as the information desired to be written in the memory portion 72, and is transmitted through the radio-frequency circuit 241 to the RFID tag circuit element 210A desired to be accessed for information writing, so that the desired information is written in the memory portion 72.

Then, step S300 is implemented to transmit the "Verify" command to the signal processing circuit 252. As a result, the "Verify" signal is generated by the signal processing circuit 252, as the access information, and is transmitted through the radio-frequency circuit 251 to the RFID tag circuit element 210A desired to be accessed for information writing, so that the circuit element 210A is requested to transmit a reply signal. Step S310 is then implemented to receive through the antenna 240 the reply signal transmitted from the desired RFID tag circuit element 210A. The received reply signal is fed to the radio-frequency circuit 251 and the signal processing circuit 252.

Step S320 is then implemented to check the information stored in the memory portion 72 of the desired RFID tag circuit element 210A, on the basis of the reply signal, and to determine whether the desired information transmitted has been normally stored in the memory portion 72.

If a negative decision is obtained in step S320, the control flow goes to step S330 to increment the count N, and to step S340 to determine whether the count N is equal to "5". If the count N is equal to or smaller than "4", a negative decision is obtained in step S340, and the control flow goes back to step S290, and the following steps are implemented again. If the count N is equal to "5", the control flow goes to the above-described step S280 to command the terminal 18 or general-purpose computer 20 to provide an indication of the writing failure (error), and the execution of the present routine is terminated. Thus, up to five retry operations are performed in the event of the information writing failure.

If an affirmative decision is obtained in step S340, the control flow goes to step S350 to transmit a "Lock" command to the signal processing circuit 252. As a result, a "Lock" signal is generated by the signal processing circuit 252, and is transmitted through the radio-frequency circuit 251 to the RFID tag circuit element 210A desired to be accessed for information writing, for inhibiting writing of new information on this RFID tag circuit element 210A, and the execution of the present routine is terminated.

According to the routine described above, the desired information (RFID tag information) can be written on the IC circuit portion 300 of the RFID tag circuit element 210A desired to be accessed for information writing.

The present modified RFID tag reader/writer 202 has the basic structural and functional arrangements for writing the RFID tag information on the IC circuit portion 300, as described above. Further, the RFID tag circuit-element accommodating portion (cartridge 220, or tray member 291 or 291') and the device-side antenna 240 of the RFID tag reader/writer 202 are positioned relative to each other as in the second through fourth embodiments and their modified forms, so that the intensity of the communication signals between the RFID tag circuit element 210A-0 desired to be accessed for information writing and the device-side antenna 240 is relatively high, while on the other hand the intensity of the communication signals between the device-side antenna 240 and the RFID tag circuit elements 210A-1, 210A-2, etc. not desired to be accessed (circuit element 210A-1 which has just been taken out from the cartridge 220, etc., and the circuit elements 210A-2, etc. accommodated in the cartridge 220, etc.) is considerably reduced, so that the RFID tag reader/writer is communicable with only the desired RFID tag circuit element 210A-0. Therefore, even when a radio frequency in the UHF band is used for communication, the RFID tag reader/writer can write the RFID tag information on the IC circuit portion 300 of only the RFID tag circuit element 210A-0 desired to be accessed for information writing, with a simple arrangement and in a simple manner, as described above, without the provision of a conventionally required shielding means, or without reduction of the signal output or without the provision of specific communication means for identification of individual RFID tag circuit elements.

In the preceding embodiments, the cartridge or the tray member which is removably installed on the main body of the RFID tag reader/writer is used as the RFID tag circuit-element accommodating portion. However, the RFID tag circuit-element accommodating portion is not limited to those cartridge and tray member. For example, the RFID tag circuit-element accommodating portion need not be removable from the main body of the RFID tag reader/writer, and may be unremovably installed on the main body or formed integrally with the main body. Such modifications have substantially the same advantages as described above.

The RFID tag reader 202, RFID tag reader 202' and RFID tag reader 202" which have been described are arranged to read or write the RFID tag information from or on the IC circuit portion 300 of the RFID tag circuit elements 210A, and to perform a printing operation by the thermal head 241 to identify the RFID tag circuit elements 210A. However, the RFID tag reader need not be arranged to perform the printing operation, and may be arranged to perform only an operation to read or write the RFID tag information.

It is to be understood that various modifications not specifically described may be made to the second through sixth aspects of the invention, without departing from the spirit of the invention.

Embodiment 5

Referring to FIGS. 49 through 55, there will be described a fifth embodiment of this invention.

Figure 49:
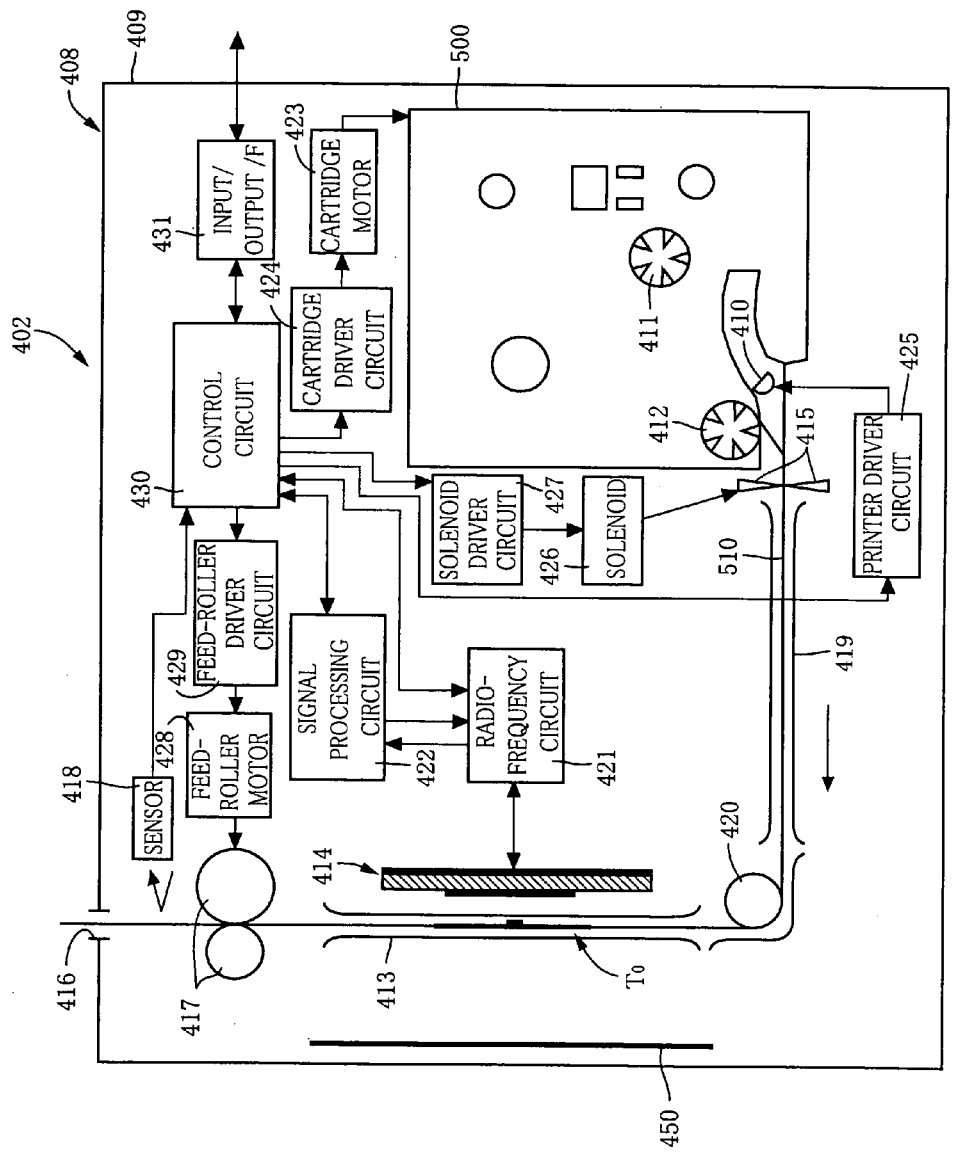
FIG. 49 is a view schematically showing in detail an arrangement of an RFID tag reader/writer according to a fifth embodiment of this invention.

FIG. 49 is a view schematically showing in detail an arrangement of an RFID tag reader/writer 402 according to one embodiment of a seventh aspect of the invention. This RFID tag reader/writer 402 is suitably used in the communication system 10 described above with respect to the first embodiment. Redundant description of the RFID tag reader/writer 402 is avoided. In the following description, the same reference signs as used in the first through fourth embodiments will be used to identify the corresponding elements, the description of which will be omitted.

As shown in FIG. 49, a main body 408 of the RFID tag reader/writer 402 has a recessed portion serving as a cartridge holding portion (not shown) in which a cartridge 500 is removably installed.

The main body 408, which is provided with the above-described cartridge holding portion in which the cartridge 500 is fitted, accommodates: a housing 409 providing an outer frame; a printing head (thermal head) 410 operable to perform a predetermined printing operation on a covering film 503 (described below by reference to FIG. 50); a ribbon take-up-roll drive shaft 411 for driving a ribbon-take up roll to take up a used length of an ink ribbon; a tape feed-roller drive shaft 412 for driving a tape feed roller to feed a printed tag tape 510 out of the cartridge 500; an antenna 414 for transmission and reception of signals to and from an RFID tag circuit element To (described below in detail), by radio communication using a radio frequency such as a UHF band; a cutter 415 operable to cut the printed tag tape 510 into RFID tags T in the form of a label having a predetermined length, at a predetermined timing; a pair of main feeding guides 413 for holding the RFID tag circuit element To in a predetermined accessible area opposite to the antenna 414, during the above-indicated signal transmission and reception by radio communication, and guiding each RFID tag T produced by the cutting operation; feed rollers 417 for feeding the guided RFID tag T to an outlet 416; a sensor 418 for detecting the RFID tag T present at the outlet 416; a pair of auxiliary feeding guides 419 disposed between the cutter 415 and the main feeding guides 413; and a deflecting feed roller 420 disposed between the auxiliary feeding guides 419 and the main feeding guides 413 and operable to change a feeding direction of the printed tag tape 510 by 90°.

The sensor 418 is a light-transmitting type photoelectric sensor consisting of a light emitter and a light receiver, for example. When the RFID tag T is not present between the light emitter and receiver, a light emitted from the light emitter is received by the light receiver. When the RFID tag T is present between the light emitter and receiver, on the other hand, the light emitted from the light emitter is intercepted, so that the output of the light receiver is reversed.

Further, the main body 408 incorporates: a radio-frequency circuit 421 operable to obtain access to (read information from or write information on) the above-described RFID tag circuit element To through the antenna 414; a signal processing circuit 422 operable to process signals read out from the RFID tag circuit element To; a cartridge motor 423 for driving the above-described ribbon take-up roll drive shaft 411 and tape feed-roller drive shaft 412; a cartridge driver circuit 424 for controlling the cartridge motor 423; a printer driver circuit 425 for controlling the energization of the above-described printing head 410: a solenoid 426 for driving the above-described cutter 415 to perform the cutting operation; a solenoid driver circuit 427 for controlling the solenoid 426; a feed-roller motor 428 for driving the above-described feed rollers 417; a feed-roller driver circuit 429 for controlling the feed-roller motor 428; and a control circuit 430 for controlling the RFID tag reader/writer 402 as a whole through the above-described radio-frequency circuit 421, signal processing circuit 422, cartridge driver circuit 424, printer driver circuit 425, solenoid driver circuit 427, feed-roller driver circuit 429, etc.

The control circuit 430 is a so-called microcomputer which incorporates a CPU functioning as a central processing unit, a ROM, and a RAM and which operates to perform signal processing operations according to programs stored in the ROM, while utilizing a temporary data storage function of the RAM. This control circuit 430 is connected to the communication line described above with respect to the first embodiment, through an input/output interface 431, for transmission and reception of information to and from the above-described route server 16, terminal 18, general-purpose computer 20 and information servers 22 which are connected to the communication line.

Figure 50:
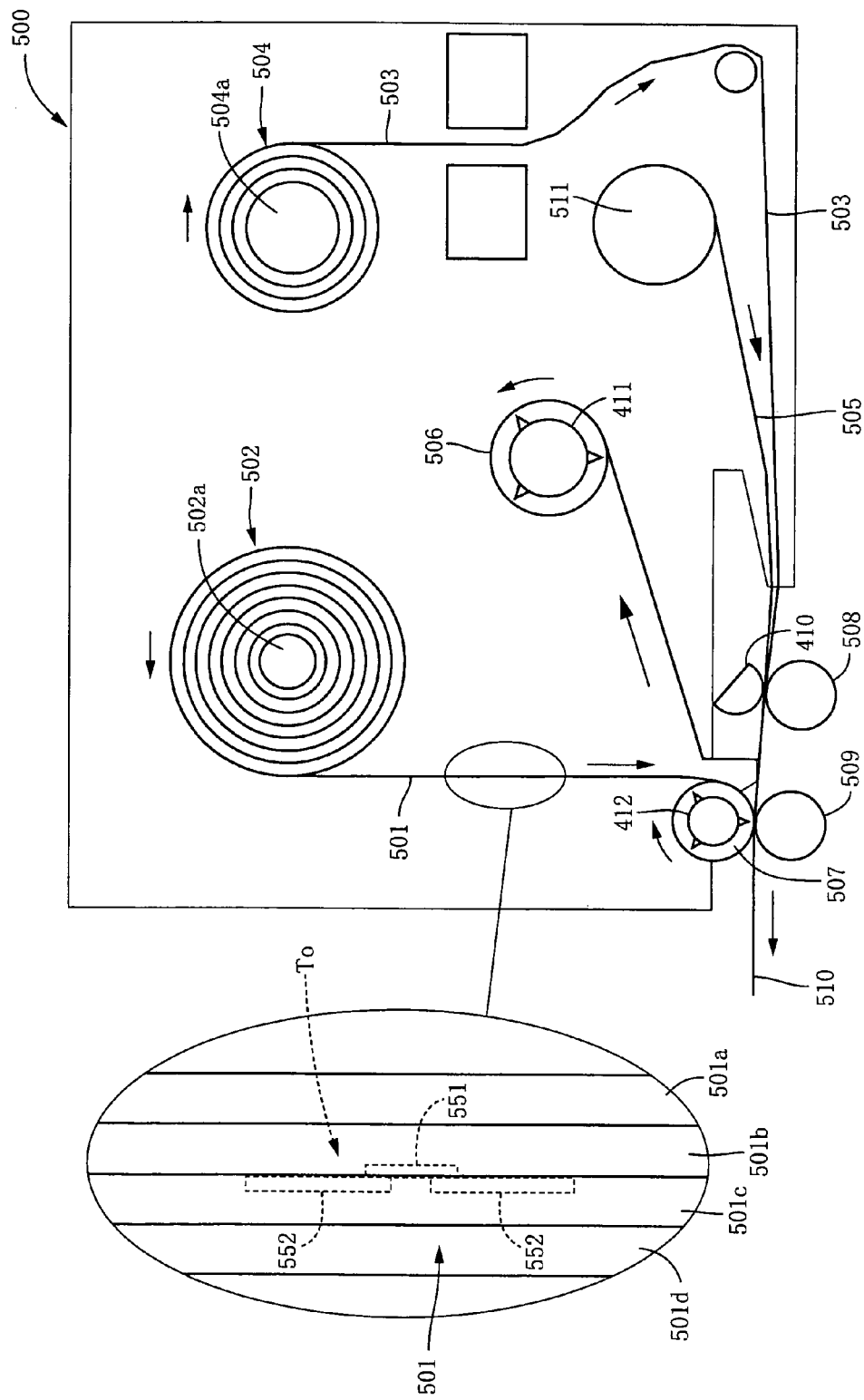
FIG. 50 is a side elevational view showing in detail a structural arrangement of a cartridge shown in FIG. 49.

FIG. 50 is a view showing in detail a structural arrangement of the cartridge 500.

As shown in FIG. 50, the cartridge 500 includes: the above-described first roll 502 which is a roll of the above-described substrate tape (tag tape or label material in the form of a tape) 501; the above-described second roll 504 which is a roll of the above-described transparent covering film 503 having almost the same width as the substrate tape 501; a ribbon-supply-side roll 511 which is a roll of the above-described ink ribbon 505; the above-described ribbon-take-up roll 506 for taking up the used length of the ribbon 505; and the above-described tape feed roller 507 for pressing the substrate tape 501 and the covering film 503 onto each other for bonding them together into a printed tag tape 510, and feeding the tag tape 510 in the direction indicated by an arrow-headed line.

The first roll 502 is held by a reel member 502a such that the substrate tape 501 carrying the plurality of RFID tag circuit elements To formed successively in the longitudinal direction is wound on the reel member 502a. The second roll 504 is held by a reel member 504a such that the covering film 503 is wound on the reel member 504a.

The ribbon-take-up roll 506 and the tape feed roller 507 are rotated by the cartridge motor 423 (shown in FIG. 49) which is a stepping motor disposed outside the cartridge 500, such that a drive force of the cartridge motor 423 is transmitted to the above-described ribbon take-up-roll drive shaft 411 and the above-described tape feed-roll drive shaft 412.

The substrate tape 501 wound as the first roll 502 consists of four layers (as shown in enlargement in FIG. 50), which are an adhesive layer 501a, a colored base film 501b formed of PET (polyethylene terephthalate), for example, an adhesive layer 501c, and a releasing paper layer 501d, which are laminated in the order of description in a direction from the inner side (right side as seen in FIG. 50) toward the opposite side (left side as seen in FIG. 50).

An IC circuit portion 551 is formed integrally on the back side (on the left side as seen in FIG. 50) of the base film 501b, and tag-side antennas 552 are formed on the back surface of the base film 501b. The tag-side antennas 552 are connected to the IC circuit portion 551 and arranged to effect transmission and reception of information. The IC circuit portion 551 and each tag-side antenna 552 constitute the RFID tag circuit element To.

The above-described adhesive layer 501a for subsequently bonding the covering film 503 is formed on the front surface (on the right side as seen in FIG. 50) of the base film 501b, while the above-described adhesive layer 501c on which the releasing paper layer 501d is bonded is formed on the back surface of the base film 503. When the produced RFID tag T is bonded to a desired article of commodity, the releasing paper layer 501d is removed, so that the RFID tag T is bonded to the article through the adhesive layer 501c.

The ribbon-supply-side roll 511 and the ribbon take-up roll 506 are disposed on the back side of the covering film 503 (on which the covering film 503 is bonded to the substrate tape 501) so that the ribbon 505 being fed is pressed by the above-described printing head 410 into pressing contact with the back surface of the covering film 503.

In this arrangement, upon installation of the cartridge 500 in the main body 408, the above-described roller holder is moved from a non-contact position to a contact position, so that the covering film 503 and the ink ribbon 505 are sandwiched between the printing head 410 and a platen roller 508, while the substrate tape 501 and the covering film 503 are sandwiched between the tape feed roller 507 and a sub roller 509. The ribbon take-up roll 506 and the tap feed roller 507 are rotated by the drive force of the cartridge motor 423 in the direction indicated by the arrow-headed line, in synchronization with each other. The above-described tape feed-roller drive shaft 412, sub roller 509 and platen roller 508 are connected to each other through gears (not shown), so that a rotary motion of the tape feed-roller drive shaft 412 causes rotary motions of the tape feed roller 507, sub roller 509 and platen roller 508, whereby the substrate tape 501 of the four-layer structure is fed from the first roll 502, while the covering film 503 is fed from the second roll 504. At the same time, a plurality of heat generating elements of the printing head 410 are energized by the printer driver circuit 425, so that a desired printing R in the form of letters, symbols or bar codes, for example, is printed on the back surface of the covering film 503 (on its surface on the side of the adhesive layer 501a). Since the printing R is printed on the back surface of the covering film 501, the printing R in the form of letters, for example, is printed as a mirror image as seen toward the printing R on the back side of the covering film 503. After this printing operation, the covering film 503 is boned to the four-layer substrate tape 501 by means of the tape feed roller 507 and sub roller 509, to produce the printed tag tape 510, and the tag tape 510 is fed out of the cartridge 500. The length portion of the ink ribbon 505 which has been used for the printing operation on the covering film 503 is taken up by the ribbon take-up roll 506 rotated by the ribbon take-up-roll drive shaft 411.

Since the function of the above-described radio-frequency circuit 421 in the present embodiment is identical with that in the second through fourth embodiment described above by reference to FIG. 38, the description of this radio-frequency circuit 421 is omitted. Similarly, the description of each RFID tag circuit element To of the printed tag tape 510 in the present embodiment is omitted, since the functional arrangement of this RFID tag circuit element To is identical with the arrangement in the first embodiment described above by reference to FIG. 3. Similarly, the description of the procedure to read the RFID tag information from the IC circuit portion 551 of the RFID tag circuit element To under the control of the control circuit 430 in the present embodiment is omitted, since this procedure is identical with that in the second through fourth embodiments described above by reference to the flow chart of FIG. 39.

While the basic arrangement of the present RFID tag reader/writer 402 of the present embodiment has been described, the most prominent feature of the RFID tag reader/writer 402 resides in that the device-side antenna 414 is a micro strip antenna (directional antenna) which has a directivity of radiating a wave in a single direction, and in that the main feeding guides 413 are spaced from the device-side antenna 414 in a direction of directivity of the device-side antenna 414 (in the left direction as seen in FIG. 49), while the cartridge 500 is spaced from the device-side antenna 414 in a direction opposite to the direction of directivity of the device-side antenna 414 (in the right direction as seen in FIG. 49), as shown in FIG. 49. Further, a shielding portion (shielding plate) 450 for reducing an intensity of a communication wave signal is provided such that the shielding portion 450 is spaced from the feeding guides 413 in the direction of directivity of the device-side antenna 414 (in the left direction as seen in FIG. 49). Since the shielding portion 450 is required to prevent leakage of an electromagnetic wave into the exterior, the shielding portion 450 may be of a net or stripe type or a metal plating.

Figure 51:
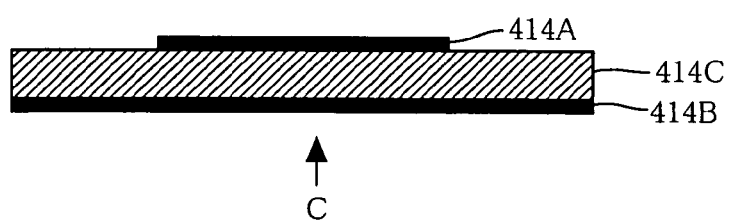
FIG. 51 is a side elevational view showing in detail a structural arrangement of an antenna shown in FIG. 49.
Figure 52:
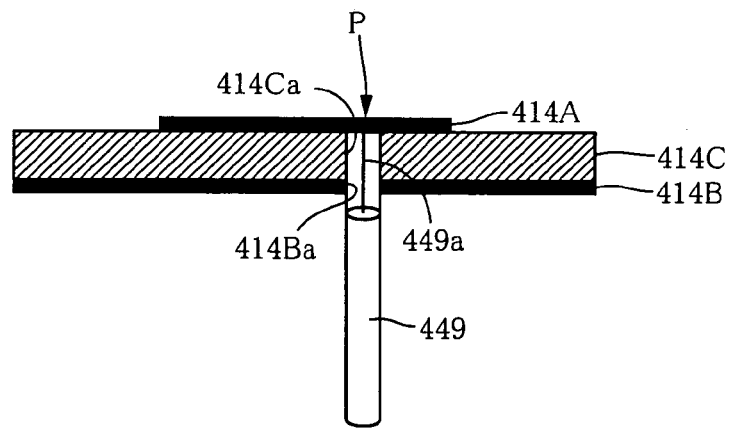
FIG. 52 is a cross sectional view showing in detail the structural arrangement of the antenna shown in FIG. 49.

FIG. 51 is a side elevational view showing in detail a structural arrangement of the antenna 414, while FIG. 52 is a cross sectional view of the antenna 414.

As shown in FIGS. 51 and 52, the device-side antenna 414 is provided on one of its opposite surfaces (on its upper surface as seen in the figures) with a circular micro strip antenna element 414A having a radius almost equal to a half of the wavelength, and on the other surface (on its lower surface as seen in the figures) with a base plate 414B. Namely, the micro strip antenna element 414A and the base plate 414B are formed on the respective opposite surfaces of an intermediate dielectric body 414C.

The base plate 414B and the dielectric body 414C have respective through-holes 414Ba, 414Ca which are offset from their centers in the radial direction by about ¼ of the wavelength. A coaxial cable 449 which serves as a power supply wire for the device-side antenna 414 and one end portion of which is connected to the radio-frequency circuit 421 (as shown in FIG. 49) extends at the other end portion through the through-holes 414Ba, 414Ca such that a central conductor 449a is connected at the other end portion to a power supply point P of the micro strip antenna element 414A, which power supply point P is offset from the radial center of the element 414A by about ¼ of the wavelength. It is noted that the micro strip antenna element 414A may have a square shape.

Figure 53:
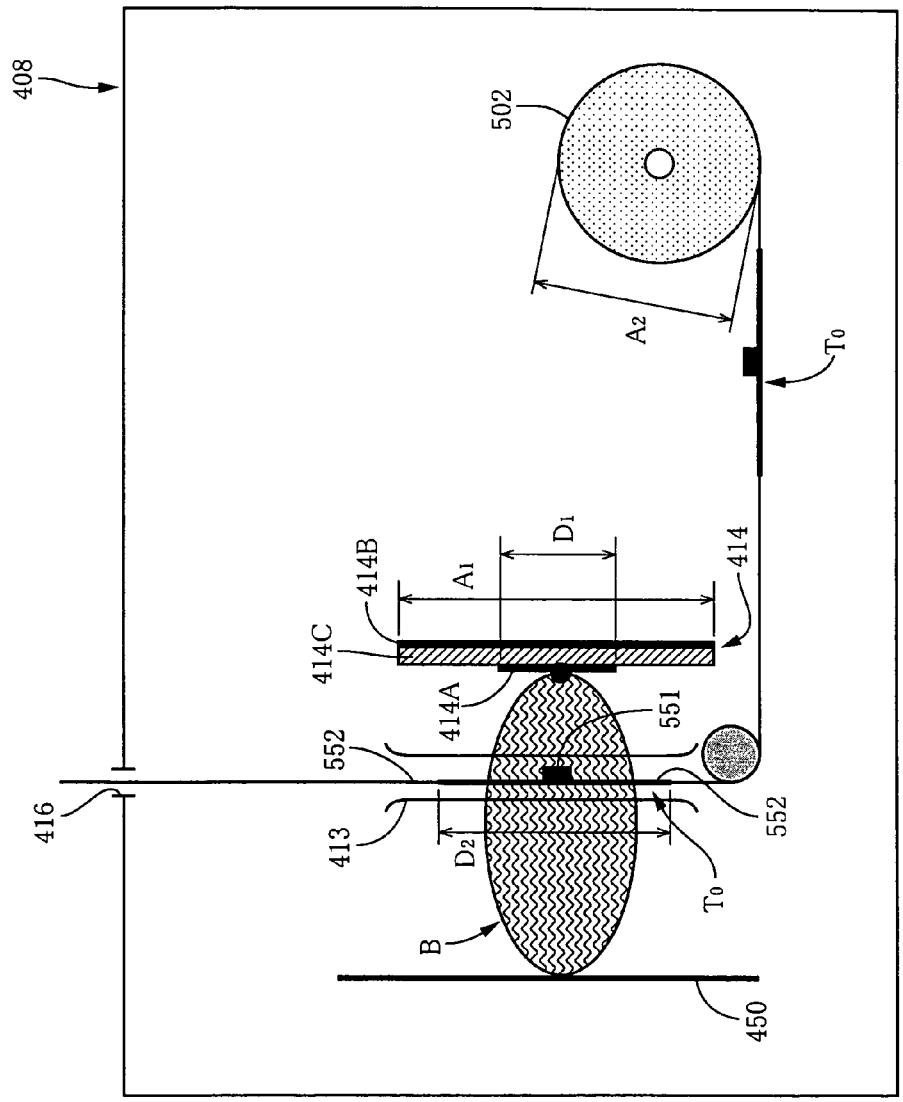
FIG. 53 is a view schematically illustrating major elements shown in FIG. 49, such as main feeding guides and a cartridge.

Referring to FIG. 53, there are briefly and schematically illustrated major elements of the construction shown in FIG. 49, such as the main feeding guides 413 and cartridge 500.

As shown in FIG. 53, the main feeding guides 413 are disposed on the side of the micro strip antenna element 414A, while the cartridge 500 provided with the first roll 502 is disposed on the side of the base plate 414B. It is particularly noted that a dimension D1 of the micro strip antenna element 414A in the longitudinal direction of the tag-side antenna 552 is smaller than a longitudinal dimension D2 of the antenna 552. It is also noted that the outlet 416 is spaced from the device-side antenna 414 in a direction (in the vertical direction as seen in FIG. 53) substantially perpendicular to the direction of directivity of the device-side antenna 414, while the base plate 414B has a size (surface area) A1 larger than a surface area of projection A2 of the first roll 502 in the cartridge 500 as seen from the device-side antenna 414.

It will be understood from the foregoing description that the first roll 502 serves as an RFID tag circuit-element accommodating portion for accommodating a plurality of RFID tag circuit elements such that the RFID tag circuit elements can be successively taken out, and that the feeding guides 413 serves as an RFID tag circuit-element holding portion for holding each of the RFID tag circuit elements successively taken out from the RFID tag circuit-element accommodating portion, in a predetermined accessible area in which the directional antenna obtains access to the RFID tag information.

There will be described an operation of the present embodiment constructed described above.

The present RFID tag reader/writer 402 is arranged to obtain access to (to read the RFID tag information from the IC circuit portion 551 of) the RFID tag circuit elements To which are successively taken out from the printed tag tape 510 fed out from the cartridge 500 and held by the main feeding guides 413 in the predetermined position (in the accessible area) opposite to the device-side antenna 414. That is, the access information (above-described "Scroll All ID" signal) generated by the signal processing circuit 422 of the RFID tag reader/writer 402 is used by the first mixer 271, to modulate the carrier wave from the VCO 258, and the modulated carrier wave is amplified by the transmission-side amplifier 272. The amplified carrier wave is transmitted from the device-side antenna 414 to the IC circuit portion 551 of each RFID tag circuit element To, in a non-contact fashion. Where a radio frequency in a UHF band is used for radio communication, the communication distance inherently tends to be large, so that there is a high possibility that the RFID tag information is read out from not only the desired RFID tag circuit element To held by the main feeding guides 413, but also the following RFID tag circuit elements To (the RFID tag circuit element which has just been taken out from the cartridge 500, and the other RFID tag circuit elements still accommodated within the cartridge 500).

In view of the above-described drawback, the RFID tag reader/writer 402 according to the present embodiment is arranged such that the micro strip antenna having a directivity in one direction is used as the device-side antenna 414, and the main feeding guides 413 which define the accessible area are disposed such that the main feeding guides 413 are spaced from the device-side antenna 414 in the direction of directivity of the device-side antenna 414, while the cartridge 500 accommodating the plurality of RFID tag circuit elements To is spaced from the device-side antenna 414 in the direction opposite to the direction of directivity of the device-side antenna 414. In this arrangement, a sensitivity of the device-side antenna 414 with respect to the RFID tag circuit element To held in the accessible area (area B shown in FIG. 53) is relatively high so that an intensity of a radio communication signal is relatively high, while the sensitivity of the device-side antenna 414 with respect to each RFID tag circuit element To accommodated in the first roll 502 in the cartridge 500 and the RFID tag circuit element To at the outlet 416 is relatively low so that the intensity of the radio communication signal is relatively low. Accordingly, the RFID tag reader/writer 402 can obtain access to the RFID tag information of the IC circuit portion of only the RFID tag circuit element To which has been taken out from the cartridge 500 and which is currently held by the main feeding guides 413. Therefore, even when a radio frequency in the UHF band is used for communication, the RFID tag reader/writer 402 can read the RFID tag information from the IC circuit portion 551 of only the RFID tag circuit element To desired to be accessed for information reading, with a simple arrangement and in a simple manner, as described above, without the provision of a conventionally required shielding means, or without reduction of the signal output or without the provision of specific communication means for identification of individual RFID tag circuit elements.

When a communication signal is transmitted and received between the micro strip antenna element 414A and the tag-side antenna 552 of the RFID tag circuit element To where these two antennas are located close to each other, a radiation of the communication signal in the direction of directivity of the micro strip antenna element 414A from a portion of the antenna element 414A which is outside the longitudinal dimension D2 of the tag-side antenna 552 is unlikely to be received by the tag-side antenna and is likely to leak. In view of this fact, the RFID tag reader/writer 402 of the present embodiment is arranged such that the longitudinal dimension D1 of the micro strip antenna element 414A is made smaller than the longitudinal dimension D2 of the tag-side antenna 552, so that the information can be transmitted and received between the device-side antenna 414 and the tag-side antenna 552, with high efficiency.

Further, the size (surface area) A1 of the base plate 414B is made larger than the surface area of projection A2 of the first roll 502 as seen from the device-side antenna 414, to effectively prevent leakage of the communication signal toward the cartridge 500, beyond the base plate 414B.

In addition, the shielding portion 450 is provided to prevent the radiation of the communication signal in the direction of directivity of the device-side antenna 414 far beyond the tag-side antenna 552 (beyond the area B shown in FIG. 53), and consequent leakage of the signal into the exterior of the device 402, while assuring transmission and reception of the communication signal between the device-side antenna 414 and the tag-side antenna 552 held by the main feeding guides 413.

Further, the outlet 416 is spaced from the device-side antenna 414 in the direction substantially perpendicular to the direction of directivity of the device-side antenna 414, so that the intensity of the communication signal received at the outlet 416 from the device-side antenna 414 is relatively low. In this respect, too, the leakage of the signal into the exterior of the device 402 can be reduced. As described on page 100, "Plane Small-Sized Antenna", Society of Electronic Information Communication, 1996, Sou Haishi, Ikkou Hirasawa and Yasuo Suzuki, it is generally known of a micro strip antenna that a difference between the highest electric field intensity in the direction of directivity (on the front side) and the lowest electric field intensity on the rear side (back side) is about 20 dB, while a difference between the highest electric field intensity in the direction of directivity and an intermediate electric field intensity in the direction (lateral direction) perpendicular to the direction of directivity is about 10 dB. In this sense, the leakage of the signal can be reduced as described above, by positioning the outlet 416 such that the outlet 416 is spaced from the device-side antenna 414 in a direction in which the electric field intensity of the directional antenna 414 is lower by at least 10 dB than that in the direction of directivity, namely, in the lateral direction or in a direction inclined with respect to the lateral direction toward the back side of the device-side antenna 414.

Although the base plate 414B in the preceding embodiment has a simple flat configuration, the base plate may have any other configuration, as in a modification which will be described by reference to FIG. 54.

Figure 54:
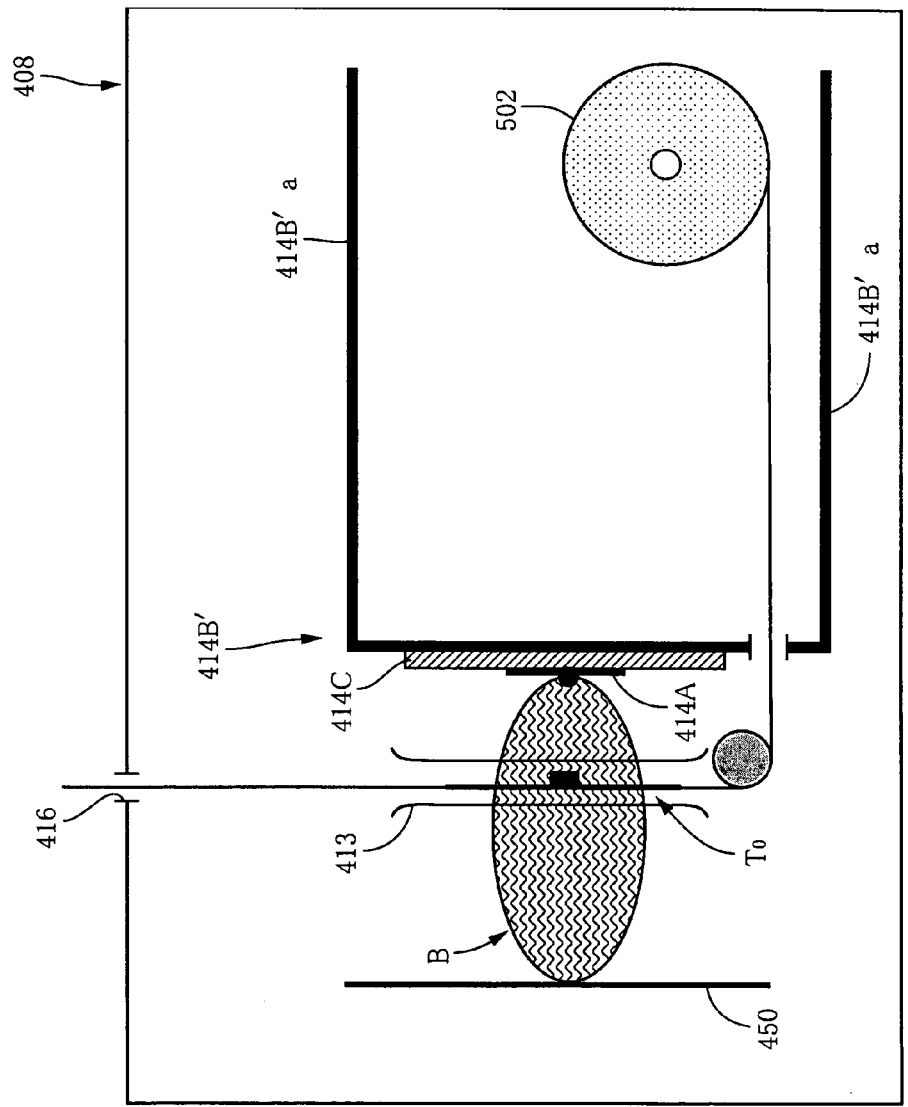
FIG. 54 is a view showing a modification provided with a base plate of another configuration.

FIG. 54, which substantially corresponds to FIG. 53, shows an example of the modification in the form of a base plate 414B' having a modified configuration.

As shown in FIG. 54, the base plate 414B' is substantially U-shaped and has side wall portions 414B'a extending in the direction toward the first roll 502 and away from the micro strip antenna element 414A. The side wall portions 414B'a may be located adjacent to the respective walls of the cartridge 500 in which the first roll 502 is accommodated. Alternatively, the side wall portions 414B' may constitute the housing of the cartridge 500 and eliminate the cartridge 500 (and may be removably or fixedly installed).

In the present modification, the side wall portions 414B'a of the base plate 414B' which cover the first roll 502 in its lateral direction are effective to prevent leakage of the communication signal beyond the base plate 414B' toward the first roll 502, with increased stability.

In the above-described embodiment of FIG. 51, the coaxial cable 449 which is a signal line for the device-side antenna 414 extends in a direction substantially perpendicular to the planes of the micro strip antenna element 414A, base plate 414B and dielectric body 414C. However, the coaxially cable 449 may be connected in any other manner.

Figure 55:
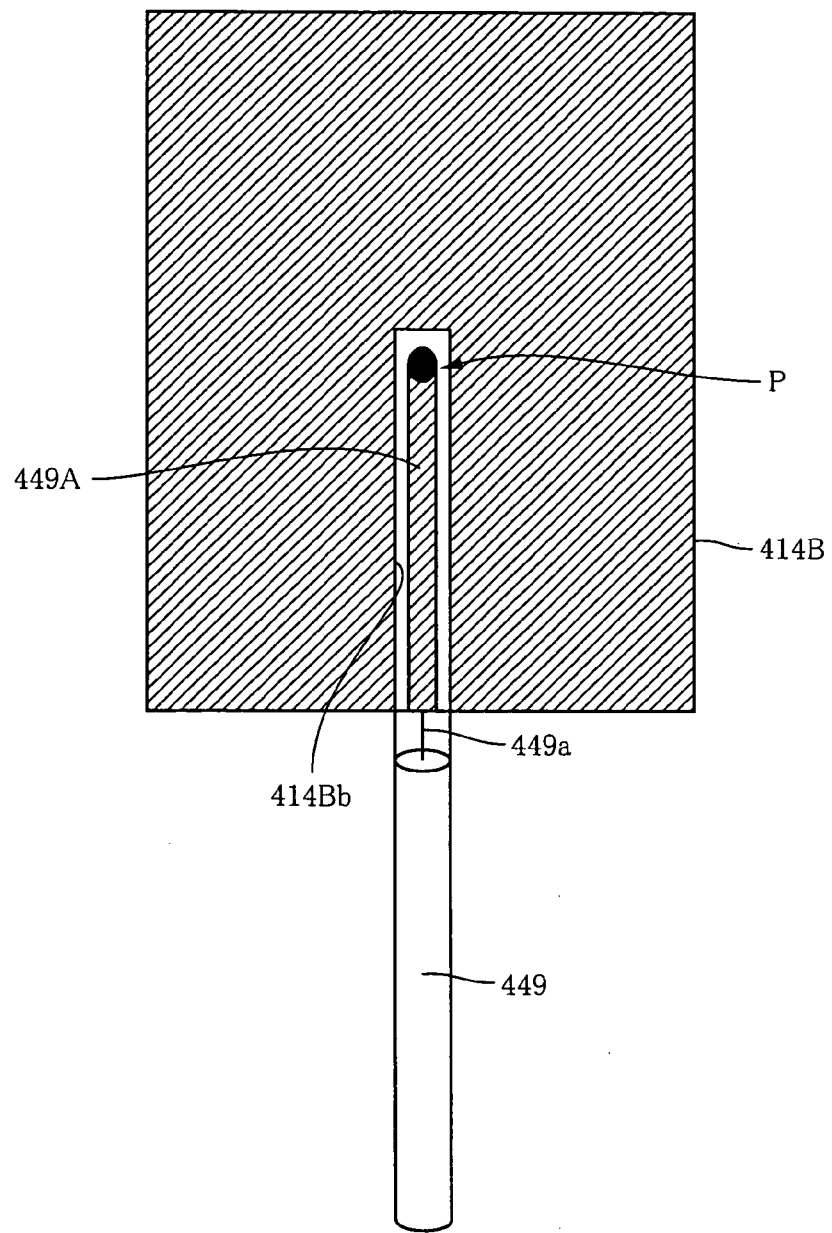
FIG. 55 is a bottom plan view equivalent to a view taken in a direction of arrow-headed line C of FIG. 51, showing a modification relating to an arrangement of signal line connection to the antenna.

FIG. 55 is a bottom plan view as seen in a direction arrowheaded line C in FIG. 51, which shows an example of such a modification. In the modification of FIG. 55, the base plate 414B has a groove 414Bb formed in the back surface so as to extend substantially in the horizontal direction, and a power supply wire 449A leading to the power supply point P of the base plate 414B is accommodated in this groove 414Bb, so as to extend substantially in the horizontal direction. The central conductor 449a of the coaxial cable 449 is connected to an end portion of the power supply wire 449A exposed outside the periphery of the base plate 414B, such that the central conductor 449a extends substantially in the horizontal direction.

In this modification, the coaxial cable 449 which is substantially parallel to the planes of the micro strip antenna element 414A, base plate 414B and dielectric body 414C can be installed in a space whose dimension in the longitudinal direction of the coaxial cable 449 is not so large, contrary to the space required for the coaxial cable 449 in the embodiment constructed as shown in FIG. 51.

In the preceding embodiment, the RFID tag circuit-element accommodating portion is constituted by the first roll 502 which is a roll of the substrate tape 501 having a succession of the RFID tag circuit elements To formed thereon, and which is held by the reel member 502a. However, the RFID tag circuit-element accommodating portion may take any other form.

For example, the RFID tag circuit-element accommodating portion may be a tray member (not shown) in the form of a substantially rectangular box having a horizontally extending attitude. This tray member accommodates a stack of a plurality of planar label elements which are laminated on each other and each of which carries one RFID tag circuit element To formed thereon. The tray member has an outlet open on one of its sides, so that the planar label elements are successively taken out from the tray member through the outlet, whereby the RFID tag circuit elements To are successively taken out from the tray member.

In this modification, too, the main feeding guides 413 are spaced from the device-side antenna 414 in the direction of directivity of the antenna 414, while the tray member is spaced from the device-side antenna 414 in the direction opposite to that direction of directivity, so that the intensity of the radio communication signal received from the device-side antenna 414 by the RFID tag circuit element To desired to be accessed for information reading is relatively high, while the intensity of the radio communication signal received by the RFID tag circuit elements To not desired to be accessed for information reading (including the RFID tag circuit element present at the outlet 416) is relatively low. Thus, the present modification has substantially the same advantages as described above.

The RFID tag producing system according to the preceding embodiment is arranged to be able to read information from the RFID tags (but not able to write information on the RFID tags). However, the RFID tag producing system may be modified to be able to write information on the IC circuit portion 551 of the RFID tag circuit element To.

In this modification of the RFID tag reader/writer 402, the radio-frequency circuit 451 is capable of functioning to obtain access to the RFID tag information in the IC circuit portion 551 of the RFID tag circuit element To through the device-side antenna 414, for writing information on the IC circuit portion 551, while the quartz oscillator 256, PLL 257 and VCO 256 of the transmitting portion 253 are capable of functioning as a carrier-wave generating portion operable to generate a carrier wave for access to the RFID tag information in the IC circuit portion 551, for writing the information on the IC circuit portion 551. Further, the signal processing circuit 422 is capable of functioning as an access-information generating portion operable to generate access information ("Erase" signal, "Verify" signal, "Program" signal, etc. which will be described) for access to the IC circuit portion 551.

In the above-described modification, the terminal 18 or the general-purpose computer 20 displays the printed letters R, access ID (writing ID) of the RFID tag circuit element To, address of the article of commodity, and address of a storage of the corresponding information, as described with respect to the first embodiment by reference to FIG. 10. By manipulating the terminal 18 or the general-purpose computer 20, the RFID tag reader/writer 402 is operated to print the letters R on the covering film 503, and write information such as the above-described writing ID and commodity information, on the IC circuit portion 551.

In the present modification, the routine executed by the control circuit 430 to write the RFID tag information on the IC circuit portion 551 of the RFID tag circuit element To is identical with the routine described above. with respect to the second through fourth embodiments by reference to the flow chart of FIG. 48.

In the above-described basic structural and functional arrangement of the present modification wherein the RFID tag information is written on the IC circuit portion 551, the first roll 502 or tray member, and the device-side antenna 414 and the main feeding guides 413 of the RFID tag reader/writer 402 may be positioned relative to each other, as in the preceding embodiment, so that the intensity of the radio communication signal received from the device-side antenna 414 by the RFID tag circuit element To desired to be accessed for information writing is relatively high, while on the other hand the intensity of the radio communication signal received by each RFID tag circuit element To which is accommodated in the cartridge 500 or which has just been taken out from the cartridge 500, or by the RFID tag circuit element To present at the outlet 416, is relatively low, whereby the RFID tag reader/writer 402 is communicable with only the RFID tag circuit element To desired to be accessed for information writing. Therefore, even when a radio frequency in the UHF band is used for communication, the RFID tag reader/writer 402 can write the RFID tag information on the IC circuit portion 551 of only the RFID tag circuit element To desired to be accessed for information reading, with a simple arrangement and in a simple manner, as described above, without the provision of a conventionally required shielding means, or without reduction of the signal output or without the provision of specific communication means for identification of individual RFID tag circuit elements.

In the preceding embodiment, the cartridge 500 or the tray member which is removably installed on the main body of the RFID tag reader/writer is used as the RFID tag circuit-element accommodating portion. However, the RFID tag circuit-element accommodating portion is not limited to those cartridge and tray member. For example, the RFID tag circuit-element accommodating portion need not be removable from the main body of the RFID tag reader/writer, and may be unremovably installed on the main body or formed integrally with the main body. Such modifications have substantially the same advantages as described above.

The RFID tag reader/writer 402 is arranged to read or write the RFID tag information from or on the IC circuit portion 551 of the RFID tag circuit elements To, and to perform a printing operation by the thermal head 410 to identify the RFID tag circuit elements To. However, the RFID tag reader/writer need not be arranged to perform the printing operation, and may be arranged to perform only an operation to read or write the RFID tag information.

The main feeding guides 413 and the shielding portion 450, or the device-side antenna 414 and the main feeding guides 413 may be formed integrally with each other. In this case, a variation in the communicating condition may be reduced.

Further, the distance between the main feeding guides 413 and the shielding portion 450 is preferably made larger than that between the device-side antenna 414 and the main feeding guides 413, to reduce an influence of the shielding portion 450 disposed at the position of communication between the RFID tag and the reader/writer, for thereby increasing the stability of the communication.

It is to be understood that various modifications not specifically described may be made to the seventh aspect of the invention, without departing from the spirit of the invention.

Embodiment 6

Figure 56:
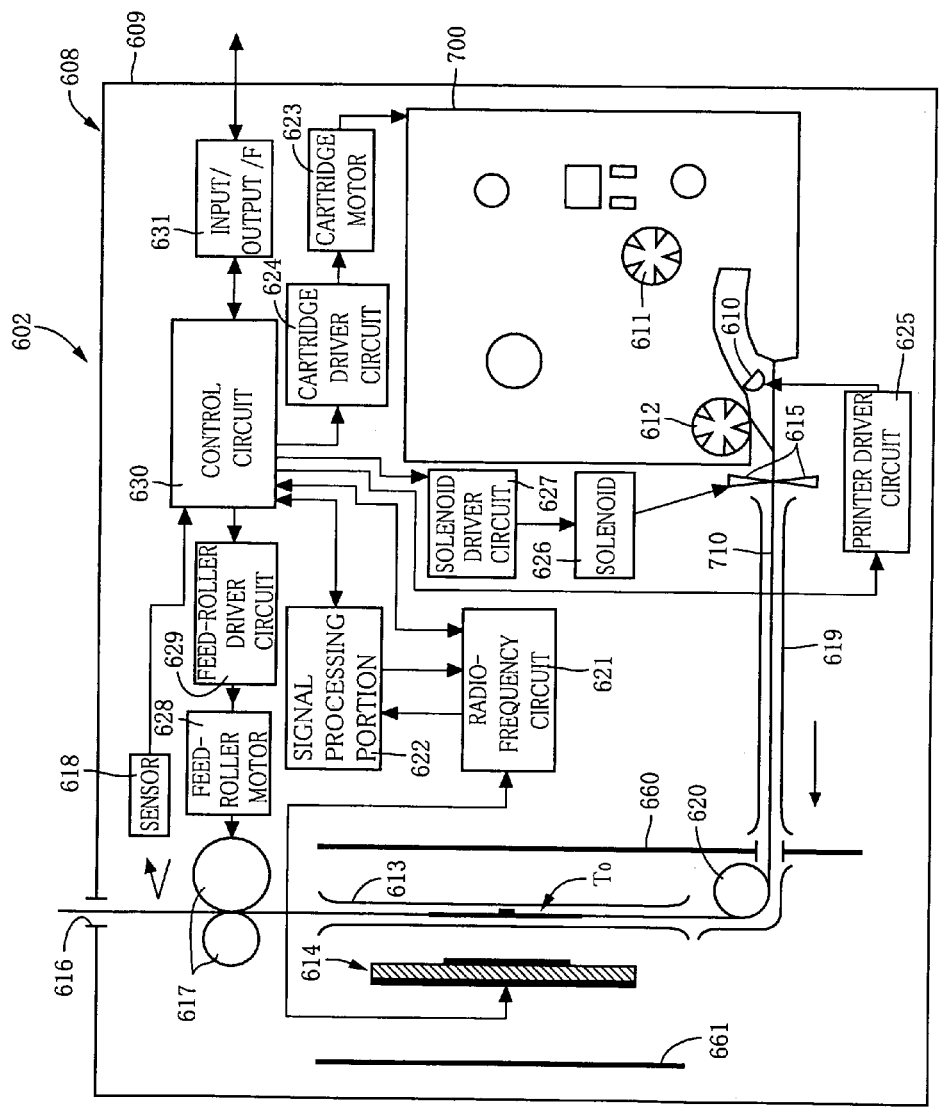
FIG. 56 is a view schematically showing in detail an arrangement of an RFID tag reader/writer according to a sixth embodiment of this invention.
Figure 57:
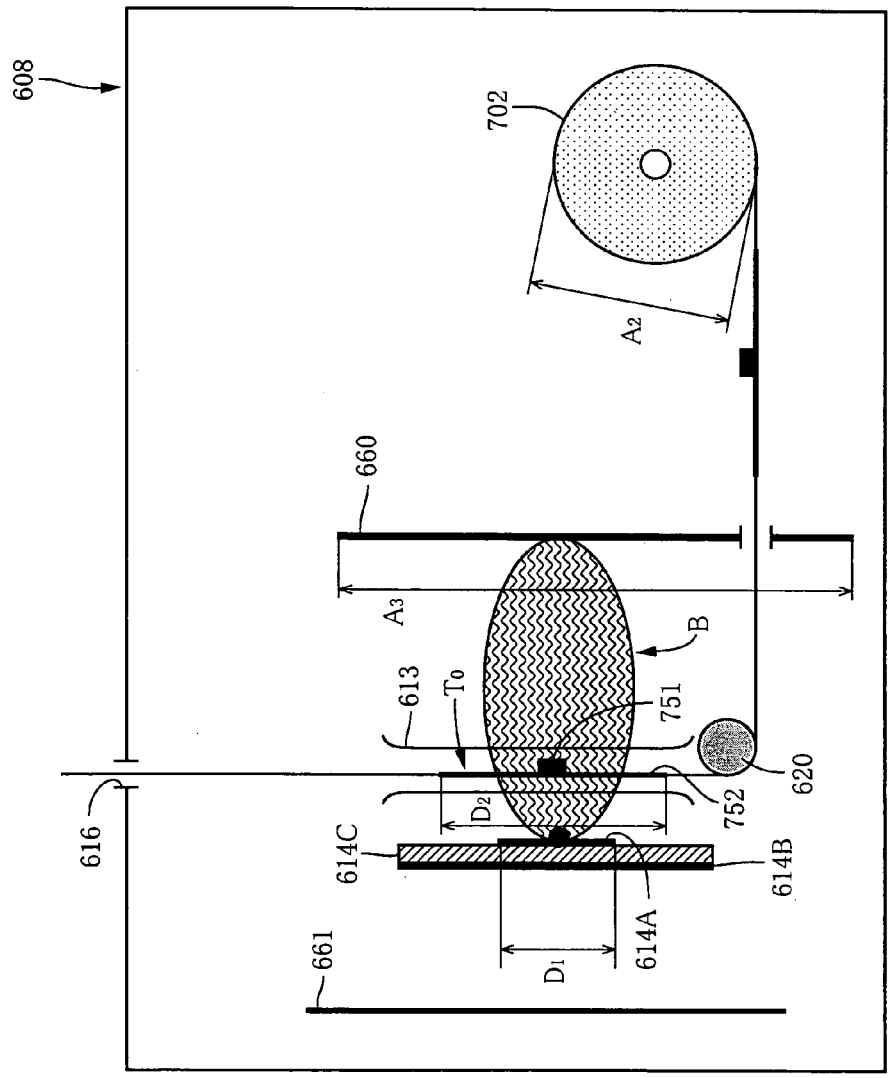
FIG. 57 is a view schematically illustrating major elements shown in FIG. 56, such as a main feeding guide and a cartridge.
Figure 58:
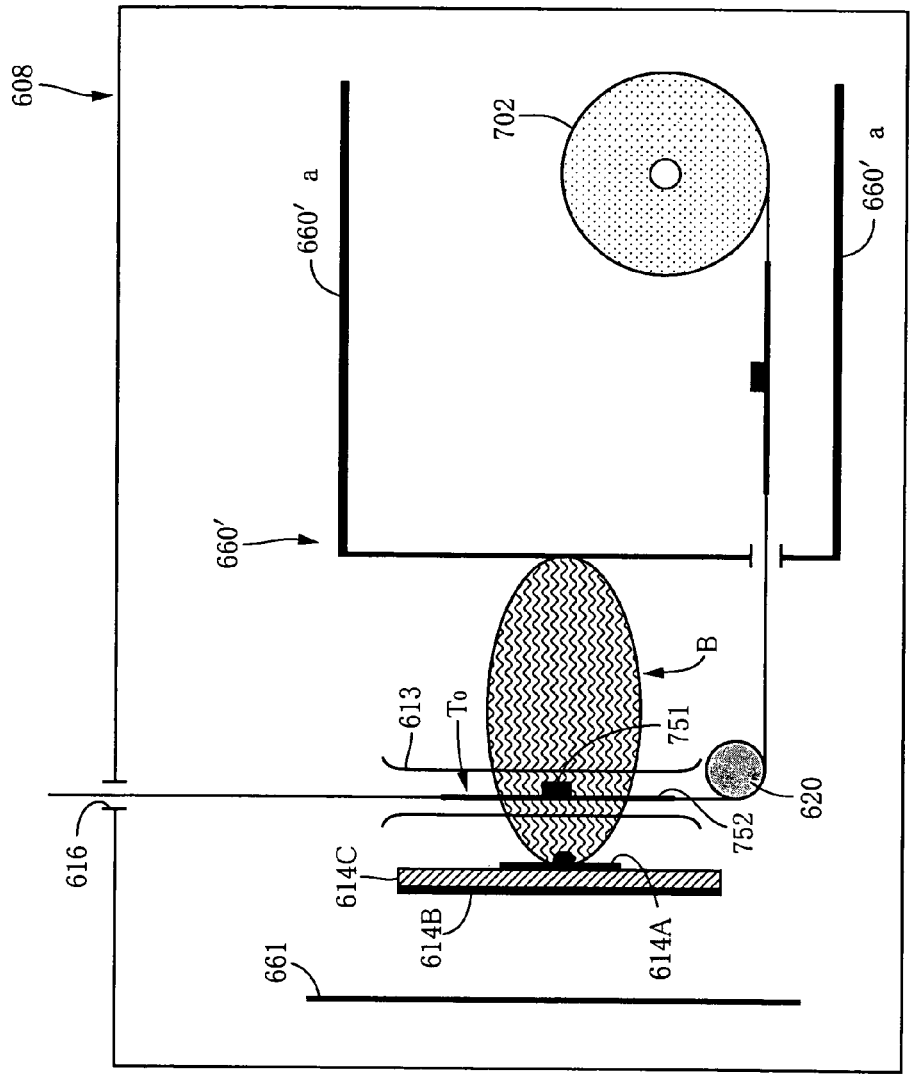
FIG. 58 is a view showing a modification provided with a shielding plate of another configuration.

Referring to FIGS. 56-58, there will be described a sixth embodiment of this invention. The present embodiment is applicable to a system for producing read-only RFID tags (on which information cannot be written).

FIG. 56 is a view schematically showing in detail an arrangement of an RFID tag reader/writer 602 according to the present sixth embodiment of the invention. This RFID tag reader/writer 602 is suitably used in the communication system 10 described above with respect to the first embodiment. Redundant description of the RFID tag reader/writer 602 is avoided. In the following description, the same reference signs as used in the first through fifth embodiments will be used to identify the corresponding elements, the description of which will be omitted.

As shown in FIG. 56, a main body 608 of the RFID tag reader/writer 602 has a recess portion serving as a cartridge holding portion (not shown) in which a cartridge 700 is removably installed.

The main body 608, which is provided with the above-described cartridge holding portion in which the cartridge 700 is fitted, accommodates: a housing 609 providing an outer frame; a printing head (thermal head) 610 operable to perform a predetermined printing operation on a covering film; a ribbon take-up-roll drive shaft 611 for driving a ribbon take up roll to take up a used length of an ink ribbon; a tape feed-roller drive shaft 612 for driving a tape feed roller to feed a printed tag tape 710 out of the cartridge 700; an antenna 614 for transmission and reception of signals to and from an RFID tag circuit element To (described below in detail), by radio communication using a radio frequency such as a UHF band; a cutter 615 operable to cut the printed tag tape 710 into RFID tags T in the form of a label having a predetermined length, at a predetermined timing; a pair of main feeding guides 613 for holding the RFID tag circuit element To in a predetermined accessible area opposite to the antenna 614, during the above-indicated signal transmission and reception by radio communication, and guiding each RFID tag T produced by the cutting operation; feed rollers 617 for feeding the guided RFID tag T to an outlet 616; a sensor 618 for detecting the RFID tag T present at the outlet 616; a pair of auxiliary feeding guides 619 disposed between the cutter 615 and the main feeding guides 613; and a deflecting feed roller 620 disposed between the auxiliary feeding guides 619 and the main feeding guides 613 and operable to change a feeding direction of the printed tag tape 710 by 90°.

The sensor 618 is a light-transmitting type photoelectric sensor consisting of a light emitter and a light receiver, for example. When the RFID tag T is not present between the light emitter and receiver, a light emitted from the light emitter is received by the light receiver. When the RFID tag T is present between the light emitter and receiver, on the other hand, the light emitted from the light emitter is intercepted, so that the output of the light receiver is reversed.

Further, the main body 608 incorporates: a radio-frequency circuit 621 operable to obtain access to (read information from or write information on) the above-described RFID tag circuit element To through the antenna 614; a signal processing circuit 622 operable to process signals read out from the RFID tag circuit element To; a cartridge motor 623 for driving the above-described ribbon take-up roll drive shaft 611 and tape feed-roller drive shaft 612; a cartridge driver circuit 624 for controlling the cartridge motor 623; a printer driver circuit 625 for controlling the energization of the above-described printing head 610: a solenoid 626 for driving the above-described cutter 615 to perform the cutting operation; a solenoid driver circuit 627 for controlling the solenoid 626; a feed-roller motor 628 for driving the above-described feed rollers 617; a feed-roller driver circuit 629 for controlling the feed-roller motor 628; and a control circuit 630 for controlling the RFID tag reader/writer 602 as a whole through the above-described radio-frequency circuit 621, signal processing circuit 622, cartridge driver circuit 624, printer driver circuit 625, solenoid driver circuit 627, feed-roller driver circuit 629, etc.

The control circuit 630 is a so-called microcomputer which incorporates a CPU functioning as a central processing unit, a ROM, and a RAM and which operates to perform signal processing operations according to programs stored in the ROM, while utilizing a temporary data storage function of the RAM. This control circuit 630 is connected to the communication line described above with respect to the first embodiment, through an input/output interface 631, for transmission and reception of information to and from the above-described route server 16, terminal 18, general-purpose computer 20 and information servers 22 which are connected to the communication line.

Since the arrangement of the above-described cartridge 700 is identical with that in the fifth embodiment described above by reference to FIG. 50, the description of this cartridge in the present embodiment is omitted. Since the function of the radio-frequency circuit 621 is identical with that in the second through fourth embodiments described above by reference to FIG. 38, the description of this circuit in this embodiment is omitted. Further, since the functional arrangement of the RFID tag circuit element To provided on the printed tag tape 710 is identical with that in the first embodiment described above by reference to FIG. 3, the description of this circuit element in the present embodiment is omitted. Further, since the routine executed by the control circuit 630 to read the RFID tag information from the IC circuit portion 751 of the RFID tag circuit element To is identical with that in the second through fourth embodiments described above by reference to the flow charts of FIG. 39, the description of this routine in the present embodiment is omitted.

While the basic arrangement of the present RFID tag reader/writer 602 of the present embodiment has been described, the most prominent feature of the RFID tag reader/writer 602 resides in that the device-side antenna 614 is a micro strip antenna (directional antenna) which has a directivity in a predetermined direction, and in that the main feeding guides 613 are spaced from the device-side antenna 614 in a direction of directivity of the device-side antenna 614 (in the right direction as seen in FIG. 56), and a shielding plate (shielding portion) 660 for reducing an intensity of a communication signal is provided such that the shielding plate 660 is spaced from the main feeding guides 613 in the direction of directivity of the main feeding guides 613 (in the right direction as seen in FIG. 56), while the cartridge 700 is spaced from the shielding plate 660 in the direction of directivity of the device-side antenna 616 (in the right direction as seen in FIG. 56). Further, a reflecting plate (reflecting portion) 661 for reflecting the communication signal is provided such that the reflecting plate 661 is spaced from the device-side antenna in a direction opposite to the direction of directivity of the device-side antenna 614 (in the left direction as seen in FIG. 56). The shielding plate 660 is separate from the cartridge 700, and is attached to the housing 609 of the main body 608. The main feeding guides 613 are spaced from a midpoint between the device-side antenna 614 and the shielding plate 660, toward the device-side antenna 614.

Since the arrangement of the antenna 614 is identical with that in the fifth embodiment described above by reference to FIGS. 51 and 52, the description of this antenna 614 in the present embodiment is omitted.

FIG. 57 is a view briefly and schematically illustrating major elements shown in FIG. 56, such as the main feeding guides 613 and the cartridge 700.

As shown in FIG. 57, The main feeding guides 613 and the cartridge 700 are positioned such that the main feeding guides 613 are disposed on the side of the micro strip antenna element 614A, while the reflecting plate 661 is disposed on the side of the base plate 614B. It is particularly noted that a dimension D1 of the micro strip antenna element 614A (in the longitudinal direction of a tag-side antenna 752) when the RFID tag circuit element To is held in the accessible area by the feeding guides 613 is smaller than a longitudinal dimension D2 of the tag-side antenna 752. It is also noted that the outlet 616 is spaced from the device-side antenna 614 in a direction (in the vertical direction as seen in FIG. 53) substantially perpendicular to the direction of directivity of the device-side antenna 614, while the shielding plate 600 has a size (surface area) A3 larger than a surface area of projection A2 of a first roll 702 in the cartridge 700 as seen from the shielding plate 660, so that the first roll 702 in the cartridge 700 is not visible from the center of the device-side antenna 614.

It will be understood from the foregoing description that the first roll 702 serves as an RFID tag circuit-element accommodating portion for accommodating a plurality of RFID tag circuit elements such that the RFID tag circuit elements can be successively taken out, and that the main feeding guides 613 serves as an RFID tag circuit-element holding portion for holding each of the RFID tag circuit elements successively taken out from the RFID tag circuit-element accommodating portion, in a predetermined accessible area in which the directional antenna obtains access to the RFID tag information.

There will be described an operation of the present embodiment constructed described above.

The present RFID tag reader/writer 602 is arranged to obtain access to (to read the RFID tag information from the IC circuit portion 751 of) the RFID tag circuit elements To which are successively taken out from the printed tag tape 710 fed out from the cartridge 700 and held by the main feeding guides 613 in the predetermined position (in the accessible area) opposite to the device-side antenna 614. That is, the access information (above-described "Scroll All ID" signal) generated by the signal processing circuit 622 of the RFID tag reader/writer 602 is used by the first mixer 271, to modulate the carrier wave from the VCO 258, and the modulated carrier wave is amplified by the transmission-side amplifier 272. The amplified carrier wave is transmitted from the device-side antenna 614 to the IC circuit portion 751 of each RFID tag circuit element To, in a non-contact fashion. Where a radio frequency in a UHF band is used for radio communication, the communication distance inherently tends to be large, so that there is a high possibility that the RFID tag information is read out from not only the desired RFID tag circuit element To held by the main feeding guides 613, but also the following RFID tag circuit elements To (the RFID tag circuit element which has just been taken out from the cartridge 700, and the other RFID tag circuit elements still accommodated within the cartridge 700).

In view of the above-described drawback, the RFID tag reader/writer 602 according to the present embodiment is arranged such that the micro strip antenna having a directivity in predetermined one direction is used as the device-side antenna 614, and the main feeding guides 613 which define the accessible area are disposed such that the main feeding guides 613 are spaced from the device-side antenna 614 in the direction of directivity of the device-side antenna 614, while the shielding plate 660 is provided such that the shielding plate 660 is spaced from the main feeding guides 613 in the direction of directivity of the antenna 614, to prevent leakage of the communication signal in the direction of directivity. Further, the cartridge 700 provided with the first roll 702 accommodating the plurality of RFID tag circuit elements To is spaced from the shielding plate 660 in the direction of directivity of the device-side antenna 614.

In this arrangement, a sensitivity of the device-side antenna 614 with respect to the RFID tag circuit element To held in the accessible area (area B shown in FIG. 57) is relatively high so that an intensity of a radio communication signal is relatively high, while the sensitivity of the device-side antenna 414 with respect to each RFID tag circuit element To accommodated in the first roll 702 in the cartridge 700 and the RFID tag circuit element To at the outlet 616 is relatively low so that the intensity of the radio communication signal is relatively low. Accordingly, the RFID tag reader/writer 602 can obtain access to the RFID tag information of the IC circuit portion 751 of only the RFID tag circuit element To which has been taken out from the cartridge 500 and which is currently held by the main feeding guides 613. Therefore, even when a radio frequency in the UHF band is used for communication, the RFID tag reader/writer 402 can read the RFID tag information from the IC circuit portion 751 of only the RFID tag circuit element To desired to be accessed for information reading, with a simple arrangement and in a simple manner, as described above, without the provision of a conventionally required shielding means, or without reduction of the signal output or without the provision of specific communication means for identification of individual RFID tag circuit elements.

If the shielding plate 660 were attached to the cartridge 700 which is removably installed in the main body 608 of the RFID tag reader/writer, or attached to the first roll 702, it would be necessary to attach the shielding plate 660 to the cartridge 700 or first roll 702 each time the used cartridge 700 is replaced with a new one. This arrangement would increase the cost of manufacture of the RFID tag reader/writer. According to the present embodiment, however, the shielding plate 660 is attached to the main body 608, to avoid the above-described drawback, namely, to reduce the cost of manufacture of the RFID tag reader/writer.

When a communication signal is transmitted and received between the micro strip antenna element 614A and the tag-side antenna 752 of the RFID tag circuit element To where these two antennas are located close to each other, a radiation of the communication signal in the direction of directivity of the micro strip antenna element 614A from a portion of the antenna element 614A which is outside the longitudinal dimension D2 of the tag-side antenna 752 is unlikely to be received by the tag-side antenna and is likely to leak. In view of this fact, the RFID tag reader/writer 602 of the present embodiment is arranged such that the longitudinal dimension D1 of the micro strip antenna element 614A is made smaller than the longitudinal dimension D2 of the tag-side antenna 752, so that the information can be transmitted and received between the device-side antenna 614 and the tag-side antenna 752, with high efficiency.

Further, the size (surface area) A3 of the shielding plate 660 is made larger than the surface area of projection A2 of the first roll 702 as seen from the device-side antenna 614, to effectively prevent leakage of the communication signal toward the first roll 705, beyond the shielding plate 660.

In addition, the main feeding guides 613 are disposed on the side of the micro strip antenna element 614A, that is, spaced from the antenna element 614A in its direction of directivity, while the reflecting plate 661 is disposed on the side of the base plate 614B, that is, spaced from the base plate 614B in the direction opposite to the direction of directivity. This arrangement permits reading of the RFID tag information from the RFID tag circuit element To desired to be accessed for information reading, on the side of the micro strip antenna element 614A, while preventing leakage of the communication signal beyond the base plate 614B (beyond the area B shown in FIG. 57) opposite to the micro strip antenna element 614A, into the exterior of the device 602.

Further, the outlet 616 is spaced from the device-side antenna 614 in the direction substantially perpendicular to the direction of directivity of the device-side antenna 614, so that the intensity of the communication signal received at the outlet 616 from the device-side antenna 614 is relatively low. In this respect, too, the leakage of the signal into the exterior of the device 602 can be reduced. As described on page 100, "Plane Small-Sized Antenna", Society of Electronic Information Communication, 1996, Sou Haishi, Ikkou Hirasawa and Yasuo Suzuki, it is generally known of a micro strip antenna that a difference between the highest electric field intensity in the direction of directivity (on the front side) and the lowest electric field intensity on the rear side (back side) is about 20 dB, while a difference between the highest electric field intensity in the direction of directivity and an intermediate electric field intensity in the direction (lateral direction) perpendicular to the direction of directivity is about 10 dB. In this sense, the leakage of the signal can be reduced as described above, by positioning the outlet 616 such that the outlet 616 is spaced from the antenna 614 in a direction in which the electric field intensity of the antenna 614 is lower by at least 10 dB than that in the direction of directivity, namely, in the lateral direction or in a direction inclined with respect to the lateral direction toward the back side of the antenna 614.

While the shielding plate 660 in the preceding embodiment is a planar metal plate, it may be a metallic mesh stripe or a plate coated with a metallic film formed by evaporation. Further, the shielding plate 660 may be formed integrally with the main feeding guides 613. Although the shielding plate 660 has a simple flat configuration, the shielding plate may have any other configuration, as in a modification which will be described by reference to FIG. 58.

FIG. 58, which substantially corresponds to FIG. 57, shows an example of the modification in the form of a shielding plate 660' having a modified configuration.

As shown in FIG. 58, the shielding plate 660' is substantially U-shaped and has side wall portions 616'a extending in the direction toward the first roll 702 and away from the micro strip antenna element 614A. The side wall portions 660'a may be located adjacent to the respective walls of the cartridge 700 in which the first roll 702 is accommodated. Alternatively, the side wall portions 660' may constitute the housing of the cartridge 700 and eliminate the cartridge 700 (and may be removably or fixedly installed).

In the present modification, the side wall portions 660'a of the shielding plate 660' which cover the first roll 702 in its lateral direction are effective to prevent leakage of the communication signal beyond the shielding plate 660' toward the first roll 702, with increased stability.

In the above-described embodiment, the coaxial cable which is a signal line for the antenna 614 extends in a direction substantially perpendicular to the planes of the micro strip antenna element 614A, base plate 614B and dielectric body 614C, as shown in FIGS. 51 and 52. However, the coaxially cable may be connected in any other manner, for example, in the manner as shown in FIG. 55.

In the preceding embodiment, the RFID tag circuit-element accommodating portion is constituted by the first roll 702 which is a roll of the substrate tape 701 having a succession of the RFID tag circuit elements To formed thereon, and which is held by a reel member 702a. However, the RFID tag circuit-element accommodating portion may take any other form.

For example, the RFID tag circuit-element accommodating portion may be a tray member (not shown) in the form of a substantially rectangular box having a horizontally extending attitude. This tray member accommodates a stack of a plurality of planar label elements which are laminated on each other and each of which carries one RFID tag circuit element To formed thereon. The tray member has an outlet open on one of its sides, so that the planar label elements are successively taken out from the tray member through the outlet, whereby the RFID tag circuit elements To are successively taken out from the tray member.

In this modification, too, the main feeding guides 613 are spaced from the device-side antenna 614 in the direction of directivity of the antenna 614, and the shielding plate 660 is spaced from the main feeding guides 613 in the direction of directivity, while the tray member is spaced from the shielding plate 660 in the direction of directivity, so that the intensity of the radio communication signal received from (and the radio communication signal transmitted to) the device-side antenna 614 by the RFID tag circuit element To desired to be accessed for information reading is relatively high, while the intensity of the radio communication signal received by the RFID tag circuit elements To not desired to be accessed for information reading is considerably reduced by the shielding plate 660. Thus, the present modification has substantially the same advantages as described above.

The RFID tag producing system according to the preceding embodiment is arranged to be able to read, information from the RFID tags (but not able to write information on the RFID tags). However, the RFID tag producing system may be modified to be able to write information on the IC circuit portion 751 of the RFID tag circuit element To.

In this modification of the RFID tag reader/writer 602, the radio-frequency circuit 651 is capable of functioning to obtain access to the RFID tag information in the IC circuit portion 751 of the RFID tag circuit element To through the antenna 614, for writing information on the IC circuit portion 751, while the quartz oscillator 256, PLL 257 and VCO 256 of the transmitting portion 253 are capable of functioning as a carrier-wave generating portion operable to generate a carrier wave for access to the RFID tag information in the IC circuit portion 751, for writing the information on the IC circuit portion 751. Further, the signal processing circuit 622 is capable of functioning as an access-information generating portion operable to generate access information ("Erase" signal, "Verify" signal, "Program" signal, etc. which will be described) for access to the IC circuit portion 751.

In the present modification, the routine executed by the control circuit 630 to write the RFID tag information on the IC circuit portion 751 of the RFID tag circuit element To is identical with the routine described above with respect to the second through fourth embodiments by reference to the flow chart of FIG. 48.

In the above-described basic structural and functional arrangement of the present modification wherein the RFID tag information is written on the IC circuit portion 751, the first roll 702 or tray member, and the device-side antenna 614 and the main feeding guides 613 of the RFID tag reader/writer 602 may be positioned relative to each other, as in the preceding embodiment, so that the intensity of the radio communication signal received from the device-side antenna 614 by the RFID tag circuit element To desired to be accessed for information writing is relatively high, while on the other hand the intensity of the radio communication signal received by each RFID tag circuit element To which is accommodated in the cartridge 700 or which has just been taken out from the cartridge 700, is considerably reduced, whereby the RFID tag reader/writer 602 is communicable with only the RFID tag circuit element To desired to be accessed for information writing. Therefore, even when a radio frequency in the UHF band is used for communication, the RFID tag reader/writer 602 can write the RFID tag information on the IC circuit portion 551 of only the RFID tag circuit element To desired to be accessed for information reading, with a simple arrangement and in a simple manner, as described above, without the provision of a conventionally required shielding means, or without reduction of the signal output or without the provision of specific communication means for identification of individual RFID tag circuit elements.

In the preceding embodiment, the cartridge 700 or the tray member which is removably installed on the main body of the RFID tag reader/writer is used as the RFID tag circuit-element accommodating portion. However, the RFID tag circuit-element accommodating portion is not limited to those cartridge and tray member. For example, the RFID tag circuit-element accommodating portion need not be removable from the main body of the RFID tag reader/writer, and may be unremovably installed on the main body or formed integrally with the main body. Such modifications have substantially the same advantages as described above.

The RFID tag reader/writer 602 is arranged to read or write the RFID tag information from or on the IC circuit portion 751 of the RFID tag circuit elements To, and to perform a printing operation by the thermal head 610 to identify the RFID tag circuit elements To. However, the RFID tag reader/writer need not be arranged to perform the printing operation, and may be arranged to perform only an operation to read or write the RFID tag information.

It is to be understood that various modifications not specifically described may be made to the eighth aspect of the invention, without departing from the spirit of the invention.

What is claimed is:

1. An RFID tag reader/writer communicable with an RFID tag circuit element which has an IC circuit portion storing predetermined information, and an antenna connected to the IC circuit portion and arranged to effect transmission and reception of information, said RFID tag reader comprising:
   an access-information generating portion operable to obtain access to RFID tag information of said IC circuit portion, for reading and writing said predetermined information, by communication with said RFID tag circuit element;
   a carrier-wave generating portion operable to generate a carrier wave for obtaining access to said RFID tag information of said IC circuit portion;
   a carrier-wave modulating portion operable to modulate the carrier wave generated by said carrier-wave generating portion, by using access information generated by said access-information generating portion;
   a modulated-wave amplifying portion operable to amplify the carrier wave modulated by said carrier-wave modulating portion; and
   an antenna for transmitting an output of said modulated-wave amplifying portion to said IC circuit portion, for obtaining access to said RFID tag information, by non-contact radio communication with said IC circuit portion, by using a radio frequency,
   wherein a frequency of the carrier wave to be generated by said carrier-wave generating portion is determined on the basis of a resonance frequency of the antenna of said RFID tag circuit element located within a predetermined nearby communication area and the frequency of the carrier wave is adjusted so that the frequency of the carrier wave follows a change of the resonance frequency of the antenna of said RFID tag circuit element, where resonance frequency changes due to mutual coupling between the antenna of said RFID tag circuit element and the antenna of said RFID tag reader/writer.

2. The RFID tag reader/writer according to claim 1, wherein said nearby communication area is set by setting a spacing distance between the antenna of said RFID tag circuit element and the antenna of said RFID tag reader/writer, where the spacing distance is not larger than 0.1 times a wavelength that corresponds to a resonance frequency of the antenna of said RFID tag circuit element when said RFID tag circuit element exists alone, said carrier-wave generating portion generating the carrier wave having a frequency higher than the resonance frequency of the antenna of said RFID tag circuit element when the spacing distance between the antenna of said RFID tag circuit element and the antenna of said RFID tag reader/writer is 0.5 times the wavelength corresponding to the resonance frequency of the antenna of said RFID tag circuit element when said RFID tag circuit element exists alone.

3. The RFID tag reader/writer according to claim 1, which is operable to effect information reading and writing communication with the RFID tag circuit element provided with a half-wave dipole antenna as said antenna, and wherein said nearby communication area is set by setting the spacing distance between the antenna of said RFID tag circuit element and the antenna of said RFID tag reader/writer, to be not larger than 0.05 times a wavelength corresponding to a resonance frequency of the antenna of said RFID tag circuit element when said RFID tag circuit element exists alone, said carrier-wave generating portion generating the carrier wave having a frequency not smaller than 1.03 times the resonance frequency of the antenna of said RFID tag circuit element when said RFID tag circuit element exists alone.

4. The RFID tag reader/writer according to claim 1, wherein said nearby communication area is set by setting the spacing distance between the antenna of said RFID tag circuit element and the antenna of said RFID tag reader/writer, to be within a range between not smaller than 0.2 times and not larger than 0.4 times a wavelength corresponding to a resonance frequency of the antenna of said RFID tag circuit element when said RFID tag circuit element exists alone, said carrier-wave generating portion generating the carrier wave having the resonance frequency of the antenna of said RFID tag circuit element when the spacing distance between the antenna of said RFID tag circuit element and the antenna of said RFID tag reader/writer is within said range.

5. The RFID tag reader/writer according to claim 1, further comprising a mode switching portion operable to place said carrier-wave generating portion in one of a nearby communication mode for communication with said RFID tag circuit element only when said RFID tag circuit element is located within said nearby communication area, and a far communication mode for communication with said RFID tag circuit element when said RFID tag circuit element is located outside said nearby communication area, said carrier-wave generating portion being operable to generate the carrier wave having respective different frequencies when said carrier-wave generating portion is placed in said nearby communication mode and said far communication mode, respectively.

6. An RFID tag reader/writer comprising:
an RFID tag circuit-element accommodating portion for accommodating a plurality of RFID tag circuit elements such that the RFID tag circuit elements can be successively taken out, each of said plurality of RFID tag circuit elements including an IC circuit portion for storing desired information, and a tag-side antenna connected to the IC circuit portion and operable for transmission and reception of information;
an access-information generating portion operable to obtain access to RFID tag information of said IC circuit portion;
a carrier-wave generating portion operable to generate a carrier wave for obtaining access to said RFID tag information of said IC circuit portion;
a carrier-wave modulating portion operable to modulate the carrier wave generated by said carrier-wave generating portion, by using the access information generated by said access-information generating portion;
a modulated-wave amplifying portion operable to amplify the carrier wave modulated by said carrier-wave modulating portion;
a device-side antenna for transmitting an output of said modulated-wave amplifying portion to said IC circuit portion, for obtaining access to said RFID tag information, by non-contact radio communication with said IC circuit portion, by using a radio frequency in a UHF band; and
an RFID tag circuit-element holding portion for holding each of said RFID tag circuit elements successively taken out from said RFID tag circuit-element accommodating portion, in a predetermined accessible area in which said device-side antenna obtains access to said RFID tag information,
wherein said RFID tag circuit-element accommodating portion is positioned such that said tag-side antenna of each of the RFID tag circuit elements accommodated in said RFID tag circuit-element accommodating portion is located in an area in which a radiation directivity of said device-side antenna is almost equal to zero.

7. The RFID tag reader/writer according to claim 6, wherein said RFID tag circuit-element accommodating portion is positioned such that said tag-side antenna of each of the RFID tag circuit elements accommodated in said RFID tag circuit-element accommodating portion is located in an area in which an intensity of an electric field of a signal received from said device-side antenna is not larger than one tenth of that at said RFID tag circuit-element holding portion.

8. The RFID tag reader/writer according to claim 6, wherein said RFID tag circuit-element accommodating portion includes a reel member holding a roll of a label material in the form of a tape having said plurality of RFID tag circuit elements successively formed in its longitudinal direction.

9. The RFID tag reader/writer according to claim 6, wherein said RFID tag circuit-element accommodating portion includes a tray member accommodating a stack of a plurality of planar label elements which are laminated on each other and each of which carries one RFID tag circuit element formed thereon.

10. An RFID tag reader/writer comprising:
an RFID tag circuit-element accommodating portion for accommodating a plurality of RFID tag circuit elements such that the RFID tag circuit elements can be successively taken out, each of said plurality of RFID tag circuit elements including an IC circuit portion for storing desired information, and a tag-side antenna connected to the IC circuit portion and operable for transmission and reception of information;
an access-information generating portion operable to obtain access to RFID tag information of said IC circuit portion;
a carrier-wave generating portion operable to generate a carrier wave for obtaining access to said RFID tag information of said IC circuit portion;
a carrier-wave modulating portion operable to modulate the carrier wave generated by said carrier-wave generating portion, by using the access information generated by said access-information generating portion;
a modulated-wave amplifying portion operable to amplify the carrier wave modulated by said carrier-wave modulating portion;
a device-side antenna for transmitting an output of said modulated-wave amplifying portion to said IC circuit portion, for obtaining access to said RFID tag information, by non-contact radio communication with said IC circuit portion, by using a radio frequency in a UHF band; and
an RFID tag circuit-element holding portion for holding each of said RFID tag circuit elements successively taken out from said RFID tag circuit-element accommodating portion, in a predetermined accessible area in which said device-side antenna obtains access to said RFID tag information,
wherein said device-side antenna is positioned such that an intensity of a radiation directivity of the tab-side antenna of one of the RFID tag circuit elements which is located nearest to an outlet of said RFID tag circuit-element accommodating portion is almost equal to zero.

11. The RFID tag reader/writer according to claim 10, wherein said device-side antenna is positioned such that an intensity of an electric field of a signal which is received by said device-side antenna and which is reflected from said tag-side antenna of each of the RFID tag circuit elements accommodated in said RFID tag circuit element accommodating portion is not larger than one tenth of that of a signal which is received by said device-side antenna and which is reflected from said tag-side antenna of the RFID tag circuit element held by said RFID tag circuit-element holding portion.

12. An RFID tag reader/writer comprising:
an RFID tag circuit-element accommodating portion for accommodating a plurality of RFID tag circuit elements such that the RFID tag circuit elements can be successively taken out, each of said plurality of RFID tag circuit elements including an IC circuit portion for storing desired information, and a tag-side antenna connected to the IC circuit portion and operable for transmission and reception of information;
an access-information generating portion operable to obtain access to RFID tag information of said IC circuit portion;
a carrier-wave generating portion operable to generate a carrier wave for obtaining access to said RFID tag information of said IC circuit portion;
a carrier-wave modulating portion operable to modulate the carrier wave generated by said carrier-wave generating portion, by using the access information generated by said access-information generating portion;
a modulated-wave amplifying portion operable to amplify the carrier wave modulated by said carrier-wave modulating portion;
a device-side antenna for transmitting an output of said modulated-wave amplifying portion to said IC circuit portion, for obtaining access to said RFID tag information, by non-contact radio communication with said IC circuit portion, by using a radio frequency in a UHF band; and
an RFID tag circuit-element holding portion for holding each of said RFID tag circuit elements successively taken out from said RFID tag circuit-element accommodating portion, in a predetermined accessible area in which said device-side antenna obtains access to said RFID tag information,
wherein said RFID tag circuit-element accommodating portion and said device-side antenna are disposed such that a plane of polarization of said tag-side antenna of each of the RFID tag circuit elements accommodated in said RFID tag circuit-element accommodating portion, and a plane of polarization of said device-side antenna are inclined with respect to each other,
said RFID tag circuit-element accommodating portion and said RFID tag circuit-element holding portion are disposed such that an angle not smaller than 60° and not larger than 90° is formed between the plane of polarization of said tag-side antenna of one of the RFID tag circuit elements which is located at an outlet of said RFID tag accommodating portion and the plane of polarization of said tag-side antenna of one of the RFID tag circuit elements which has already been taken out from said RFID tag circuit-element accommodating portion and which is held by said RFID tag circuit-element holding portion, and said RFID tag reader/writer further comprises a deflecting portion operable to change a direction of feeding of said RFID tag circuit elements, at a position between said outlet and said RFID tag circuit-element holding portion, such that the angle not smaller than 60° and not larger than 90° is formed between the plane of polarization of the tag-side antenna of said RFID tag circuit element located at said outlet and the plane of polarization of the tag-side antenna of said RFID tag circuit element held by said RFID tag circuit-element holding portion.

13. The RFID tag reader/writer according to claim 12, wherein said RFID tag circuit-element accommodating portion and said device-side antenna are disposed such that an angle not smaller than 60° and not larger than 90° is formed between the plane of polarization of the tag-side antenna of each of the RFID tag circuit elements accommodated in said RFID tag circuit-element accommodating portion and the plane of polarization of said device-side antenna.

14. The RFID tag reader/writer according to claim 12, wherein said RFID tag circuit-element accommodating portion and said device-side antenna are disposed such that an angle of about 90° is formed between the plane of polarization of the tag-side antenna of each of the RFID tag circuit elements accommodated in said RFID tag circuit-element accommodating portion and the plane of polarization of said device-side antenna.

15. An RFID tag reader/writer comprising:
an RFID tag circuit-element accommodating portion for accommodating a plurality of RFID tag circuit elements such that the RFID tag circuit elements can be successively taken out, each of said plurality of RFID tag circuit elements including an IC circuit portion for storing desired information, and a tag-side antenna connected to the IC circuit portion and operable for transmission and reception of information;
an access-information generating portion operable to obtain access to RFID tag information of said IC circuit portion;
a carrier-wave generating portion operable to generate a carrier wave for obtaining access to said RFID tag information of said IC circuit portion;
a carrier-wave modulating portion operable to modulate the carrier wave generated by said carrier-wave generating portion, by using the access information generated by said access-information generating portion;
a modulated-wave amplifying portion operable to amplify the carrier wave modulated by said carrier-wave modulating portion;
a device-side antenna for transmitting an output of said modulated-wave amplifying portion to said IC circuit portion, for obtaining access to said RFID tag information, by non-contact radio communication with said IC circuit portion, by using a radio frequency in a UHF band; and
an RFID tag circuit-element holding portion for holding each of said RFID tag circuit elements successively taken out from said RFID tag circuit-element accommodating portion, in a predetermined accessible area in which said device-side antenna obtains access to said RFID tag information,
wherein said RFID tag circuit-element accommodating portion is positioned such that said tag-side antenna of each of the RFID tag circuit elements accommodated in said RFID tag circuit-element accommodating portion is located in an area in which a sensitivity of said device-side antenna is relatively low;

said RFID tag circuit-element accommodating portion and said device-side antenna are disposed such that a plane of polarization of said tag-side antenna of each of the RFID tag circuit elements accommodated in said RFID tag circuit-element accommodating portion, and a plane of polarization of said device-side antenna are inclined with respect to each other, said RFID tag circuit-element accommodating portion and said RFID tag circuit-element holding portion are disposed such that an angle not smaller than 60° and not larger than 90° is formed between the plane of polarization of said tag-side antenna of one of the RFID tag circuit elements which is located at an outlet of said REID tag accommodating portion and the plane of polarization of said tag-side antenna of one of the RFID tag circuit elements which has already been taken out from said RFID tag circuit-element accommodating portion and which is held by said RFID tag circuit-element holding portion, and said RFID tag reader/writer further comprises a deflecting portion operable to change a direction of feeding of said RFID tag circuit elements, at a position between said outlet and said RFID tag circuit-element holding portion, such that the angle not smaller than 60° and not larger than 90° is formed between the plane of polarization of the tag-side antenna of said RFID tag circuit element located at said outlet and the plane of polarization of the tag-side antenna of said RFID tag circuit element held by said RFID tag circuit-element holding portion.

16. An RFID tag reader/writer comprising:

an RFID tag circuit-element accommodating portion for accommodating a plurality of RFID tag circuit elements such that the RFID tag circuit elements can be successively taken out, each of said plurality of RFID tag circuit elements including an IC circuit portion for storing desired information, and a tag-side antenna connected to the IC circuit portion and operable for transmission and reception of information;

an access-information generating portion operable to obtain access to RFID tag information of said IC circuit portion;

a carrier-wave generating portion operable to generate a carrier wave for obtaining access to said RFID tag information of said IC circuit portion;

a carrier-wave modulating portion operable to modulate the carrier wave generated by said carrier-wave generating portion, by using the access information generated by said access-information generating portion;

a modulated-wave amplifying portion operable to amplify the carrier wave modulated by said carrier-wave modulating portion;

a device-side antenna for transmitting an output of said modulated-wave amplifying portion to said IC circuit portion, for obtaining access to said RFID tag information, by non-contact radio communication with said IC circuit portion, by using a radio frequency in a UHF band; and an RFID tag circuit-element holding portion for holding each of said RFID tag circuit elements successively taken out from said RFID tag circuit-element accommodating portion, in a predetermined accessible area in which said device-side antenna obtains access to said RFID tag information, wherein said device-side antenna is positioned such that a sensitivity of said tag-side antenna of each of the RFID tag circuit elements accommodated in said RFID tag circuit-element accommodating portion is relatively low;

said RFID tag circuit-element accommodating portion and said device-side antenna are disposed such that a plane of polarization of said tag-side antenna of each of the RFID tag circuit elements accommodated in said RFID tag circuit-element accommodating portion, and a plane of polarization of said device-side antenna are inclined with respect to each other, said RFID tag circuit-element accommodating portion and said RFID tag circuit-element holding portion are disposed such that an angle not smaller than 60° and not larger than 90° is formed between the plane of polarization of said tag-side antenna of one of the RFID tag circuit elements which is located at an outlet of said RFID tag accommodating portion and the plane of polarization of said tag-side antenna of one of the RFID tag circuit elements which has already been taken out from said RFID tag circuit-element accommodating portion and which is held by said RFID tag circuit-element holding portion, and said RFID tag reader/writer further comprises a deflecting portion operable to change a direction of feeding of said RFID tag circuit elements, at a position between said outlet and said RFID tag circuit-element holding portion, such that the angle not smaller than 60° and not larger than 90° is formed between the plane of polarization of the tag-side antenna of said RFID tag circuit element located at said outlet and the plane of polarization of the tag-side antenna of said RFID tag circuit element held by said RFID tag circuit-element holding portion.

17. An RFID tag reader/writer comprising:

an RFID tag circuit-element accommodating portion for accommodating a plurality of RFID tag circuit elements such that the RFID tag circuit elements can be successively taken out, each of said plurality of RFID tag circuit elements including an IC circuit portion for storing desired information, and a tag-side antenna connected to the IC circuit portion and operable for transmission and reception of information;

an access-information generating portion operable to generate access information for obtaining access to RFID tag information of said IC circuit portion;

a directional antenna for transmitting said access information generated by said access-information generating portion, to said tag-side antenna, for obtaining access to said RFID tag information of said IC circuit portion, by non-contact radio communication with said tag-side antenna; and an RFID tag circuit-element holding portion for holding each of said RFID tag circuit elements successively taken out from said RFID tag circuit-element accommodating portion, in a predetermined accessible area in which said directional antenna obtains access to said RFID tag information, wherein said RFID tag circuit-element holding portion is spaced from said directional antenna in a direction of directivity of the directional antenna, while said RFID tag circuit-element accommodating portion is spaced from said directional antenna in a direction opposite to said direction of directivity such that said RFID tag circuit-element accommodating portion is located in an area in which a radiation sensitivity of the directional antenna is almost equal to zero.

18. The RFID tag reader/writer according to claim 17, wherein said directional antenna is a micro strip antenna which is provided with a micro strip antenna element on one of opposite sides thereof, and a base plate on the other of said opposite sides.

19. The RFID tag reader/writer according to claim 18, wherein said RFID tag circuit-element holding portion is disposed on the side of said micro strip antenna element, while said RFID tag circuit-element accommodating portion is disposed on the side of said base plate.

20. The RFID tag reader/writer according to claim 18, characterized on that a dimension of said micro strip antenna element in a longitudinal direction of the tag-side antenna of the RFID tag circuit element held in said accessible area is smaller than a dimension of said tag-side antenna in said longitudinal direction.

21. The RFID tag reader/writer according to claim 18, wherein said base plate has a size larger than a surface area of projection of said RFID tag circuit-element accommodating portion as seen from said micro strip antenna.

22. The RFID tag reader/writer according to claim 18, wherein said base plate has side wall portions extending in a direction toward said RFID tag circuit-element accommodating portion and away from said micro strip antenna element.

23. The RFID tag reader/writer according to claim 22, wherein said base plate is substantially U-shaped.

24. The RFID tag reader/writer according to claim 17, further comprising a shielding portion for reducing an intensity of a radio communication signal, said shielding portion being spaced from said RFID tag circuit-element holding portion in said direction of directivity.

25. The RFID tag reader/writer according to claim 17, further comprising an outlet through which the RFID tag circuit element is fed out of the RFID tag reader/writer after said RFID tag information of said IC circuit portion has been accessed in said accessible area.

26. The RFID tag reader/writer according to claim 25, wherein said outlet is spaced from said directional antenna in a direction substantially perpendicular to said direction of directivity.

27. The RFID tag reader/writer according to claim 25, wherein said outlet is spaced from said directional antenna in a direction in which an electric field intensity of the directional antenna is lower by at least 10 dB than that in said direction of directivity.

28. An RFID tag reader/writer comprising:
an RFID tag circuit-element accommodating portion for accommodating a plurality of RFID tag circuit elements such that the RFID tag circuit elements can be successively taken out, each of said plurality of RFID tag circuit elements including an IC circuit portion for storing desired information, and a tag-side antenna connected to the IC circuit portion and operable for transmission and reception of information;
an access-information generating portion operable to generate access information for obtaining access to RFID tag information of said IC circuit portion;
a directional antenna for transmitting said access information generated by said access-information generating portion, to said tag-side antenna, for obtaining access to said RFID tag information of said IC circuit portion, by non-contact radio communication with said tag-side antenna;
an RFID tag circuit-element holding portion for holding each of said RFID tag circuit elements successively taken out from said RFID tag circuit-element accommodating portion, in a predetermined accessible area in which said directional antenna obtains access to said RFID tag information; and
a shielding portion for reducing an intensity of a radio communication signal,
wherein:
said RFID tag circuit-element holding portion is spaced from said directional antenna in a direction of directivity of the directional antenna;
said shielding portion is spaced from said RFID tag circuit-element holding portion in the direction of directivity of said directional antenna; and
said RFID tag circuit-element accommodating portion is spaced from said shielding portion in the direction of directivity of said directional antenna, and
said RFID tag circuit-element holding portion is disposed on the side of said micro strip antenna element, while a reflecting plate for reflecting the communication signal is disposed on the side of said base plate.

29. The RFID tag reader/writer according to claim 28, wherein a spacing distance between said shielding portion and said holding portion is larger than a spacing distance between said directional antenna and said holding portion.

30. The RFID tag reader/writer according to 28, wherein said directional antenna is a micro strip antenna which is provided with a micro strip antenna element on one of opposite sides thereof, and a base plate on the other of said opposite sides.

31. The RFID tag reader/writer according to claim 30, wherein a dimension of said micro strip antenna element in a longitudinal direction of the tag-side antenna of the RFID tag circuit element held in said accessible area is smaller than a dimension of said tag-side antenna in said longitudinal direction.

32. The RFID tag reader/writer according to claim 28, wherein said RFID tag circuit-element accommodating portion is removably installed on a main body of the RFID tag reader/writer, and said shielding portion is disposed on the main body of the RFID tag reader/writer.

33. The RFID tag reader/writer according to claim 28, further comprising an outlet through which the RFID tag circuit element is fed out of the RFID tag reader/writer after said RFID tag information of said IC circuit portion has been accessed in said accessible area.

34. The RFID tag reader/writer according to claim 33, wherein said outlet is spaced from said directional antenna in a direction substantially perpendicular to said direction of directivity.

35. The RFID tag reader/writer according to claim 33, wherein said outlet is spaced from said directional antenna in a direction in which an electric field intensity of the directional antenna is lower by at least 10 dB than that in said direction of directivity.

36. The RFID tag reader/writer according to claim 28, wherein said shielding portion is a planar member having a size larger than a surface area of projection of said RFID tag circuit-element accommodating portion as seen from said shielding portion.

37. The RFID tag reader/writer according to claim 28, wherein said shielding portion has side wall portions extending in a direction toward said RFID tag circuit-element accommodating portion and away from said micro strip antenna element.

38. The RFID tag reader/writer according to claim 37, wherein said shielding portion is substantially U-shaped.

39. An RFID tag reader/writer comprising:

an RFID tag circuit-element accommodating portion for accommodating a plurality of RFID tag circuit elements such that the RFID tag circuit elements can be successively taken out, each of said plurality of RFID tag circuit elements including an IC circuit portion for storing desired information, and a tag-side antenna connected to the IC circuit portion and operable for transmission and reception of information;

an access-information generating portion operable to obtain access to RFID tag information of said IC circuit portion;

a carrier-wave generating portion operable to generate a carrier wave for obtaining access to said RFID tag information of said IC circuit portion;

a carrier-wave modulating portion operable to modulate the carrier wave generated by said carrier-wave generating portion, by using the access information generated by said access-information generating portion;

a modulated-wave amplifying portion operable to amplify the carrier wave modulated by said carrier-wave modulating portion;

a device-side antenna for transmitting an output of said modulated-wave amplifying portion to said IC circuit portion, for obtaining access to said RFID tag information, by non-contact radio communication with said IC circuit portion, by using a radio frequency in a UHF band; and an RFID tag circuit-element holding portion for holding each of said RFID tag circuit elements successively taken out from said RED tag circuit-element accommodating portion, in a predetermined accessible area in which said device-side antenna obtains access to said RFID tag information, wherein said RFID tag circuit-element accommodating portion and said device-side antenna are disposed such that a plane of polarization of said tag-side antenna of each of the RFID tag circuit elements accommodated in said RFID tag circuit-element accommodating portion, and a plane of polarization of said device-side antenna are inclined with respect to each other, said RFID tag circuit-element accommodating portion and said device-side antenna are disposed such that an angle of about 90° is formed between the plane of polarization of said tag-side antenna of one of the RFID tag circuit elements which is located at an outlet of said RFID tag accommodating portion and the plane of polarization of said tag-side antenna of one of the RFID tag circuit elements which has already been taken out from said RFID tag circuit-element accommodating portion and which is held by said RFID tag circuit-element holding portion, and said RFID tag reader/writer further comprises a deflecting portion operable to change a direction of feeding of said RFID tag circuit elements, at a position between said outlet and said RFID tag circuit-element holding portion, such that the angle of about 90° is formed between the plane of polarization of the tag-side antenna of said REID tag circuit element located at said outlet and the plane of polarization of the tag-side antenna of said RFID tag circuit element held by said RFID tag circuit-element holding portion.

40. An RFID tag reader/writer comprising:

an RFID tag circuit-element accommodating portion for accommodating a plurality of RFID tag circuit elements such that the RFID tag circuit elements can be successively taken out, each of said plurality of RFID tag circuit elements including an IC circuit portion for storing desired information, and a tag-side antenna connected to the IC circuit portion and operable for transmission and reception of information;

an access-information generating portion operable to obtain access to RFID tag information of said IC circuit portion;

a carrier-wave generating portion operable to generate a carrier wave for obtaining access to said RFID tag information of said IC circuit portion;

a carrier-wave modulating portion operable to modulate the carrier wave generated by said carrier-wave generating portion, by using the access information generated by said access-information generating portion;

a modulated-wave amplifying portion operable to amplify the carrier wave modulated by said carrier-wave modulating portion;

a device-side antenna for transmitting an output of said modulated-wave amplifying portion to said IC circuit portion, for obtaining access to said RFID tag information, by non-contact radio communication with said IC circuit portion, by using a radio frequency in a UHF band; and an RFID tag circuit-element holding portion for holding each of said RFID tag circuit elements successively taken out from said RFD tag circuit-element accommodating portion, in a predetermined accessible area in which said device-side antenna obtains access to said RFID tag information, wherein said RFID tag circuit-element accommodating portion is positioned such that said tag-side antenna of each of the RFID tag circuit elements accommodated in said RFID tag circuit-element accommodating portion is located in an area in which a sensitivity of said device-side antenna is relatively low;

said RFID tag circuit-element accommodating portion and said device-side antenna are disposed such that a plane of polarization of said tag-side antenna of each of the RFID tag circuit elements accommodated in said RFID tag circuit-element accommodating portion, and a plane of polarization of said device-side antenna are inclined with respect to each other, said RFID tag circuit-element accommodating portion and said device-side antenna are disposed such that an angle of about 90° is formed between the plane of polarization of said tag-side antenna of one of the RFID tag circuit elements which is located at an outlet of said RFID tag accommodating portion and the plane of polarization of said tag-side antenna of one of the RFID tag circuit elements which has already been taken out from said RFD tag circuit-element accommodating portion and which is held by said RFID tag circuit-element holding portion, and said RFID tag reader/writer further comprises a deflecting portion operable to change a direction of feeding of said RFID tag circuit elements, at a position between said outlet and said RFID tag circuit-element holding portion, such that the angle of about 90° is formed between the plane of polarization of the tag-side antenna of said RFID tag circuit element located at said outlet and the plane of polarization of the tag-side antenna of said RFID tag circuit element held by said RFD tag circuit-element holding portion.

41. An RFID tag reader/writer comprising:

an RFID tag circuit-element accommodating portion for accommodating a plurality of RFID tag circuit elements such that the RFID tag circuit elements can be successively taken out, each of said plurality of RFID tag circuit elements including an IC circuit portion for storing desired information, and a tag-side antenna connected to the IC circuit portion and operable for transmission and reception of information;

an access-information generating portion operable to obtain access to RFD tag information of said IC circuit portion;

a carrier-wave generating portion operable to generate a carrier wave for obtaining access to said RFID tag information of said IC circuit portion;

a carrier-wave modulating portion operable to modulate the carrier wave generated by said carrier-wave generating portion, by using the access information generated by said access-information generating portion;

a modulated-wave amplifying portion operable to amplify the carrier wave modulated by said carrier-wave modulating portion;

a device-side antenna for transmitting an output of said modulated-wave amplifying portion to said IC circuit portion, for obtaining access to said RFID tag information, by non-contact radio communication with said IC circuit portion, by using a radio frequency in a UHF band; and an RFID tag circuit-element holding portion for holding each of said RFID tag circuit elements successively taken out from said RFID tag circuit-element accommodating portion, in a predetermined accessible area in which said device-side antenna obtains access to said REID tag information, wherein said device-side antenna is positioned such that a sensitivity of said tag-side antenna of each of the RFID tag circuit elements accommodated in said RFID tag circuit-element accommodating portion is relatively low;

said RFID tag circuit-element accommodating portion and said device-side antenna are disposed such that a plane of polarization of said tag-side antenna of each of the RFID tag circuit elements accommodated in said RFID tag circuit-element accommodating portion, and a plane of polarization of said device-side antenna are inclined with respect to each other, said RFID tag circuit-element accommodating portion and said device-side antenna are disposed such that an angle of about 90° is formed between the plane of polarization of said tag-side antenna of one of the RFID tag circuit elements which is located at an outlet of said RFID tag accommodating portion and the plane of polarization of said tag-side antenna of one of the RFID tag circuit elements which has already been taken out from said RFID tag circuit-element accommodating portion and which is held by said RFID tag circuit-element holding portion, and said RFID tag reader/writer further comprises a deflecting portion operable to change a direction of feeding of said RFID tag circuit elements, at a position between said outlet and said RFID tag circuit-element holding portion, such that the angle of about 90° is formed between the plane of polarization of the tag-side antenna of said REID tag circuit element located at said outlet and the plane of polarization of the tag-side antenna of said RFID tag circuit element held by said RFID tag circuit-element holding portion.

* * * * *